United States Patent [19]
Sunakawa et al.

[11] Patent Number: 5,644,653
[45] Date of Patent: Jul. 1, 1997

[54] INFORMATION PROCESSING APPARATUS AND CONTROL METHOD THEREOF HAVING USER CHARACTER RECOGNITION

[75] Inventors: Shinichi Sunakawa, Kawasaki; Kazutoshi Shimada, Yokosuka; Eisaku Tatsumi, Yokohama; Noriyuki Suzuki, Tokyo; Katsuhiko Nagasaki, Ichikawa, all of Japan

[73] Assignee: Canon Kabushiki Kaisha, Tokyo, Japan

[21] Appl. No.: 233,888

[22] Filed: Apr. 26, 1994

[30] Foreign Application Priority Data

May 7, 1993 [JP] Japan ................................ 5-106638
Jul. 2, 1993 [JP] Japan ................................ 5-164487

[51] Int. Cl.⁶ .............................. G06K 9/00; G06F 3/00
[52] U.S. Cl. .......................... 382/187; 364/709.11
[58] Field of Search .............................. 382/13, 3, 59, 382/119, 120, 121, 186, 187, 188, 312; 364/709.11

[56] References Cited

U.S. PATENT DOCUMENTS

| | | | |
|---|---|---|---|
| 4,718,102 | 1/1988 | Crane et al. | 382/30 |
| 4,853,494 | 8/1989 | Suzuki | 178/18 |
| 5,202,844 | 4/1993 | Kamio et al. | 364/709.11 |
| 5,265,174 | 11/1993 | Nakatsuka | 382/62 |

FOREIGN PATENT DOCUMENTS

| | | | |
|---|---|---|---|
| 57-62467 | 4/1982 | Japan | G06K 9/62 |
| 60-123979 | 7/1985 | Japan | G06K 9/62 |

OTHER PUBLICATIONS

Ruley, John D., "Windows for Pens", Windows Magazine, Jun. 1992, v3, n5, p. 126 (4).

Primary Examiner—Jose L. Couso
Assistant Examiner—Matthew C. Bella
Attorney, Agent, or Firm—Fitzpatrick, Cella, Harper & Scinto

[57] ABSTRACT

A hand-held computer with an input pen capable of hand-writing recognition. Characters are inputted by a user's manual operation with the input pen on a transparent coordinate input plate in front of a display screen. The computer discriminates pen-input characteristic of the user, and selects a character-recognition dictionary based on the discrimination result.

10 Claims, 52 Drawing Sheets

| CHANNEL | | 0 | 1 |
|---|---|---|---|
| A | OUTPUT | c | e |
| | INPUT | d | d |
| B | OUTPUT | a | g |
| | INPUT | b | f |

INFORMATION PROCESSING APPARATUS AND CONTROL METHOD THEREOF HAVING USER CHARACTER RECOGNITION

BACKGROUND OF THE INVENTION

The present invention relates to an electronic apparatus and a control method for the apparatus and, more particularly, to an information processing apparatus having an input device such as an input pen and a control method for the apparatus.

Conventionally, various apparatuses, such as a personal computer and a word processor have been proposed as information processing apparatuses of this type. These apparatuses display character data of a document and that of a program, and perform editing, search and other processings.

Further, various coordinate input devices comprising an input pen and an input tablet are used for inputting handwritten characters and figures into the information processor. One of these input devices is used with an apparatus which performs character recognition based on an input character pattern using a pattern matching method, as well as an apparatus which stores an input locus and outputs the stored locus.

The pattern matching apparatus has a pattern-matching dictionary for comparison with an input character pattern so as to have a high character recognition rate in recognition of various handwritten characters to be inputted.

However, the pattern-matching dictionary is not complete, therefore it often makes erroneous recognition. For this reason, the apparatus requires a user to write legibly.

One solution to this inconvenience is preparing a plurality of pattern-matching dictionaries for various handwritings and switching the dictionaries based upon the user's handwriting feature.

However, this requires that the pattern-matching dictionaries are switched every time when another user having a different handwriting feature makes character-input. Further, the user has to know what dictionary is currently being used. This also makes it inconvenient for the user.

Recently, pen-input computer has attracted public attention. One of the improvements in operability of this apparatus is changing its display direction in accordance with a direction from which a user accesses the apparatus. This allows the user, who is not necessarily in a position facing the front of the apparatus, to see a displayed image in a proper direction to the user.

One possible means for switching the display directions is a logical or physical switch to designate a direction as the top of an image to be displayed. However, this requires the user to manipulate the switch whenever an input direction (i.e., a direction in which a user is located, and from which the user makes input) changes.

In addition, in a case where this type of apparatus is used for general purposes and the number of application software increases, it is necessary that the software itself has the direction changing function, otherwise, the display direction must be changed by application.

SUMMARY OF THE INVENTION

The present invention has been made in consideration of the above situation, and has as its object to provide an electronic apparatus and a control method which automatically switches character-recognition dictionaries for a plurality of users without any specific manual setting.

Another object of the present invention is to provide an electronic apparatus and a control method for displaying an image in a direction always proper with respect to an input direction.

A further object of the present invention is to provide an electronic apparatus and a control method capable of displaying an image in a direction always proper with respect to a direction in which a user stands, independent of an application program.

Still another object of the present invention is to provide an electronic apparatus system and a control method for connecting a hand-held computer with a functional extension device in an arbitrary connecting direction, i.e., a direction to which the shorter or longer side of the computer is parallel when the computer is connected with the functional extension device, and displaying an image in a direction proper with respect to an input direction.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

[First Embodiment]

<External Appearance of Apparatus (FIG. 2)>

Figure 2:
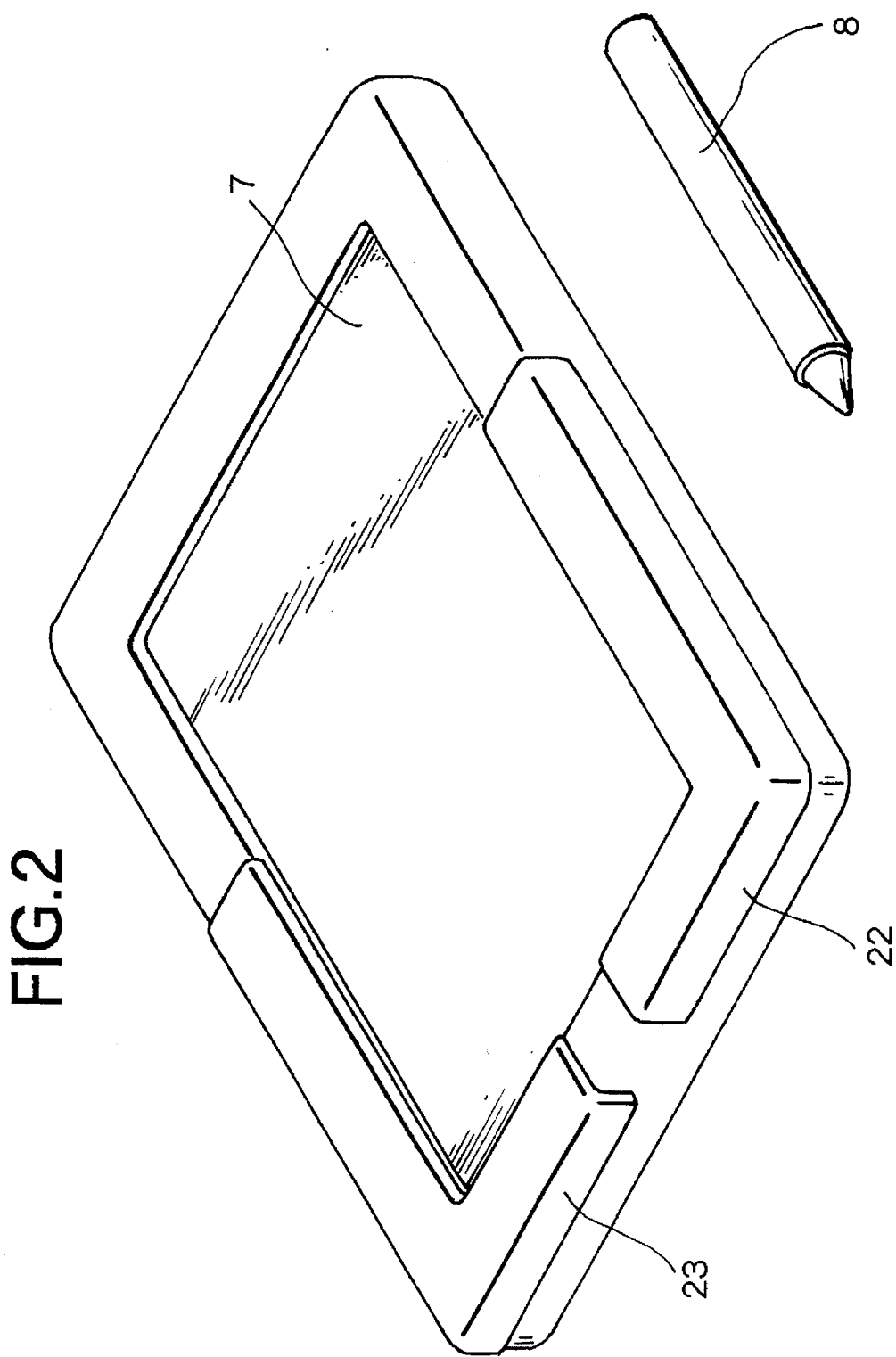
FIG. 2 is a perspective view of the information processing apparatus in the first embodiment.

FIG. 2 is a perspective view of the information processing apparatus according to the first embodiment. The apparatus comprises a coordinate input device for inputting information by designating coordinate points using an input pen.

In FIG. 2, reference numeral 8 denotes an input pen for designating coordinates; 7, an input tablet for inputting information; and 22 and 23, palm rests on which a user's hand is placed upon inputting. The palm rest 22 is used for right-handed input, and the palm rest 23, for left-handed input. Note that the input tablet 7 is a transparent board and it includes an LCD (liquid crystal display) beneath the board, to sequentially detecting strokes inputted by the user with the input pen 8 and display the strokes in lines. The above construction allows the user to make almost arbitrary handwriting-input as if the user is writing on a sheet of paper.

Although the apparatus of this embodiment is not merely a character recognition apparatus but an information processor for document editing, the feature of the present invention resides in the character recognition upon input operation. Therefore, description will be made only upon character recognition of the apparatus.

<Configuration of Apparatus (FIG. 1)>

Figure 1:
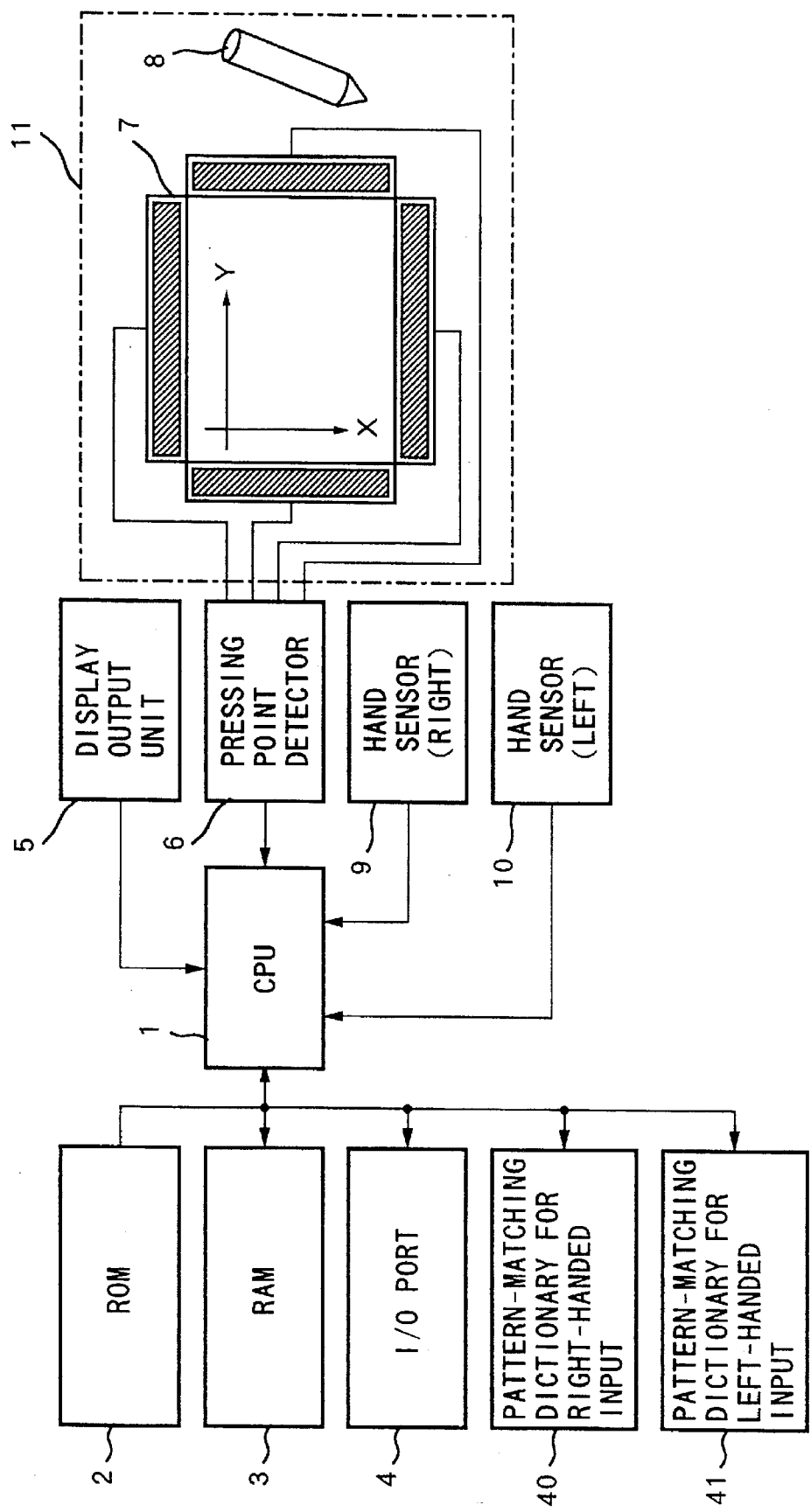
FIG. 1 is a block diagram showing the configuration of an information processing apparatus according to a first embodiment of the present invention.

FIG. 1 shows the configuration of the information processing apparatus of the first embodiment. Numeral 1 denotes a CPU which controls the overall apparatus, with storing control data into a RAM 3, in accordance with programs stored in a ROM 2; 4, an I/O port connected to peripheral devices such as a printer, keyboard and a modem, inputs/outputs data into/from the peripheral devices; 5, a display output unit comprising an LCD for displaying images and character data. Note that the display output unit 5 may comprise a CRT or other types of displays as well as an LCD.

Numeral 11 denotes a coordinate input device which comprises a digitizer using a resistance film. Note that any other digitizer may be applicable.

Numeral 7 denotes a transparent input tablet 7 which also employs a resistance film. When the user presses the tablet surface with the input pen 8, the input tablet 7 inputs corresponding coordinates. The tablet 7 comprises a glass plate on which a resistance film is formed and a PET (Polyethylene Terephthalate) film. The resistance film on the glass plate is formed by vacuum evaporation or printing using material e.g. ITO (Indium Tin Oxide). The glass plate and the PET film are arranged in layers in a manner that the resistance surfaces of the glass plate and the film oppose to each other. Further, a minute amount of spacer (not shown) such as silicon rubber is provided between the glass plate and the PET film so as to bring the resistance films in contact only at a point where the film surface is pressed. These resistance films of the glass plate and the PET film have a conductor pattern at the both ends for applying a voltage for measuring a voltage applied to the resistance films or a potential between the applied voltages at both ends of the films.

Numeral 6 denotes a pressed-point detector which applies a constant voltage applied to both ends of the resistance films and measures a potential between the applied voltages. The pressed-point detector 6 detects a pressed-point on the input tablet 7 from the measured potential level.

Numerals 9 and 10 denote hand sensors which respectively detect whether or not a predetermined pressure is applied on the palm rests 22 and 23. When the user put his/her hand on the palm rest 22 or 23 for inputting, the hand sensors 9 and 10 detect that the palm rest 22 or 23 receives the pressure, and output detection results to the CPU 1. Note that the hand sensors 9 and 10 may detect a temperature and other values as well as the pressure.

Numerals 40 and 41 denote pattern-matching dictionaries used upon character recognition to be described later.

<Character Recognition (FIGS. 3-5)>

The character recognition by the apparatus according to the first embodiment will be briefly described below. If a state where the user's hand is placed on the palm rest 22 is detected, it is determined that the user has the input pen 8 in his/her right hand. On the other hand, if a state where the user's hand is placed on the palm rest 23 is detected, it is determined that the user has the input pen 8 in his/her left hand. Then, one of the pattern-matching dictionaries 40 or 41 is selected based on the determination result.

Figure 3:
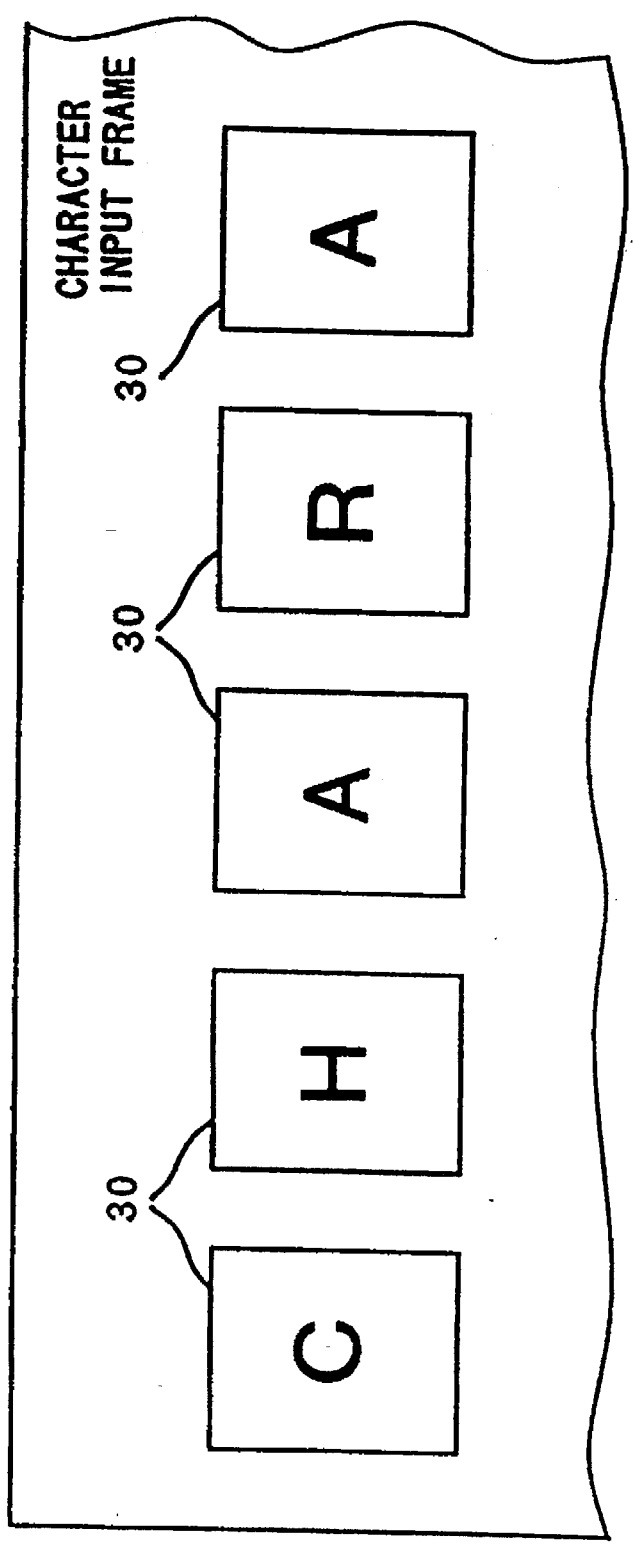
FIG. 3 illustrates a character-input screen image of the information processing apparatus of the first embodiment.

FIG. 3 shows a part of a displayed screen image on the display output unit 5 for character-recognition input. In FIG. 3, numeral 30 denotes a character input frame. When the user writes a character within the character input frame 30 on the input tablet 7 with the input pen 8, the character pattern is recognized by the CPU 1 in accordance with, e.g., a pattern-matching method, and outputted to a document file.

The character recognition starts, e.g., at a point where a predetermined period has elapsed from a character pattern was inputted within one input frame, at a point where a predetermined instruction with the pen (character recognition instruction) is made, or at a point where another character was inputted within the next input frame.

Figure 4:
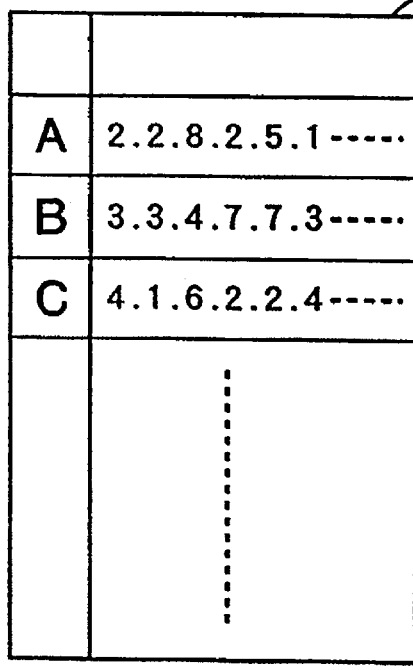
FIG. 4 illustrates the structure of a pattern-matching dictionary for right-handed input.
Figure 5:
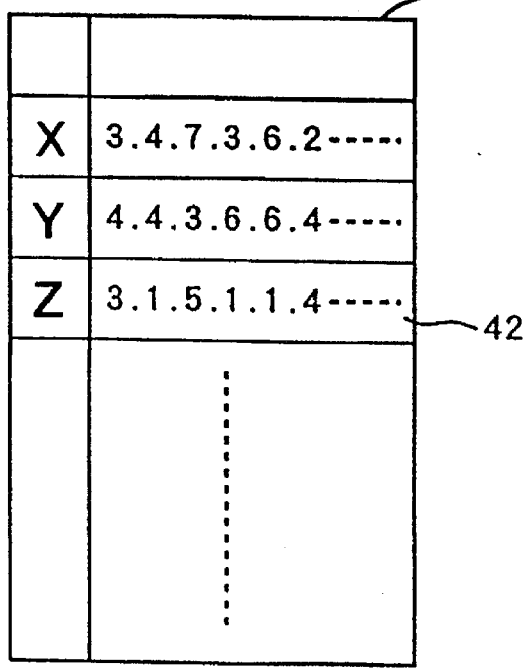
FIG. 5 illustrates the structure of a pattern-matching dictionary for left-handed input.

FIGS. 4 and 5 show the structure of the pattern-matching dictionaries 40 and 41. The dictionary 40 is used for pattern-matching for right-handed input, and the dictionary 41, for left-handed input. That is, the pattern-matching dictionaries 40 and 41 are used so as to have a highest character recognition rate regarding various handwritings by a right-hander and a left-hander.

Next, the processing operation according to the first embodiment will be described with reference to the flowchart in FIG. 6. It should be noted that the program for this operation has already been stored in the ROM 2.

In this embodiment, the pattern-matching dictionary is selected based on the detection results by the hand sensors 9 and 10, i.e., which of the palm rests 22 and 23 is pressed.

In step S101, whether or not coordinate-input has been made is determined. If YES, the process proceeds to step S102, while if NO, returns to step S101 in which input is awaited. Thereafter, when pen-input with the input pen is detected, the process proceeds to step S102 in which character pattern input is made based on the locus of the input coordinates. As character pattern input for one character is completed, the process proceeds to step S103.

In step S103, a pressed/unpressed state of the left palm rest 23 is read from the left hand sensor 10. Similarly, a pressed/unpressed state of the right palm rest 22 is read from the right hand sensor 9 in step S104. In step S105, whether or not the left palm rest 23 is pressed or not is determined based on the state inputted from the sensor 10. If YES, the process proceeds to step S106, while if NO, proceeds to step S107. In step S106, the dictionary 41 for left-handed input is selected, then, the process proceeds to step S110.

In step S107, whether or not the right palm rest 22 is pressed or not is determined based on the state read from the sensor 9. If YES, the process proceeds to step S108, while if NO, proceeds to step S109. In step S108, the dictionary 40 for right-handed input is selected, then, the process proceeds to step S110.

If no pressed state is detected, it can be considered that the sensors do not work, otherwise the user inputs from an inappropriate direction (e.g., from the rear side of the apparatus). In this case, the process does not invalidate the pen-input, but merely outputs an alarm in step S109 and advances to step S110. It should be noted that the pattern-matching dictionary at this time is one used in the previous processing, for with which hand the user holds the input pen cannot be determined.

In step S110, pattern matching is performed based on the input character pattern and the selected dictionary. Then in step S111, the resulting character and its code are outputted at a predetermined position on the display output unit 5.

As described above, according to the present embodiment, the hand sensors 9 and 10 detect the states of the right and left palm rests 22 and 23, and the pattern-matching dictionaries are switched based on the detection results. Accordingly, the user does not have to change any particular setting for selecting a pattern-matching dictionary for right-handed or left-handed input. This enables an information processing apparatus having a higher character recognition rate.

Further, the present embodiment employs two kinds of pattern-matching dictionaries for right-handed input and left-handed input, however, the number of pattern-matching dictionaries may be increased. For example, a pattern-matching dictionary common to right-handed input and left-handed input can be added as a third dictionary. In this case, this common dictionary is set in step S110 in FIG. 5. This maintains the high character recognition rate even if the sensors are out of order or another user inputs characters with his/her hand different from the previous input.

[Second Embodiment]

The first embodiment switches the pattern-matching dictionaries based on detection of right-handed input or left-handed input as feature of the user's handwriting. The second embodiment switches dictionaries based on the user's writing pressure (pressing force upon the input tablet when writing).

In this embodiment, the construction of the information processing apparatus is identical to that of the first embodiment, therefore, the explanation of the construction will be omitted. It should be noted that the hand sensors 9 and 10 in the first embodiment detect whether or not the palm rests 22 or 23 are pressed or not, however, the hand sensors 9 and 10 according to the second embodiment output multi-level data in correspondence with detected pressures for discriminating a plurality of users. Otherwise, a pressure sensor may be provided at the pen point of the pen 8 for discriminating a user based on a detected pressure value.

In this construction, when a character pattern is inputted, the hand sensors 9 and 10 respectively detect a writing pressure on the palm rests 22 and 23, and output the detected pressure value to the CPU 1. The CPU 1 selects an appropriate pattern-matching dictionary out of dictionaries for high-pressure, intermediate-pressure and low-pressure based on the detected user's writing pressure.

As described above, the present embodiment switches the pattern-matching dictionaries by detecting the user's writing pressure, thug raising character recognition rate. It should be noted that the combination of the detection of right/left-handed input and the detection of writing pressure discriminates more users.

In the second embodiment, the users are discriminated based on the respective writing pressures. At this time, the selected dictionaries are not for personal use, though such dictionaries may be employed, if memory capacity permits. In case of personal dictionaries, the same dictionary can be selected for different users so far as their writing styles (locuses) are similar. In practice, the number of personal dictionaries is limited to N (=equal to or less than the number of users). Then a table showing the relation between personal information including, e.g., a writing pressure and data indicative of right/left-handed input and a dictionary to be selected can be generated. This also raises character recognition rate.

[Third Embodiment]

Next, the third embodiment of the present invention will be described below.

The first embodiment employs detection of pressure on the right or left palm rest for judging the user's dominant hand. In the third embodiment, a plurality of connectors connecting the input pen are provided for judgment of the dominant hand.

<External Appearance of Apparatus (FIG. 8)>

Figure 8:
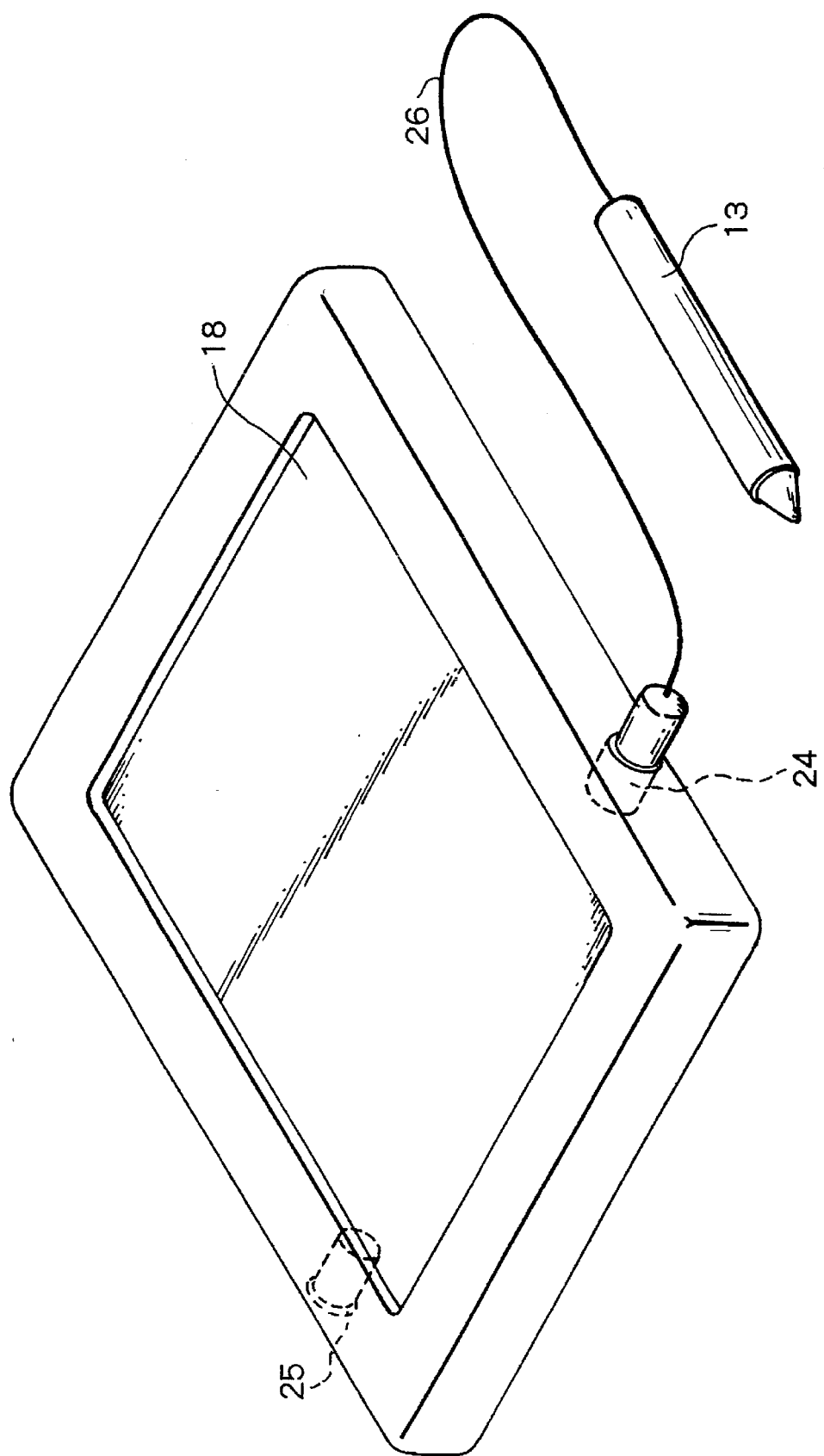
FIG. 8 is a perspective view of the information processing apparatus of the third embodiment.

FIG. 8 is a perspective view of the information processing apparatus according to the third embodiment. Note that this embodiment uses a ultrasonic digitizer as a coordinate input device.

In FIG. 8, numeral 18 denotes an input tablet for inputting coordinates; 13, an input pen, driven with a signal transferred via a connection cable 26, for designating coordinates; and 24 and 25, pen connectors for connecting the apparatus with the input pen 13. A right-handed user connects the input pen 13 to the pen connector 24, on the other hand, a left-handed user connects the input pen 13 to the pen connector 25, thus moving the connecting cable 26 to the side convenient for the user.

<Configuration of Apparatus (FIG. 7)>

Figure 7:
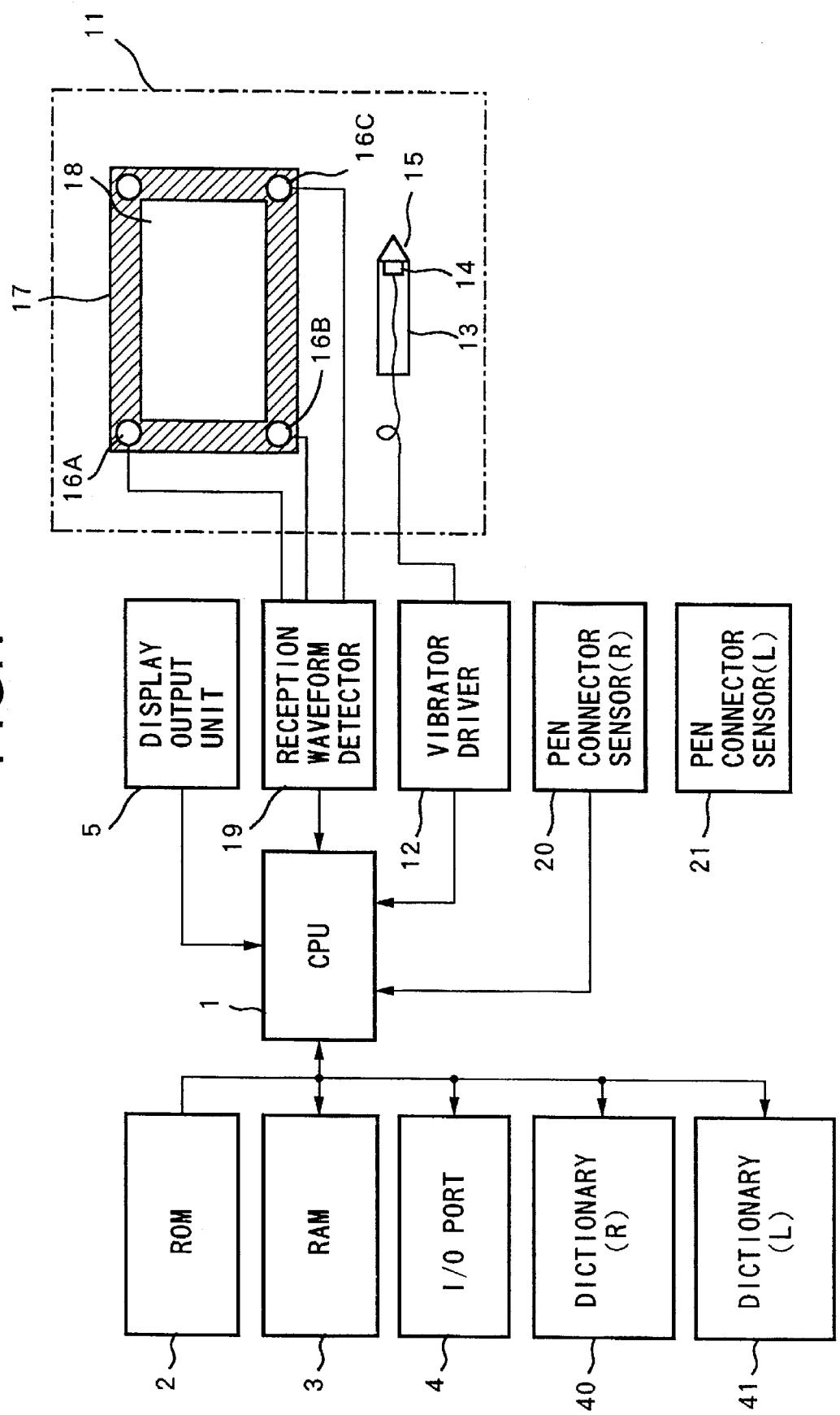
FIG. 7 is a block diagram showing the configuration of an information processing apparatus according to a third embodiment of the present invention.

FIG. 7 shows the configuration of the information processing apparatus according to the third embodiment. Note that elements corresponding to those in the first embodiment have the same reference numerals and the explanations of these elements will be omitted.

In FIG. 7, numeral 18 denotes a tablet having piezoelectric elements 16A to 16C, as ultrasonic wave sensors, around its input surface; 17, a reflection preventing member, surrounding the tablet 18, which absorbs elastic waves; 13, the input pen comprising an ultrasonic vibrator 14 and a pen point 15; 12, a vibrator driver for driving the ultrasonic vibrator 14 of the input pen 13; and 19, a reception waveform detector for inputting ultrasonic reception signals from the sensors 16A to 16C and detecting waveforms.

The vibrator driver 12 receives a start signal from the CPU 1 and generates a pulse signal. The pulse signal is applied to the ultrasonic vibrator 14 of the input pen 13 via the cable 26 to drive the vibrator 14. As this pen point 15 is pressed on the input surface of the tablet 18, the ultrasonic wave as elastic wave from the pen point 15 is propagated on the tablet 18, and received by the sensors 16A to 16C. Respective delay times tg between the point where the pen point 15 is pressed on the tablet 18 and the point where the ultrasonic wave is received by the sensors are synchronized with the start signal. The reception waveform detector 19 input the resulting signals and outputs reception waveforms. The arithmetic controller 11 calculates coordinates of the pressed-point by the pen point 15 from the outputs from the reception waveform detector 19.

Numerals 20 and 21 denote a right pen-connector sensor and a left pen-connector sensor for detecting whether or not the pen connectors 24 and 25 is connected with the input pen 13. The CPU 1 determines which of the right connector 24 and the left connector 25 is connected with the input pen 13 by the pen-connector sensors 20 and 21.

Figure 6:
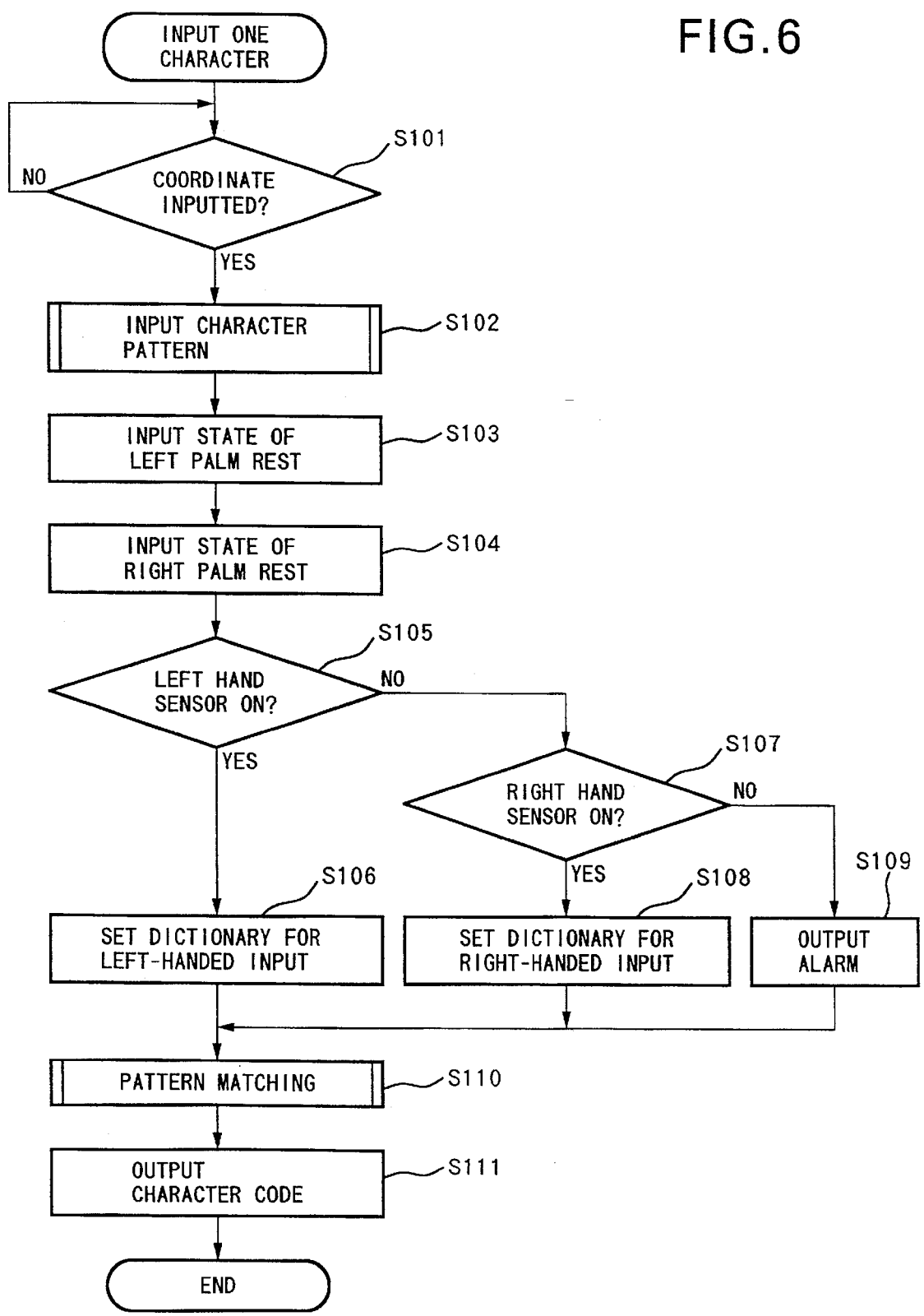
FIG. 6 is a flowchart showing an operation procedure of the first embodiment.

The control procedure by the CPU 1 in this embodiment also follows the flowchart shown in FIG. 6.

That is, in the third embodiment, steps S101 and 102 are corresponding to those in the first embodiment. In steps S102 and S103, signals from the pen-connector sensors 20 and 21 are detected. In steps S105 to S109, a pattern-matching dictionary is selected based on the detection signals from the sensors 20 and 21. Then, in steps S110, character recognition is made using the selected dictionary, and outputting of a character code as a recognition result is made in step S111.

As described above, the third embodiment switches the pattern-matching dictionaries by detecting the position where the input pen is connected, thus attains a similar advantage to the foregoing embodiments.

[Fourth Embodiment]

In an information processing apparatus having a coordinate data input device with an input pen, a first method for specifying an input direction (a direction from which a user makes character-input), is displaying an input-direction selection image for the user to select an input direction, and performing-input operation in accordance with the selected input direction. A second method is detecting the inclination of the input pen and specifying the input direction based on the detection result. Note that as a mechanism for detecting the inclination of the input pen, a quicksilver switch may be provided in the input pen, or a light-emitting element and a light-receiving element may be provided in the input pen so that light is emitted from the light-emitting element only when the pen is held at a right angle, and is received by the light-receiving element.

However, the first method requires the user to select an input direction each time the user desires to change the input direction. The second method causes complexity in the construction of the input pen. Further, the second method requires registration of individual input directions, for users have different way of holding the input pen.

The fourth embodiment solves such problems by detecting an individual dominant hand and specifying an input direction based on the detected dominant hand.

Figure 9:
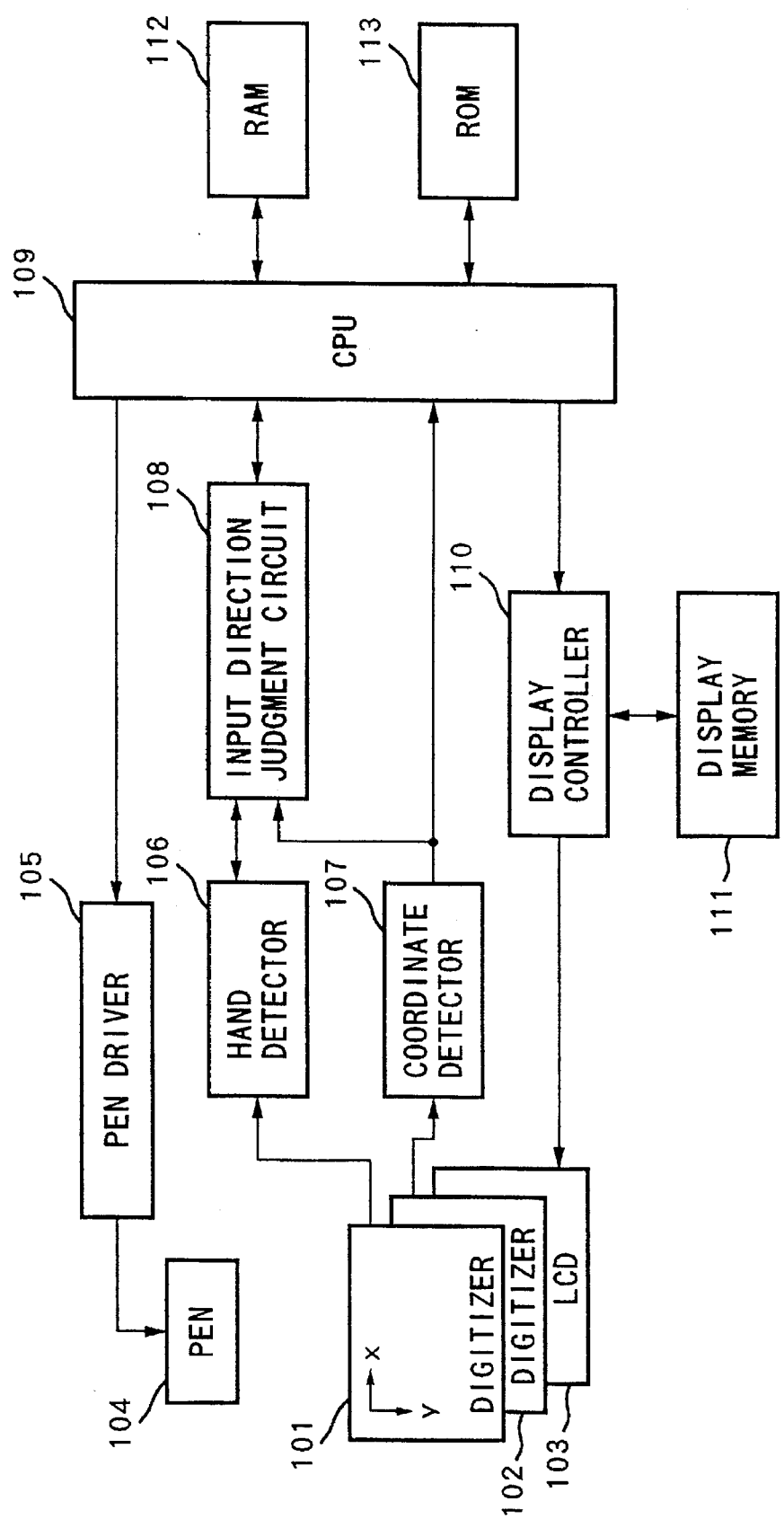
FIG. 9 is a block diagram showing the configuration of an information processing apparatus according to a fourth embodiment of the present invention.

FIG. 9 shows a hardware construction of the fourth embodiment. Numeral 101 denotes a resistance-film type digitizer similar to the transparent input tablet 7 of the first embodiment; 102, an ultrasonic-type digitizer similar to the tablet 18 of the third embodiment; 103, an LCD (liquid crystal display); 104, a pen for inputting coordinate data by contacting the digitizer surface; 105, a pen driver for vibrating the pen 104 at a predetermined frequency; and 106, a coordinate detector (dominant-hand detector) for detecting coordinates based on by positions of the pen and the user's hand, for the digitizer 101. The coordinate detector 107 detects coordinates from pen-input the writing style of the pen-input. Numeral 107 denotes a coordinate detector for the digitizer 102, for detecting pen-input coordinates. Numeral 108 denotes an input direction judgment circuit which inputs detection results from the dominant-hand detector 106 and the coordinate detector 107 and judges the input direction; 109, a CPU for controlling the overall apparatus; 110, a display controller for controlling the LCD 103 and a display memory 111; 112, a RAM; and 113, a ROM.

The principle of input-coordinate detection at the resistance-film type digitizer will be described with reference to FIG. 10.

The coordinate input unit has two resistance films 201 and 202 in layers with a spacer such as a silicon rubber having a predetermined thickness between them. Usually these resistance films are not in contact, however, when the coordinate input surface receives a pressing, the films contact with each other at the pressed-point. As shown in FIG. 10, the film 201 have electrodes A and B at its two opposing sides, and the film 202, C and D also at its two opposing sides. These electrodes are connected to the coordinate detector 107 and are provided with a predetermined voltage.

Figure 10:
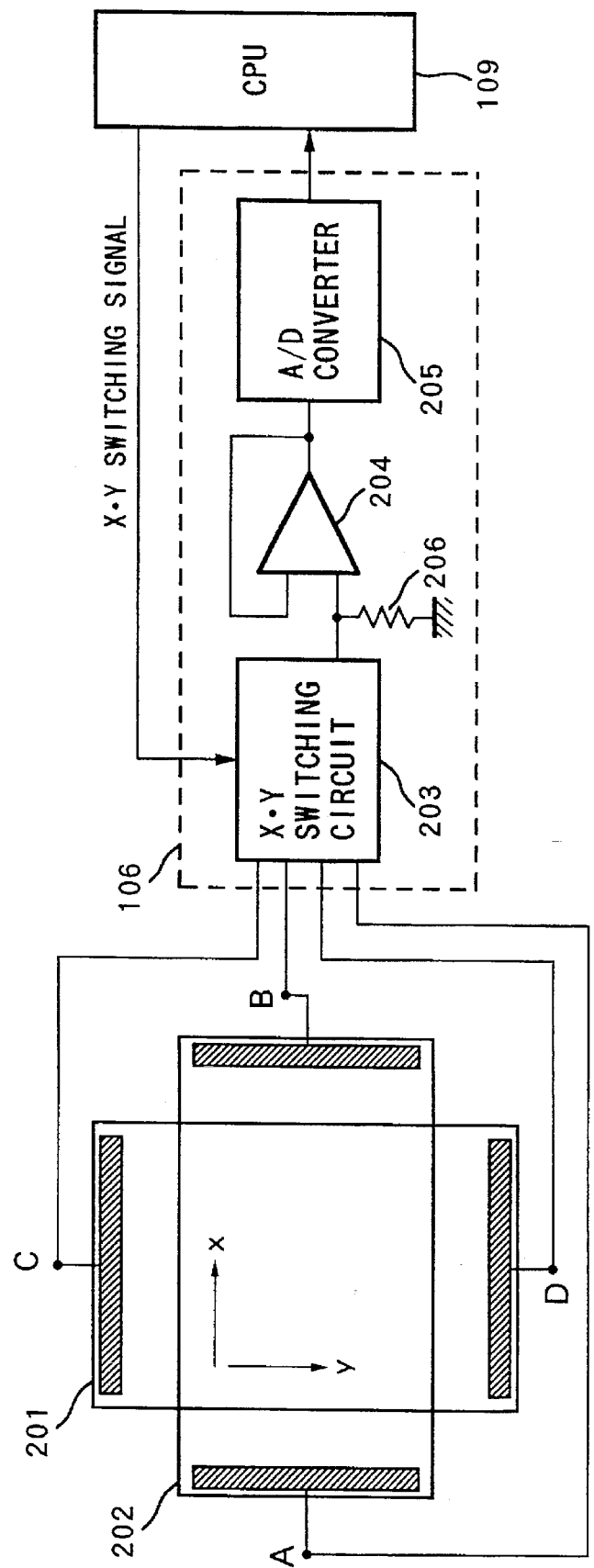
FIG. 10 is a block diagram showing elements around a coordinate detector according to the fourth embodiment.
Figure 11:
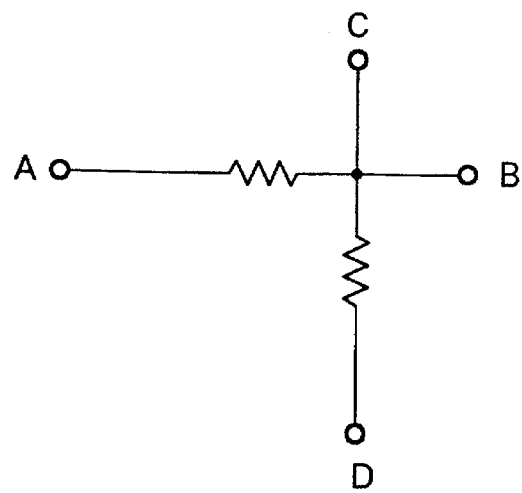
FIGS. 11 to 13 are explanatory views for the principle of coordinate detection using a resistance film according to the fourth embodiment.
Figure 12:
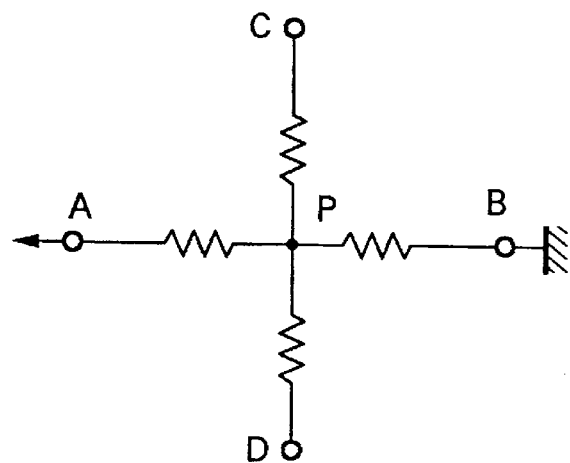
Figure 13:
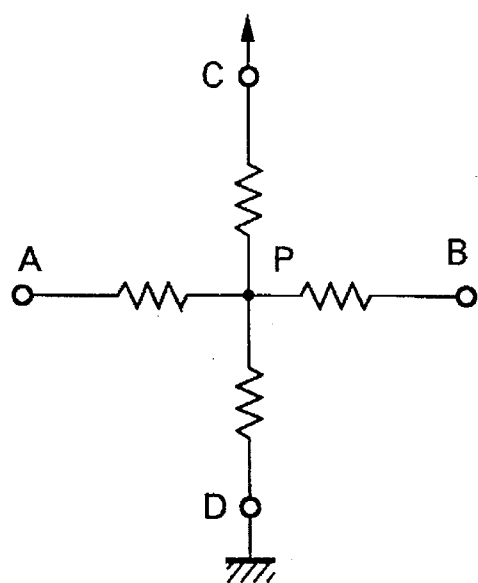

FIG. 11 shows a state where there is no pressing upon the coordinate-input surface. When a pressing is made, the two resistance films contact with each other at a contact point P as shown in FIGS. 12 and 13. The coordinate detector 107 applies a predetermined voltage Vcc between the electrodes A and B or between the electrodes C and D and detects a voltage at the point P using a voltage detector having a high resistance from the electrode C (or D) or A (or B). The coordinate detector detects X and Y components of the coordinate value in this manner. The coordinate detector 107 has a construction, e.g., as shown in FIG. 10.

In FIG. 10, numeral 203 denotes a switching circuit for switching connection between the states as shown in FIGS. 12 and 13; 204, an operational amplifier for amplifying the voltage at the contact point P obtained via the switching circuit 203. The operational amplifier 204, which measures the voltage at the point P obtained via the switching circuit 203, has a construction having a high input resistance as a voltage follower, and therefore it can ignore voltage drop by the resistance films between the contact point and the detection point. The voltage at the input terminal of the operational amplifier 204 is pulled-down to a ground voltage by a high resistance of several M Ω. When there is no input from the resistance films, zero volt is detected via the amplifier 204. The voltage information from the amplifier enters the CPU 109 via an A/D converter 205.

Next, the operation of the input direction judgment circuit 108 having the construction in FIG. 9 will be described. In this embodiment, the input direction judgment circuit 108 makes judgment with respect to an input from an upper direction, a lower direction, a right direction and a left direction. First, whether a user is right-handed or left-handed is registered. This is made by displaying a selection image for the user to select right-handed input or left-handed input by pen-input. The registration result is stored into the input direction judgment circuit 108.

Assuming that the user makes a pen-input on a displayed image, i.e., the user contacts the display with the pen 104 vibrated by the pen driver 105 at the contact point P (x1, y1), the vibration of the pen 104 is propagated on the digitizer 102. Then the coordinate detector 107 detects the input coordinates. More briefly, the vibration (ultrasonic wave) from the pen 104 is propagated around on the surface of the digitizer 102 with the contact point as the central point. Accordingly, the distance between the vibration detector and the contact point can be calculated by measuring delay time from the contact time to the time at which the transmitted vibration is detected. The present embodiment has a plurality of vibration detectors for detecting the contact point of the pen 104. It should be noted that in this case, the coordinate detection does not receive any influence from the user's hand contacts style by virtue of the nature of ultrasonic wave.

When handwriting is performed with the pen, it is natural that a part of the writer's hand contacts a part of the tablet surface while the pen point is pressed on the tablet surface. That is, the "dominant hand" is the hand that contacts the tablet.

Upon coordinate inputting with the pen 104, the digitizer 101 detects a position where the user's hand contacts the tablet surface.

Figure 14:
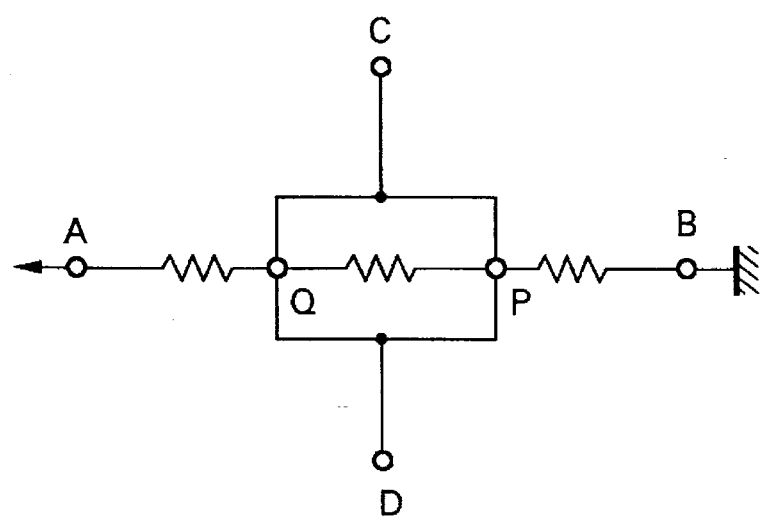
FIGS. 14 to 17 are explanatory views for the principle of dominant-hand detection in the fourth embodiment.
Figure 15:
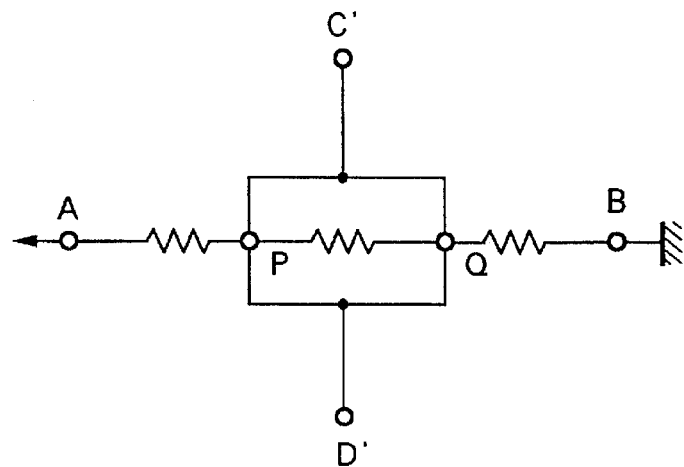
Figure 16:
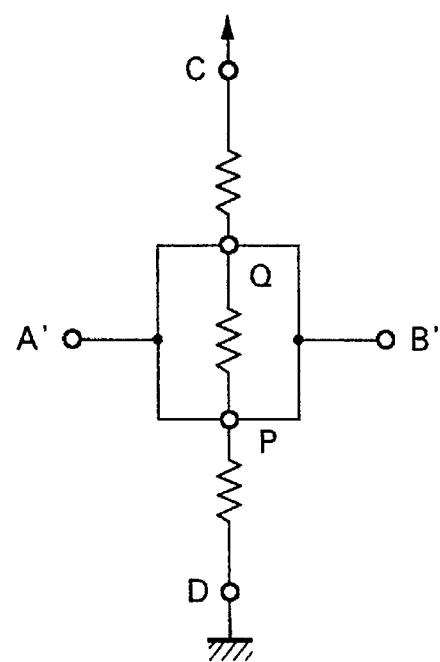
Figure 17:
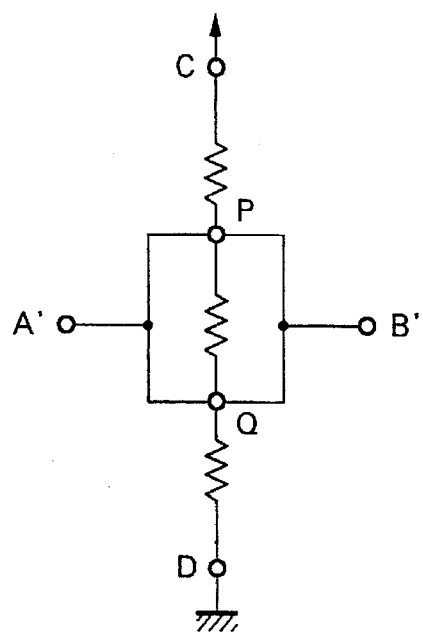

If the hand contact point is Q(x2, y2), the states in FIGS. 12 and 13 become as shown in FIGS. 14 to 17. FIG. 14 shows a state in the coordinate system in FIG. 10, where the x-coordinate of the contact point Q is smaller than the x-coordinate of the contact point P. FIG. 15 shows a state where the x-coordinate of the contact point Q is larger than that of the contact point P. Similarly, FIG. 16 shows a state where the y coordinate of the contact point Q is smaller than that of the contact point P, and FIG. 17 shows a state where the y-coordinate of the contact point Q is larger than that of the contact point P.

Figure 18:
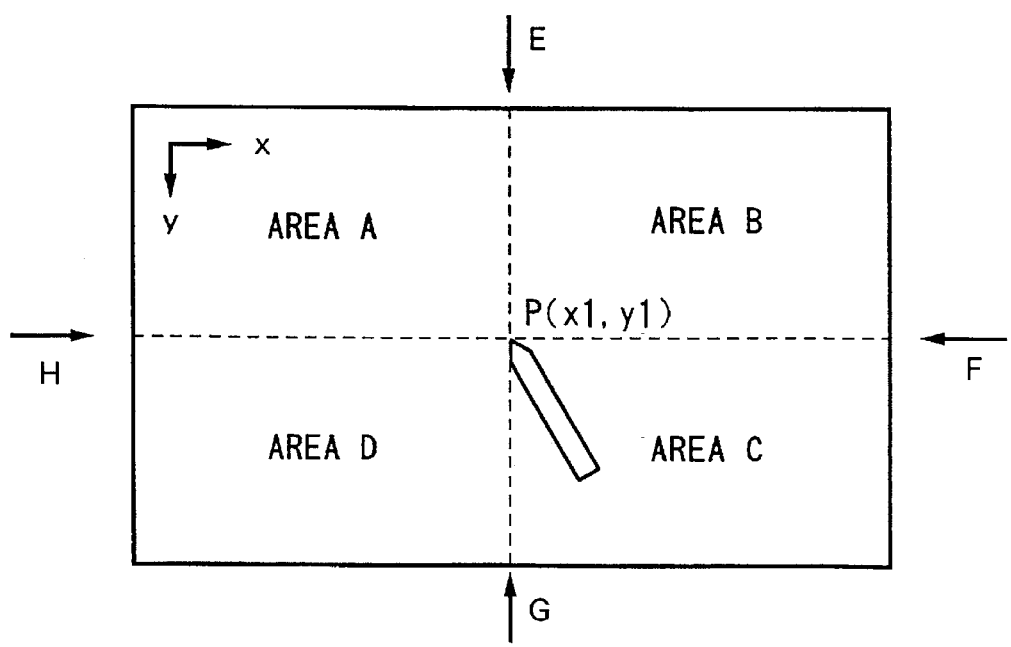
FIG. 18 illustrates dominant-hand areas in the fourth embodiment.

FIG. 18 shows the positional relation between a pen-input and a hand-contact point. In FIG. 18, an area A corresponds to the states shown in FIGS. 14 and 16; an area B, the states in FIGS. 15 and 16; an area C, the states in FIGS. 15 and 17; and an area D, the states in FIGS. 14 and 17. The voltage detected by the digitizer 101 at this time is different from that detected when there is no hand-contact.

When there is no hand-contact, a voltage Vc (or Vd) at a point C in FIG. 11 is expressed with the coordinates (x1 y1) detected by a detector of the digitizer 102 as follows (the LCD has 640 * 480 dots):

Vc=Vd=(x1/640) * Vcc (a)

Next, where there is a hand-contact, the comparison between the Vc (or Vd) and Vc' (or Vd') in FIG. 14 becomes:

Vc (=Vd)<Vc' (=Vd') (b)

Similarly, in case of FIG. 15:

Vc (=Vd)>Vc' (=Vd') (c)

The relation between the hand-contact and the pen-input can be judged with respect to the x-axis from the above expressions.

Similarly, in case of FIGS. 16 and 17, the relation between the hand-contact an the pen-input can be judged with respect to the y-axis.

The input direction judgment circuit 108 makes judgment of the input direction in accordance with the following judgment rules:

(1) If Vc (=Vd)<Vc' (=Vd'), Va (=Vb)<Va ' (=Vb ') and "the user is right-handed" or Vc (=Vd)>Vc' (=Vd'), Va (=Vb)<Va' (=Vb') and "the user is left-handed"

The input direction: E in FIG. 18

(2) If Vc (=Vd )>vc ' (=Vd '), Va (=Vb)<Va' (=Vb') and "the user is right-handed" or Vc (=Vd)>Vc' (=Vd'), Va (=Vb)>Va' (=Vb') and "the user is left-handed"

The input direction: F in FIG. 18

(3) If vc (=Vd)>Vc' (=Vd'), Va (=Vb)>Va' (=Vb') and "the user is right-handed" or Vc (=Vd)<Vc' (=Vd'), Va (=Vb)>Va' (=Vb') and "the user is left-handed"

The input direction: G in FIG. 18

(4) If Vc (=Vd)<Vc' (=Vd'), Va (=Vb)>Va' (=Vb') and "the user is right-handed" or Vc (=Vd)<vc, (=Vd'), Va (=Vb)<Va' (=Vb') and "the user is left-handed"

The input direction: H in FIG. 18

The input direction judgment result is employed for controlling image display direction on the LCD 103.

Figure 19:
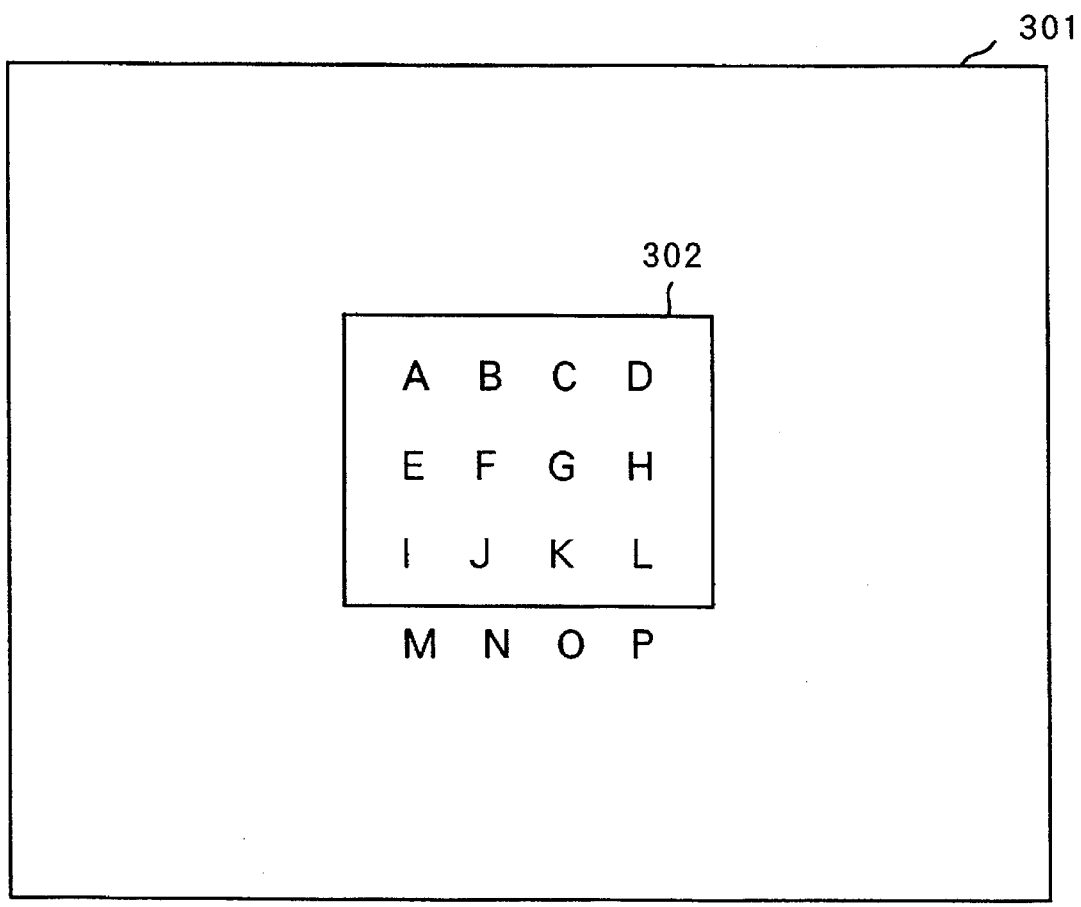
FIG. 19 illustrates the relation between a whole image area and a display area in the fourth embodiment.
Figure 20:
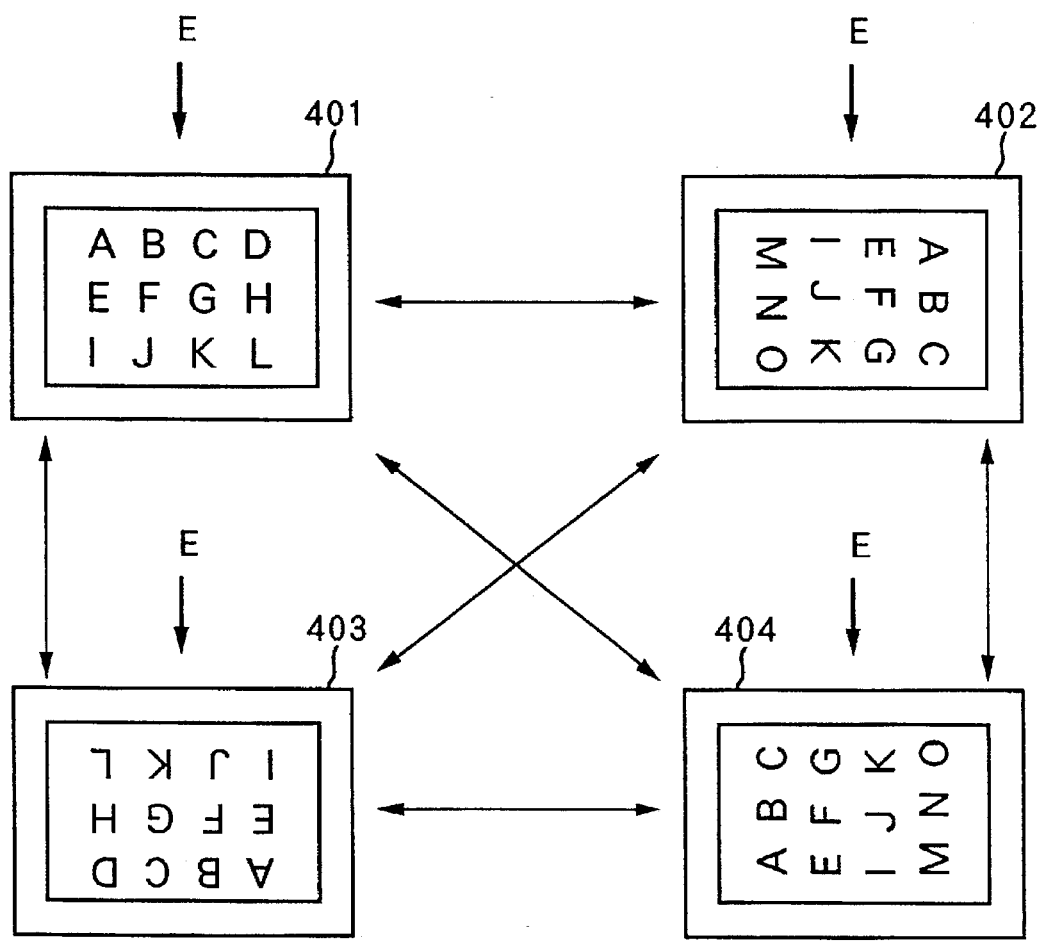
FIG. 20 illustrates the relation between display directions and displayed contents in the fourth embodiment.

FIG. 19 shows the relation between a whole logical image area 301 and a physical display area 302 within the RAM 112. The CPU 109 transfers data within the display area 302 through the display controller 110 to the display memory 111. That is, changing the display direction as shown by numerals 401 to 404 in FIG. 20 is made by changing transfer order of data within the display area or whole image area.

Figure 21:
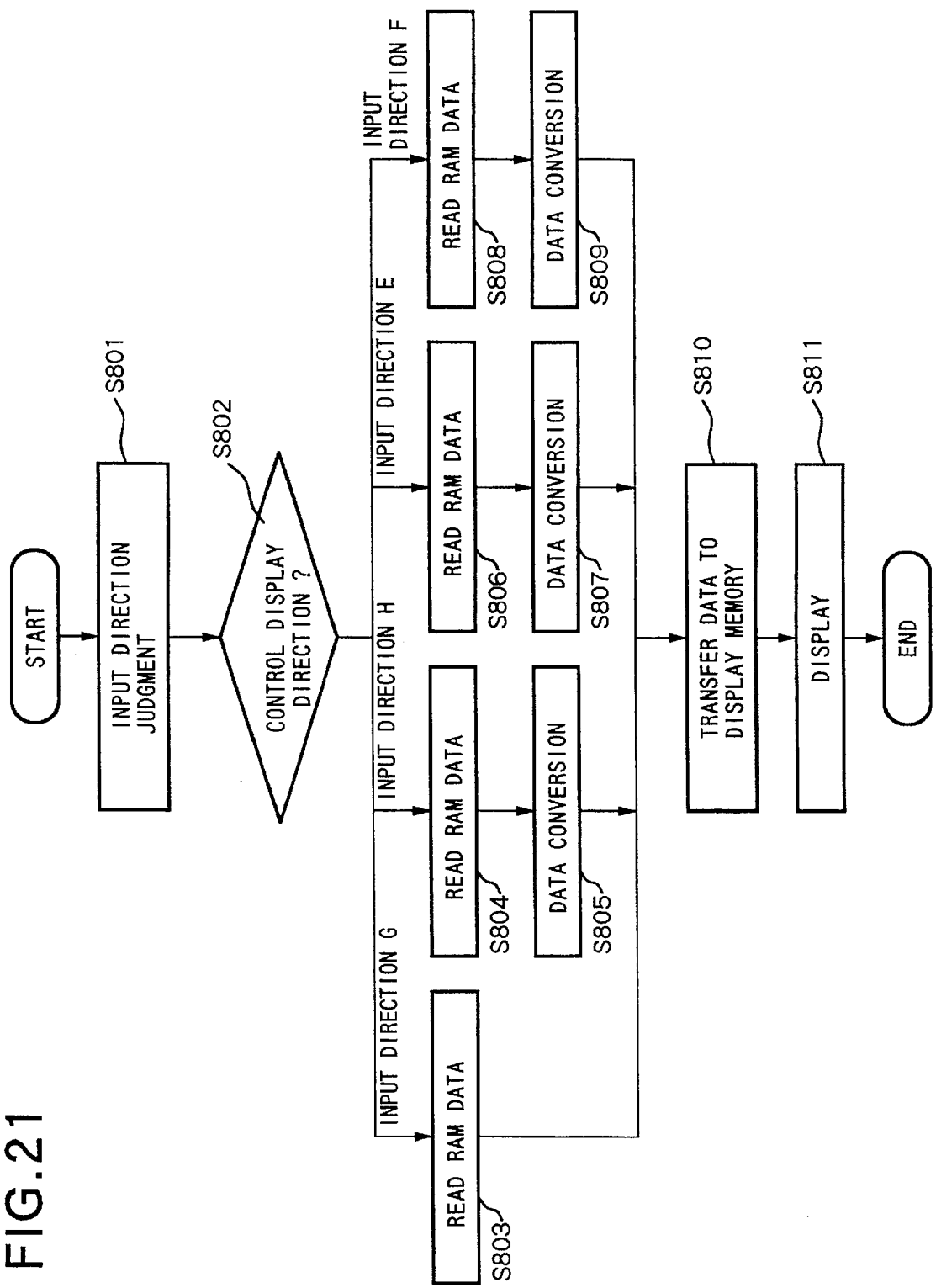
FIG. 21 is a flowchart showing a control procedure according to the fourth embodiment.

The image display direction control will be described with reference to the flowchart of FIG. 21. Note that the program for this control procedure has already been stored in the ROM 113.

In step S801, input direction judgment by the input direction judgment circuit 108 is made. In step S802, data reading and data conversion in correspondence with the input direction judged in step S801 is selected.

In FIG. 18, if it is determined that the input is in the direction G, all data within the display area 302 of the RAM area 301 is transferred to the display memory 111 without any conversion.

If it is determined that the input is in any of the directions E, F and G, data in the RAM area 601 is read out and corresponding image-turning operation (data conversion) (any of steps S805, S807, and S809) is performed (otherwise, the writing direction in which data is transferred to the display memory 111).

In any case, the process proceeds to step S810, in which the converted data is transferred through the display controller 110 to the display memory 110. In step S811, the display controller 110 outputs data for the display memory 111 to the LCD 103. In this manner, the display direction is changed.

The above operation obtains a display direction in accordance with an input direction from which the user makes pen-input by automatically detecting the input direction and converting data in accordance with the input direction.

The present embodiment detects the positional relation between the pen-contact point P and the hand-contact point Q by comparing the coordinates of the contact point P detected by the digitizer 102 and the coordinates of the contact point Q detected by the digitizer 101. This positional relation may be detected by other means.

It should be noted that if the input surface is too small, pressure sensors provided to the palm rests as described in the first embodiment are advantageous, while if the input surface is large, the arrangement of the fourth embodiment is advantageous.

[Fifth Embodiment]

The fourth embodiment employs the resistance film-type digitizer and the ultrasonic-type digitizer in layers for detecting pen-input coordinates and a hand-contact point, however, the present invention is not limited to this arrangement. In addition, the input-direction judgment result can be utilized for other processings than changing the display direction. The fifth embodiment detects a hand-contact position by switches which work as palm rests on the frame of the display and employs the input- direction judgment result for character recognition. Further, the fifth embodiment makes input-direction judgment in upward/downward directions, at the same time, makes judgment of right-handed/left-handed input of the user.

Figure 22:
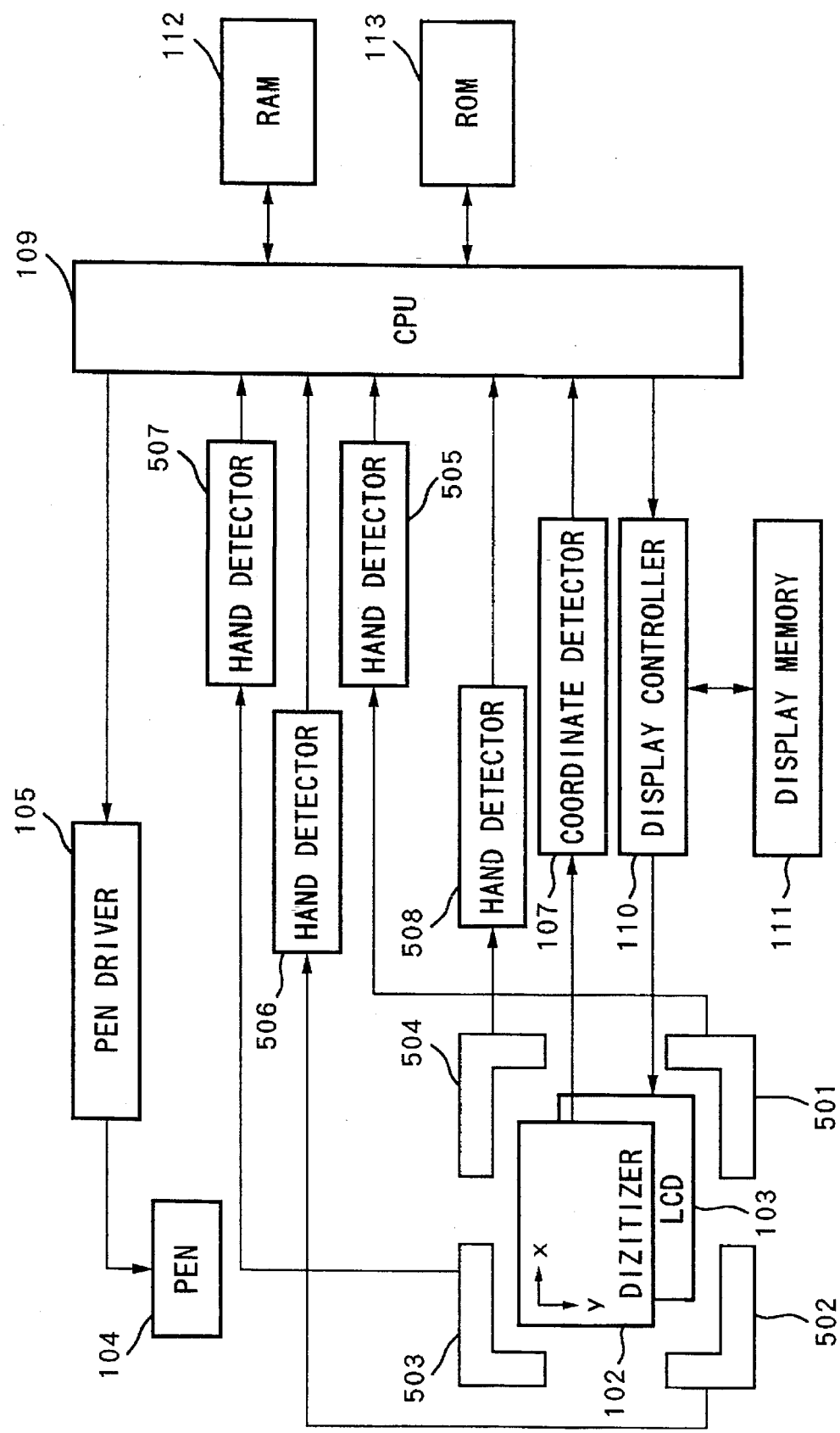
FIG. 22 is a block diagram showing the configuration of an information processing apparatus according to a fifth embodiment.
Figure 23:
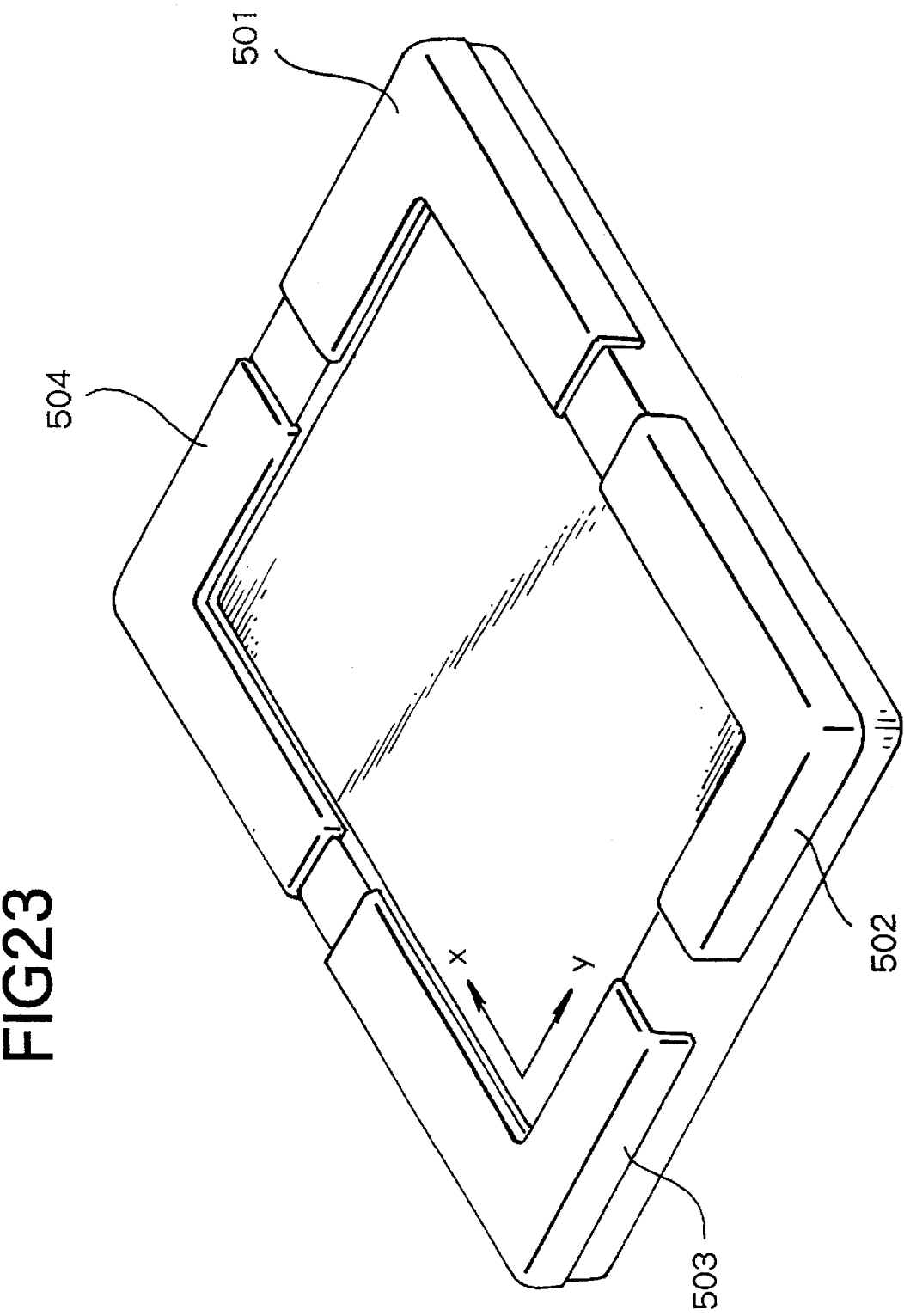
FIG. 23 is a perspective view of the information processing apparatus of the fifth embodiment.

FIG. 22 shows the hardware configuration of an information processing apparatus according to a fifth embodiment. Numerals 501 to 504 denote hand detection pads which respectively detect hand-contact accompanying pen-input with an incorporated pressure sensor (not shown). FIG. 23 shows as an example of the external appearance of the apparatus.

When a user makes pen-input from one direction, the digitizer 102 and the coordinate detector 107 detect input coordinates. At the same time, hand detectors 505 to 508 detect hand-contact with the hand detection pads 501 to 504. The input direction (E, F, G, H in FIG. 18) and right-handed/left-handed input are judged based on the detection results from the hand detectors:

(a) Detected by detector 505: direction G, right-handed
(b) Detected by detector 506: direction G, left-handed
(c) Detected by detector 507: direction E, right-handed
(d) Detected by detector 508: direction E, left-handed Thus obtained input direction judgment result is employed in data conversion for character recognition. If the input direction judgment is upward, the input data is converted in accordance with the following equation (the LCD 103 has 640 * 480 dots):

(x, y)=(640-x1, 480-y1) x, y: coordinate data for user x1, y1: absolute coordinate data If the input direction is downward, no data conversion is performed.

Figure 24:
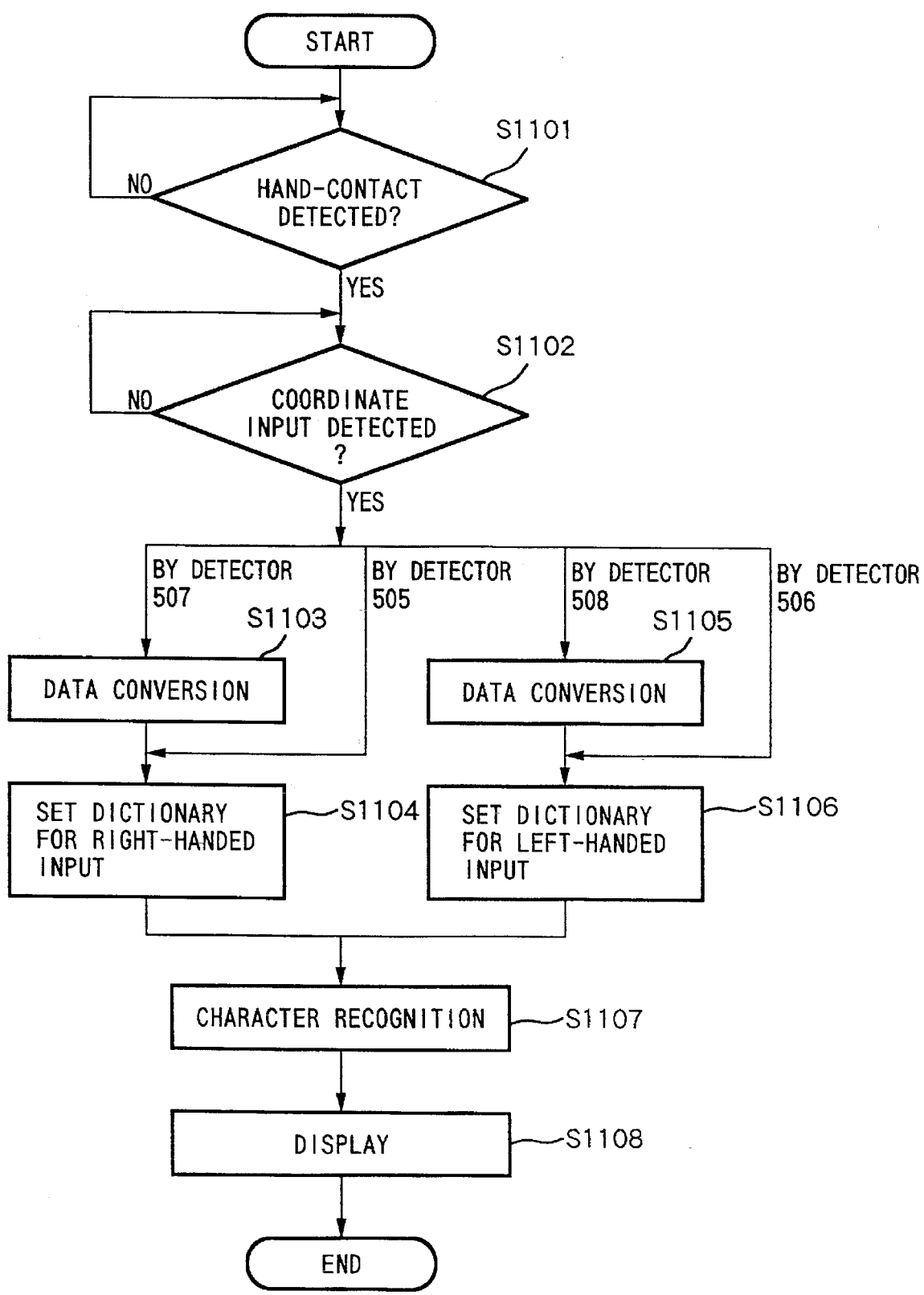
FIG. 24 is a flowchart showing a control procedure according to the fifth embodiment.

The operation according to the fifth embodiment will be described with reference to the flowchart of FIG. 24.

In step S1101, whether or not hand-contact has been detected is determined, and in step S1102, whether or not input coordinates have been detected is determined. If YES in both steps S1101 and S1102, processing corresponding to a hand-contact detection result is performed.

If the hand-contact is detected by the hand detector 507, the input coordinate data is converted in accordance with the above conversion equation in step S1103. In step S1104, a dictionary for right-handed input is set.

If the hand-contact is detected by the hand detector 508, the input coordinate data is converted in step S1105, and a dictionary for left-handed input is set in step S1106.

If the hand-contact is detected by the hand detector 505 or the hand detector 506, the process proceeds to step S1104 or step S1105.

In step S1107, pattern matching between the dictionary set in step S1104 or S1106 and the data is performed. In step S1108, the recognition result is displayed.

The fifth embodiment attains a construction with lower costs by employing the hand detection pads for detecting hand-contact. Further, data conversion corresponding to an input direction requires only two dictionaries for right-handed and left-handed input instead of preparing more dictionaries for respective input directions. In addition, the fifth embodiment automatically judges an input direction and, at the same time, the user's dominant hand, which provides a high character recognition rate without drawing the user's specific attention to pen-input operation.

It should be noted that the fourth and fifth embodiments respectively use two digitizers and hand detection pads for hand-contact detection, however, the present invention is not limited to these constructions. In these embodiments, an input direction judgment result is also used for display direction change and character recognition, however, the input direction judgment result can be utilized for other controls.

Further, the fourth embodiment detects a direction from which the user makes pen-input and displays an image in an appropriate direction to the user. This construction which specifies the direction in which the user stands can be applied to the first to third and fifth embodiments for handwriting recognition in every direction.

As described above, the first to fifth embodiments provide an information processing apparatus which detects whether a character-pattern input is made with a right-hand or left-hand, and switches pattern-matching dictionaries based on the detection result, thus automatically selects an appropriate pattern dictionary without any setting by a user.

Further, the user of this apparatus does not have to take care of pen-input upon input-direction judgment.

Accordingly, accurate handwriting recognition for plurality of users can be realized without any specific manual setting.

Further, the user can always see a displayed image in an appropriate direction.

[Sixth Embodiment]

Figure 25:
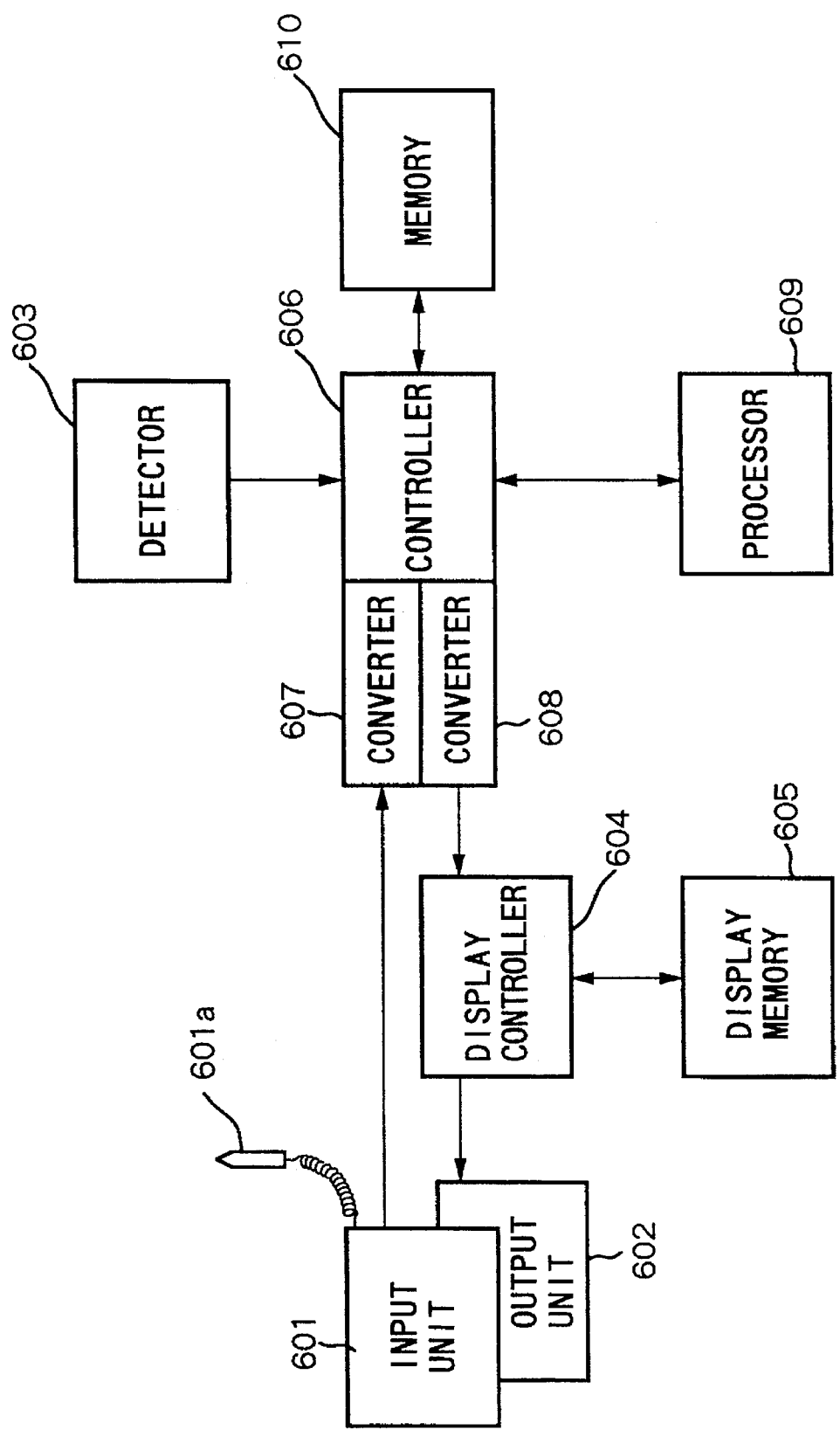
FIG. 25 is a block diagram showing the configuration of an information processing apparatus according to a sixth embodiment of the present invention.

FIG. 25 shows the configuration of the information processing apparatus according to the sixth embodiment.

Numeral 601 denotes an input unit which comprises, e.g., a transparent pressure-sensitive tablet, for inputting coordinates at a point where a dedicated input-pen 601a is pressed. Numeral 602 denotes an output unit which comprises, e.g., an LCD. The input unit 601 and the output unit 602 integrally form an input-output unit. Numeral 603 denotes a detector which detects the input direction and transfers the detection result to a controller 606; and 604, a display controller which controls display at the output unit 602 based on stored content of a display memory (RAM) 605. Further, the display controller 604 changes the data of the display RAM 605 by an instruction from the controller 606.

The display memory 605 stores data to be displayed at the output unit 602. The controller 606 controls the overall apparatus. Numerals 607 and 608 denote converters for converting data based on the detection result from the detector 603.

Numeral 609 denotes a processor which executes, e.g., an application program; and 610, a memory such as a ROM or a RAM.

Figure 26:
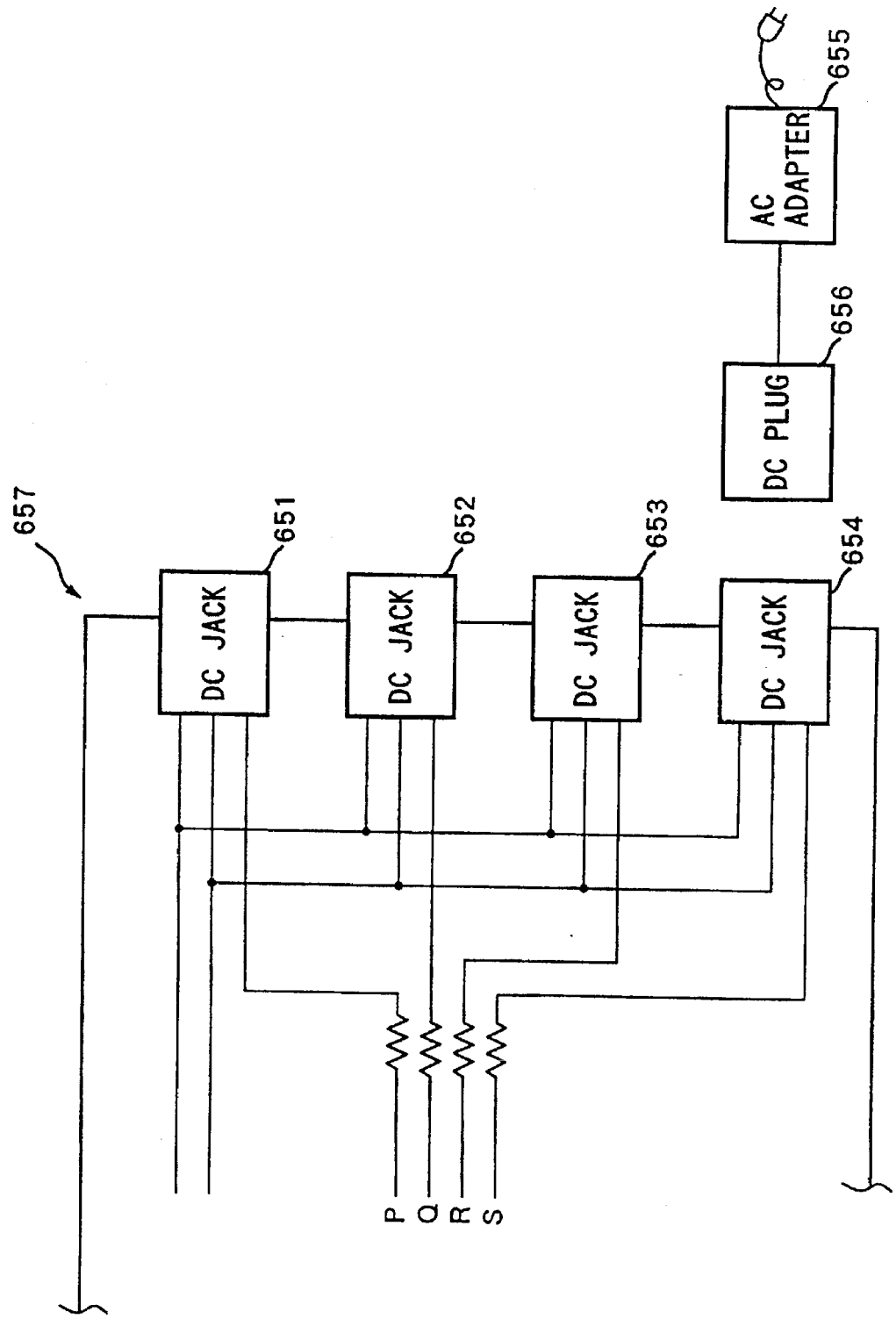
FIG. 26 is a block diagram showing the construction of a detector 603 in FIG. 25.

FIG. 26 shows in detail the construction of the detector 603.

The information processing apparatus, comprising the input unit and output unit as an integrated input-output unit, has four power-supply systems (DC jacks) at a relatively same position on each side surface. The apparatus is powered when a user inserts a DC plug into any of these power-supply systems. In FIG. 26, the construction of the detector 603 includes these power-supply systems.

In FIG. 26, numerals 651 to 654 denote the DC jacks, each having a power-supply line, a ground line and a display-direction control signal line.

Normally, a power-supply cable to the apparatus is provided on the apparatus rear side, since the cable in front of the user or at a side of the apparatus disturbs the user's operation. That is, detecting a DC jack into which the DC plug is inserted corresponds to specifying an input direction in which the user stands. In this embodiment, when a DC plug 656 is inserted any of the DC jacks 651 to 654, a signal indicative of a display direction corresponding to the DC jack (direction where an image is displayed appropriately to the user) is outputted.

Numeral 655 denotes an AC adapter for connecting the apparatus with a domestic power supply, performing A/D conversion and switching the power-supply lines, the ground lines and the display-direction control signal lines. Numeral 657 denotes the apparatus main body.

Figure 27:
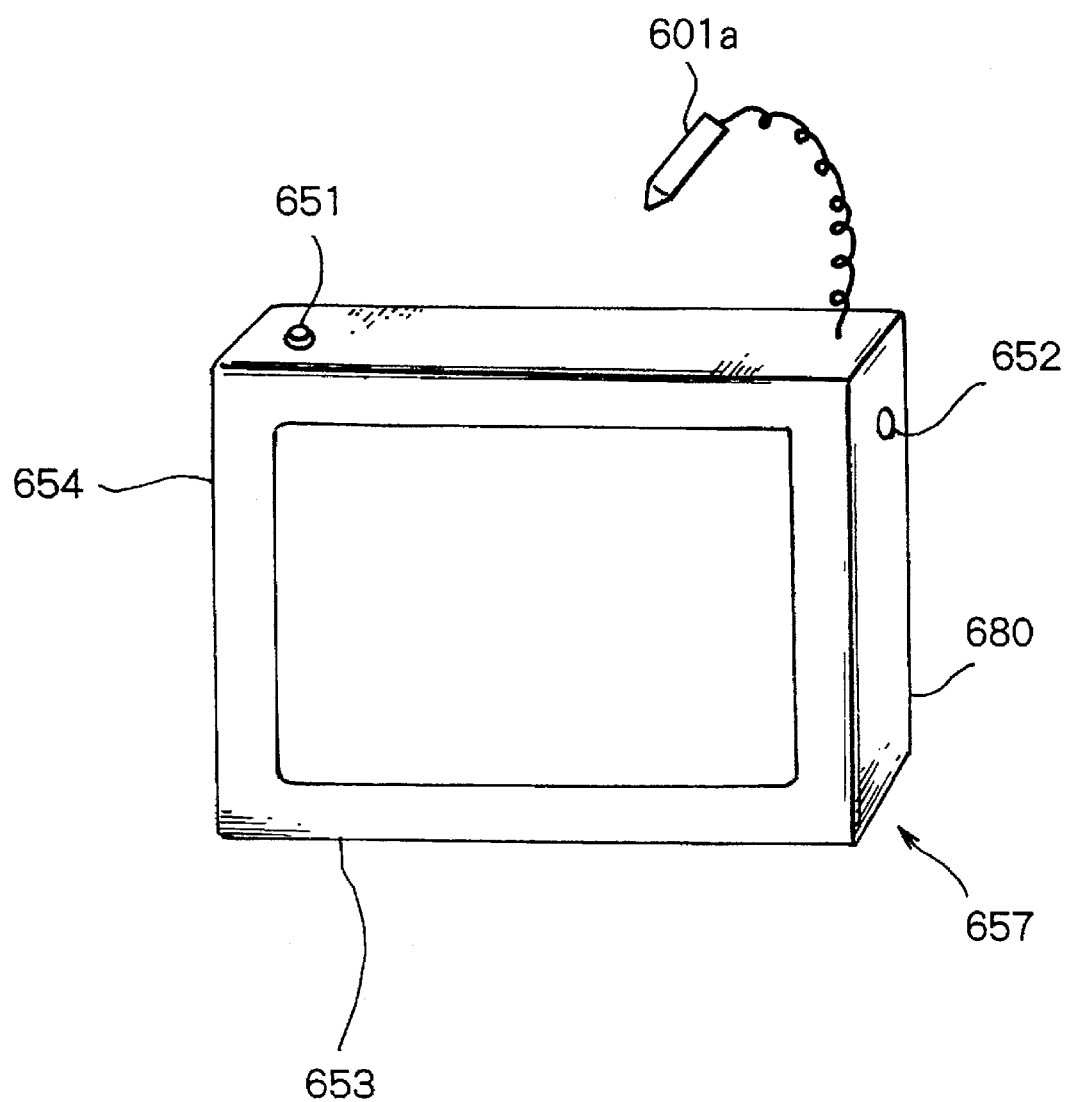
FIG. 27 is a perspective view of the information processing apparatus of the sixth embodiment.

FIG. 27 shows the external appearance of the apparatus. Numeral 680 denotes a cabinet to which an input pen 601 is connected with a cable. The DC jacks 651 to 654 are provided on the respective side surfaces of the case member (the DC jacks 653 and 654 are not shown).

Figure 28:
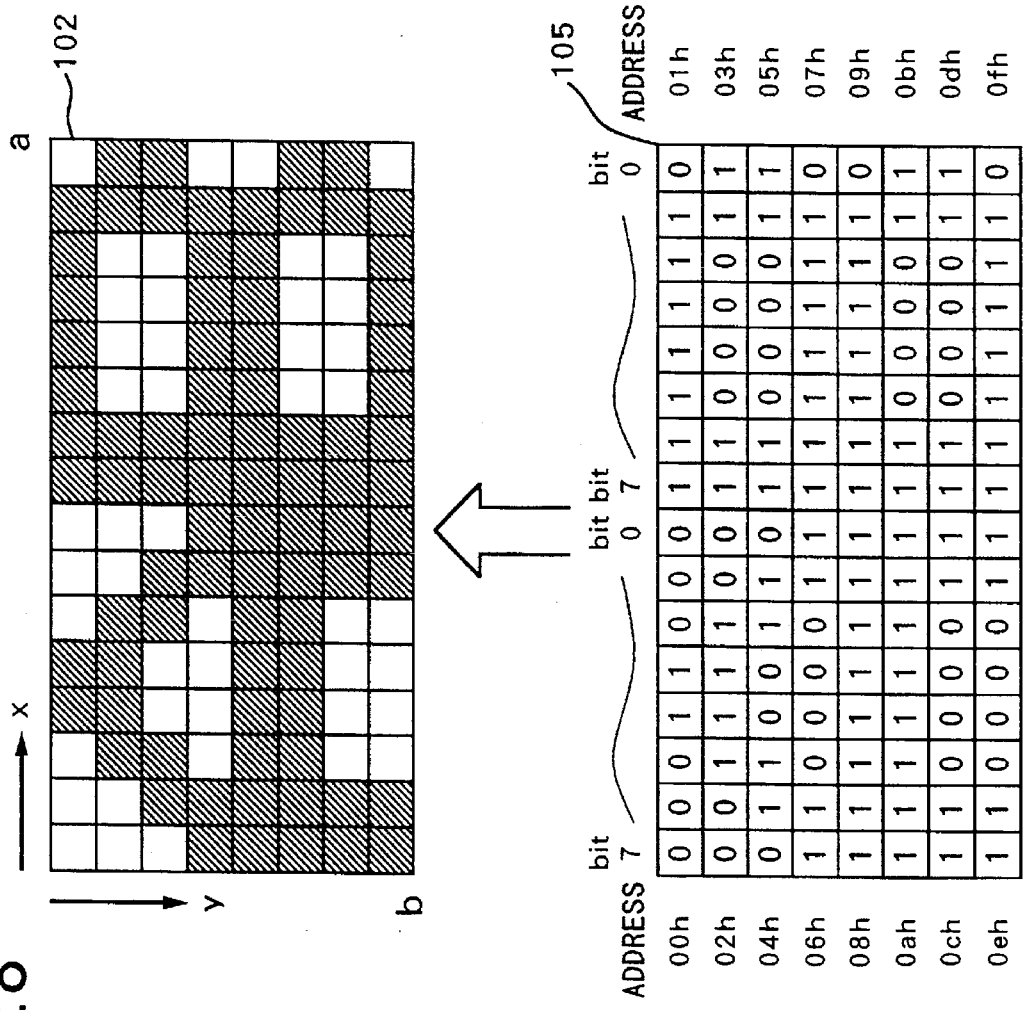
FIG. 28 illustrates the correlation between a display image and the content of a display memory.

Next, the display direction control operation according to the sixth embodiment will be described. Note that a displayed image corresponds to bitmap data in the display memory 605. More specifically, each dot information written in the display memory 605 coincides with a dot at relatively the same position in the displayed image which is turned on. FIG. 28 shows the correlation between a display image of the output unit 602 and the content of a display memory 605. It should be noted that though the illustration is simplified, an actual number of dots in the display image is greater for representing a complicated figure or a sentence having a predetermined length. In FIG. 28, the number of dots in a horizontal direction is "a", and that in a vertical direction is "b".

Assuming that the DC plug 656 is inserted into any of the DC jacks 651 to 654, the apparatus is provided with electricity, and at the same time, one of display direction control signals P, Q, R and S is transferred to the converters 607 and 608. The converters perform conversion upon the input data in accordance with corresponding one of the following equations. More specifically, The converter 607 converts coordinate data inputted from the input unit 601, while the converter 608 converts coordinate data to be outputted to the output unit 602. Note that the converters perform no conversion when the signal P is at a high level.

(1) If the signal 0 is high, bit(x, y)=bit(int{a/b(b-yin)},int{b/a-xin})... ①bit (xout,yout)=bit (int{a/b.y}, int{b/a (a-x)})... ②

(2) If the signal R is high, bit (x, y)=bit (int{a-xin}, int{b-y})... ③bit (xout, yout)=bit (int{a-x}, int{b-y})... ④

(3) If the signal S is high, bit(x, y)=bit(int{a/b-yin},int{b/a(a-xin)})... ⑤bit (xout, yout)=bit (int{a/b(b-y)}, int{b/a-x})... ⑥

Figure 29A:
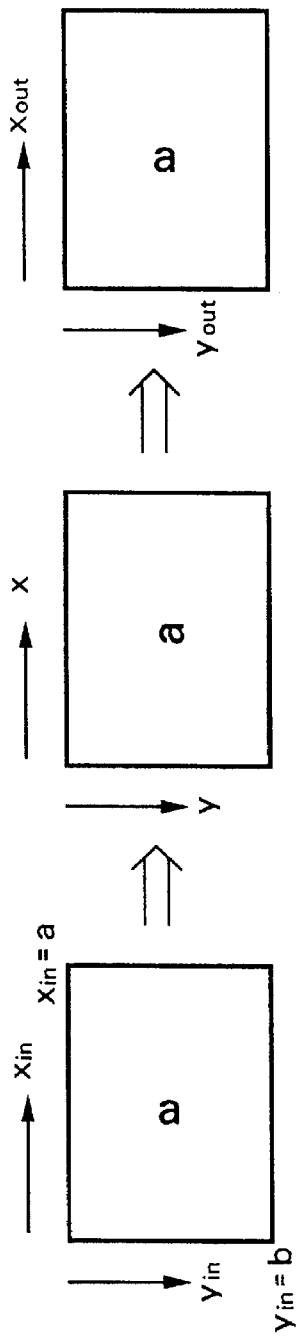
FIGS. 29A to 29C illustrate conversion examples by a first and second converters of the sixth embodiment.
Figure 29B:
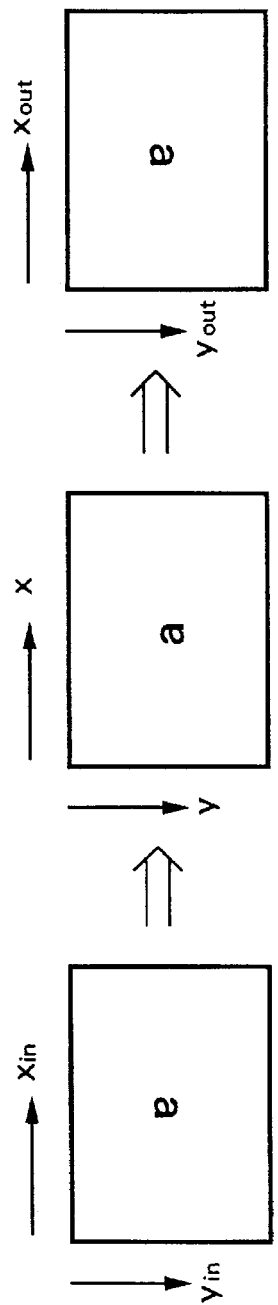
Figure 29C:
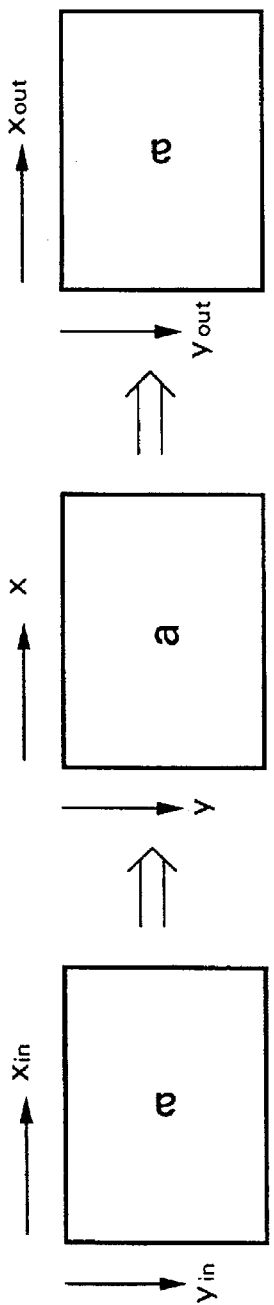

(xin, yin) are coordinates at the input unit 601; (x, y), at the controller 606 and the processor 609; and (xout, yout), at the output unit 602. a and b represent an image size; and int(a/b.y), an integral portion of an operation (a/b).y. FIGS. 29A to 29C show coordinate conversions respectively corresponding to the above equations.

Figure 30:
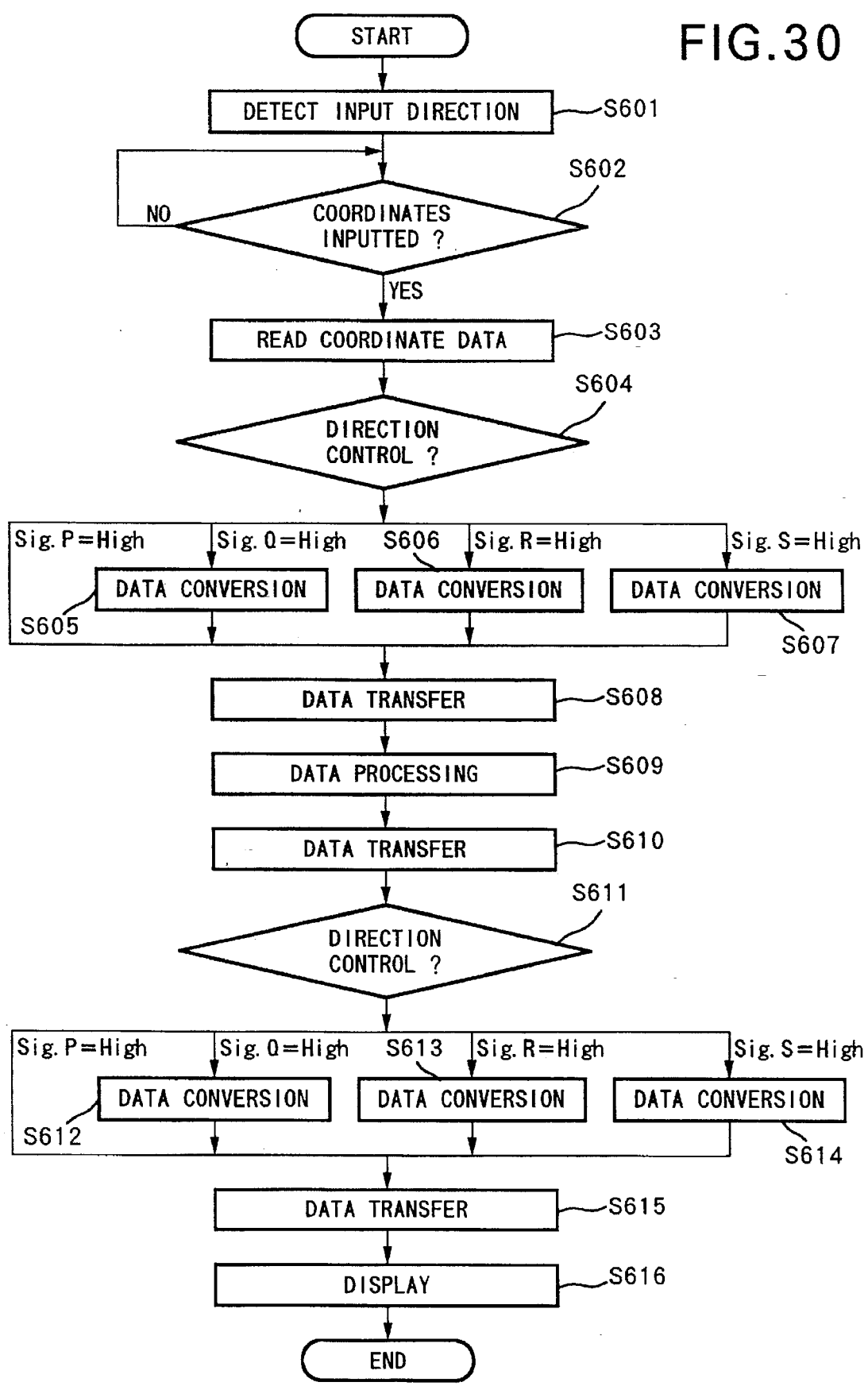
FIG. 30 is a flowchart showing coordinate detection and output processing according to the sixth embodiment.

The display direction control of the present embodiment will be described with reference to the flowchart of FIG. 30. Note that the program for this operation is stored in a ROM (not shown) of the memory 610.

First, when the power of the apparatus is turned on, which of the signals P to S is high is detected to judge the input direction (direction in which the user stands) in step S601. In step S602, whether there has been coordinate input or not is determined. If YES, the process proceeds to step S603, while if NO, coordinate-input is awaited. In step S603, the input coordinates are transferred to the converter 607. In step S604, a data conversion method corresponding to the detected input direction in step S601 is selected at the converter 607.

If the signal Q is high, the data conversion is made in accordance with the equation ① in step S605; if the signal R is high, in accordance with the equation ③ in step S606; and if the signal S is high, in accordance with the equation ⑤ in step S607. If the signal P is high, no data conversion is performed.

Next, the process proceeds to step S608 to transfer the converted data to the processor 609, which processes the data (e.g., transferring the data to an application software) in step S609. In step S610, the processed data is transferred to the controller 606, which, based on the received data, outputs data to be displayed at the output unit 602 to the converter 608. In step S611, a data conversion method corresponding to the input direction detected in step S601 is selected. If the signal Q is high, the data conversion is performed in accordance with the equation ② in step S612; if the signal R is high, in accordance with the equation ④ in step S613; and if the signal S is high, in accordance with the equation ⑤ in step S614.

In step S615, the converted data is transferred to the display memory 605. The display controller 604 outputs the data in the display memory 605 to the output unit 602 in step S616, thus an image is displayed.

As described above, the present embodiment obtains an input direction and its corresponding display direction, from the user's inserting the DC adapter into one of the DC jacks.

It should be noted that the present embodiment is described as an example where a dot designated by the input pen is displayed, however, this does not pose any limitation upon the present invention. This is because the apparatus itself converts the absolute coordinate system to a system in a proper direction to the user, based on an input-direction, thereafter, upon processing input coordinates, the apparatus converts the coordinate system again to the absolute coordinate system.

[Seventh Embodiment]

The sixth embodiment detects an input direction based on the connection between the information processing apparatus having the integrated input-output unit and the cable to be connected to the apparatus. The information processing apparatus may be constructed with an apparatus main body comprising a digitizer, a display, a CPU, a battery, a backup memory and a HDD, and a subordinate apparatus comprising an FDD, an I/O port including e.g. an RS232C and a printer interface, a network I/F, a battery and an AC/DC converter etc. In this case, the attachment/detachment of the apparatus main body to the subordinate apparatus may be possible in a plurality of directions, and detecting the direction of attachment can specify an input direction. It should be noted that the main system construction (the apparatus main body and the subordinate apparatus) is substantially identical to that in FIG. 25. The difference is that the construction is separated into two devices.

Figure 31:
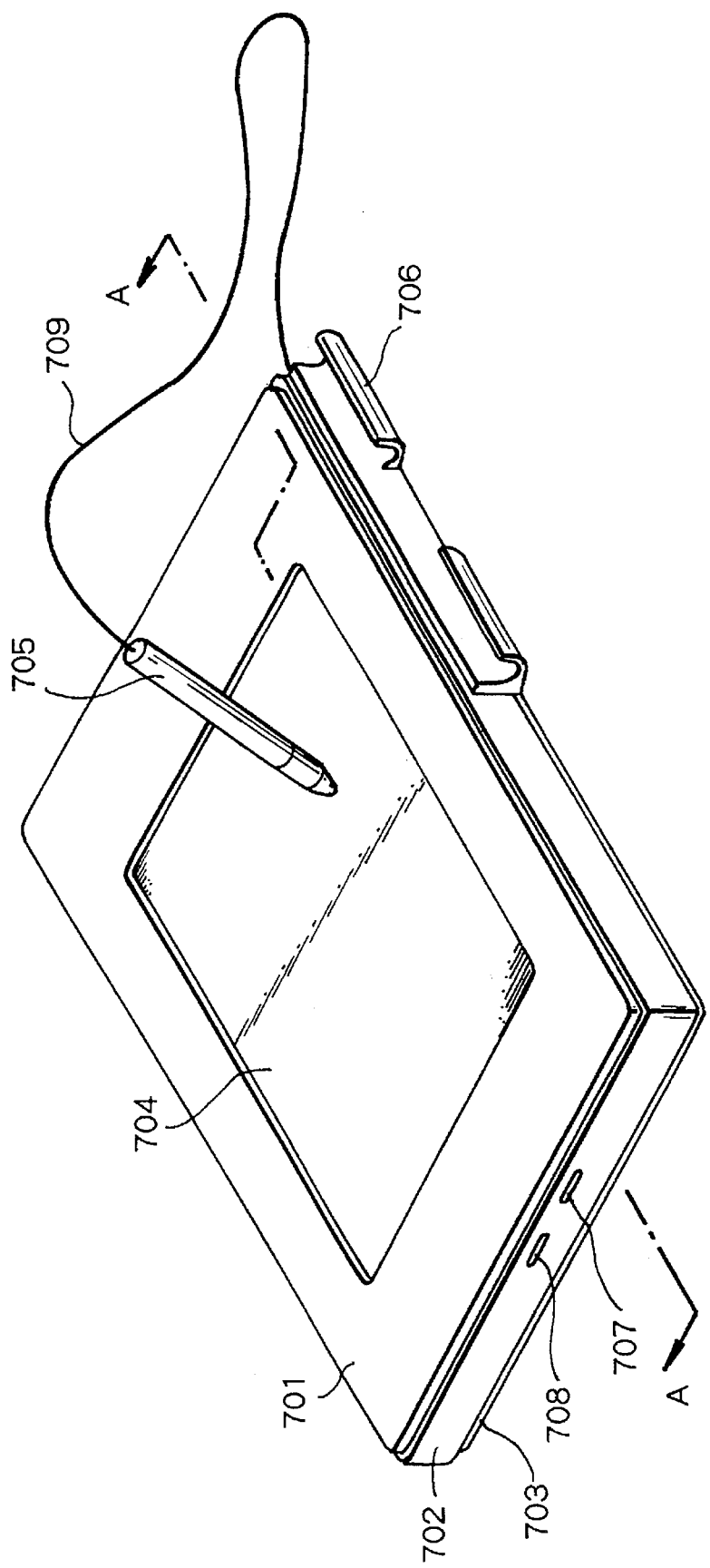
FIG. 31 is a perspective view of an information processing apparatus of a seventh embodiment according to the present invention.
Figure 39:
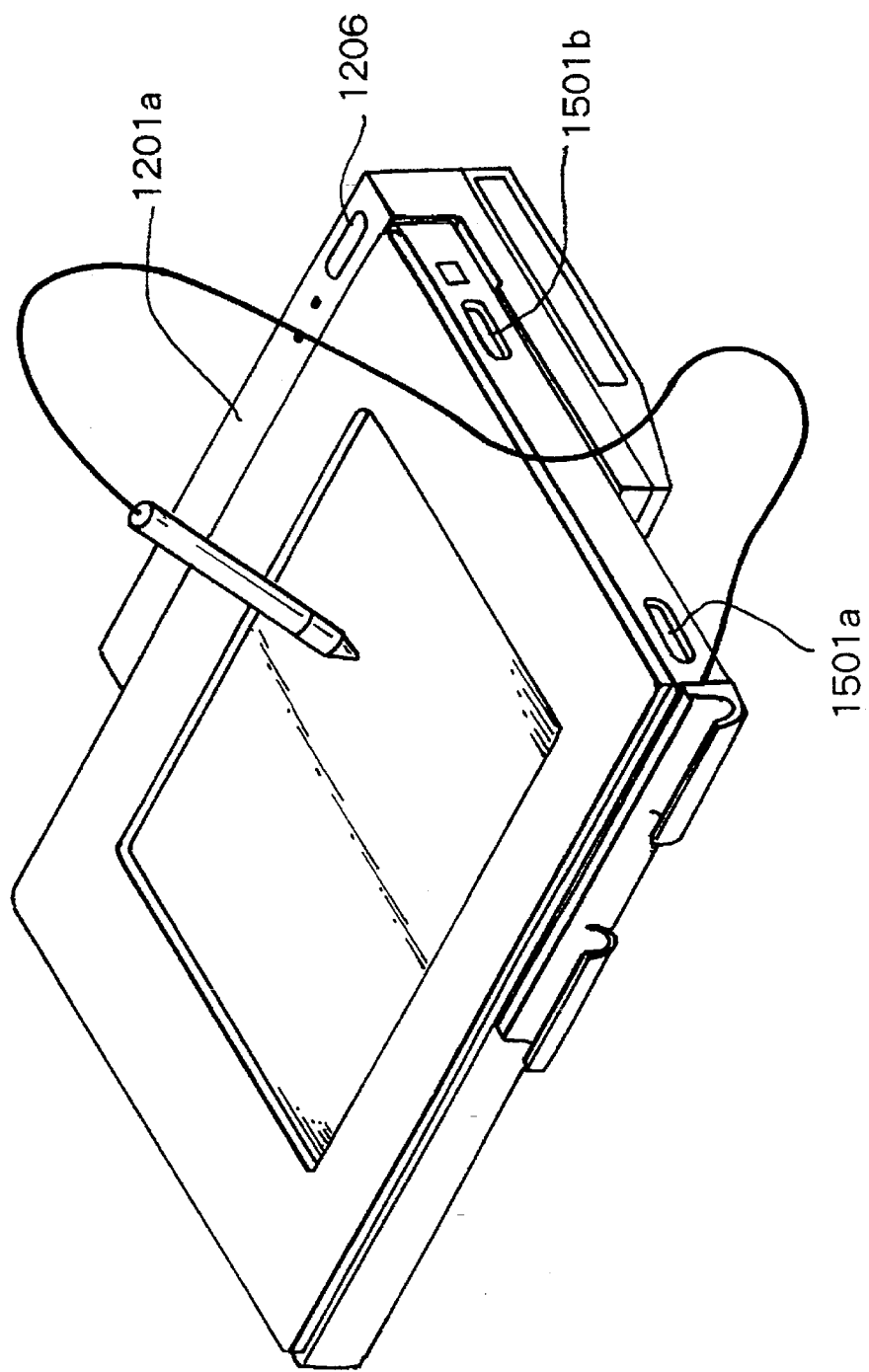
FIG. 39 is a perspective view where the attachment of the apparatus to the subordinate apparatus is completed.

FIG. 31 shows the external appearance of the information processing apparatus main body. The external form of the apparatus main body is a substantial rectangular parallelepiped comprising a resin front plate 701, a case 702 and a bottom plate 703. The front plate 701 has, at the central portion, a substantially rectangular-shaped opening where a transparent digitizer 704 as an input surface is provided with an LCD 801 under the digitizer 704. The side surfaces of the case 702 have a pen holder 706 for an input pen 705, a main switch 707, a contrast adjustment knob 708 for the LCD 801, an IC card connector (not shown) and a DC jack (not shown). As shown in FIG. 39, the respective side surfaces of the case 702 have, at two positions, ellipse concave guides 1501a to 1501d, each as a part of an attaching member for connecting the apparatus main body to the subordinate apparatus. Further, in FIG. 31, a connector (not shown) for the input pen 705 is provided on the right side surface (where the pen holder 706 is provided). Note that in this embodiment, the connector is hidden by the pen holder. The input pen 705 and the connector are connected with a cord 709 which can be kept at a gap between the pen holder 706 and the right side surface.

Figure 32:
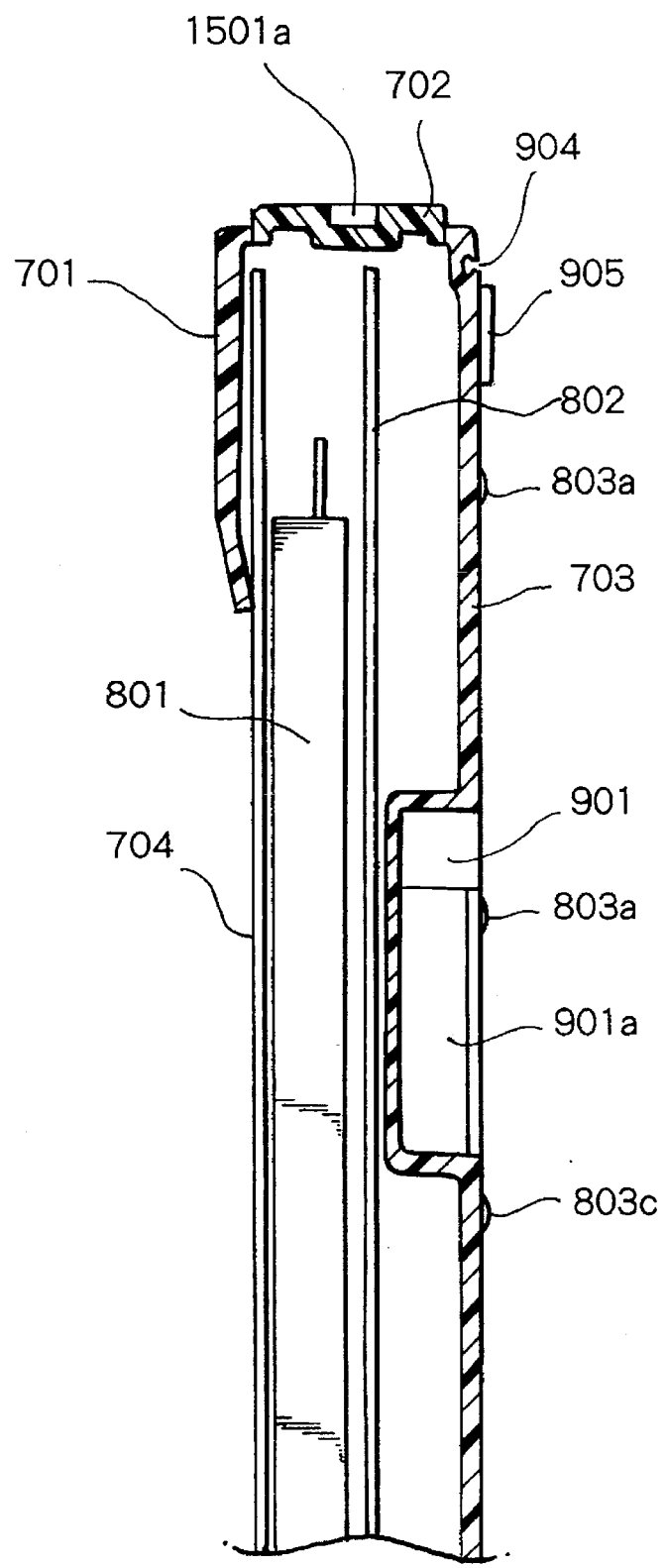
FIG. 32 is a cross-sectional view cut out at a line A—A in FIG. 31.
Figure 33:
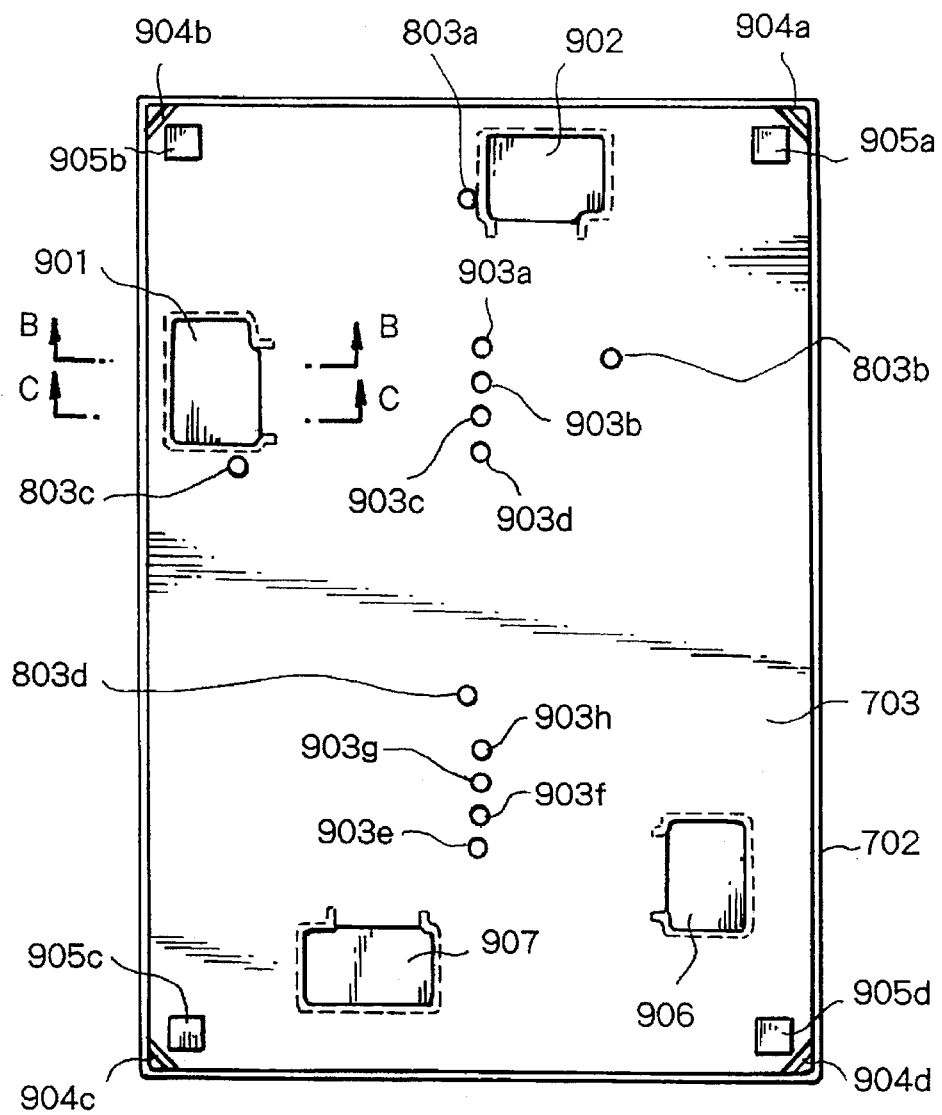
FIG. 33 is a bottom plan view of the information processing apparatus of the seventh embodiment.

FIG. 32 shows the cross-section of the apparatus main body cut out at the line A—A in FIG. 31, and FIG. 33 depicts the bottom surface of the apparatus main body. As described above, the case 702 has the digitizer 704 and the LCD 801 in layers. Further, a printed board 802, on which a CPU as a processor for controlling the overall apparatus main body, a memory, an LCD controller, a digitizer controller and a power supply circuit are mounted, is provided under the LCD 801. The front plate 701, the case 702 and the bottom plate 703 are fixed with elastic hooks. In FIG. 33, four concave portions 901, 902, 906 and 907, each as a part of the attachment member, and semi-globular convex portions 803a to 803d are provided on the bottom plate 703. Further, optical communication windows 903a to 903h are provided in the lengthwise direction of the apparatus main body, and at the four corners of the bottom plate 703, grooves 904a to 904d and rubber feet 905a to 905d for catching the cord 709 are provided. Note that the height of the convex portions 803a to 803d is shorter than that of the rubber feet 905a to 905d.

Figure 34:
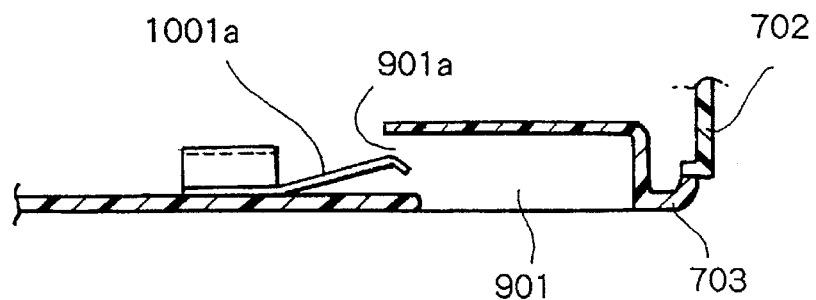
FIG. 34 is a cross-sectional view cut out at a line B—B in FIG. 33.
Figure 35:
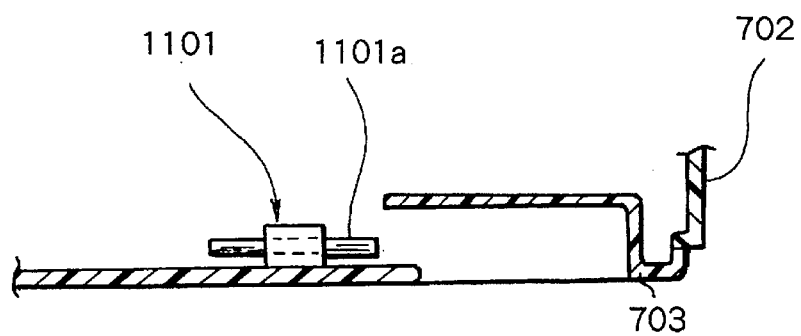
FIG. 35 is a cross-sectional view cut out at a line C—C in FIG. 33.

FIG. 34 shows a cross-section of the concave portion 901 cut out at the line B—B in FIG. 9. Note that the cross-section of any of the other concave portions 902, 906 and 907 is identical to that of the concave portion 901. The four concave portions 901, 902, 906 and 907 respectively have openings 901a, 902a, 906a and 907a provided on one of their four side surfaces, and the openings 901a, 902a, 906a and 907a respectively have flat springs 1001a to 1001d. FIG. 35 shows the cross-section of the concave portion 901 cut out at the line C—C in FIG. 33. The openings 901a, 902a, 906a and 907a respectively have an electrode 1101 comprising two electrode pins 1101a, 1101b, 1101c and 1101d. The concave portions 901, 902, 906 and 907 are respectively provided at a corresponding position with respect to the side surfaces.

Next, the construction of the digitizer 704 will be described below. Though various methods are applicable as coordinate detection by a digitizer, the present embodiment employs an ultrasonic-wave detection method, since this method uses a glass plate as a coordinate input plate, through which the user can clearly see an image displayed at the LCD. However, any detection method to which a transparent material can be applied may be employed.

When the input pen 705 which incorporates a vibrator is brought into contact with the coordinate input plate (vibration propagating plate), the vibration having the contact point as its center is detected by a plurality of vibration sensors fixed around the vibration transmitting plate. The time that each sensor takes for detecting the vibration depends on a distance between the sensor and the contract point, the distance between the contact point and each sensor can be obtained by measuring time from a point where the input pen contacts the input plate to a point where each sensor detects the vibration. Thus, the input coordinates can be geometrically calculated. Note that the vibration transmitting plate is provided with a vibration-proof member which reduces vibration around its sides, so as to absorb vibration reflected from the ends of the vibration transmitting plate. Further, the vibration transmitting plate is also provided with a detector for detecting signals from the respective vibration sensors and measuring transmission time.

Next, the construction of the subordinate apparatus will be described below.

Figure 36:
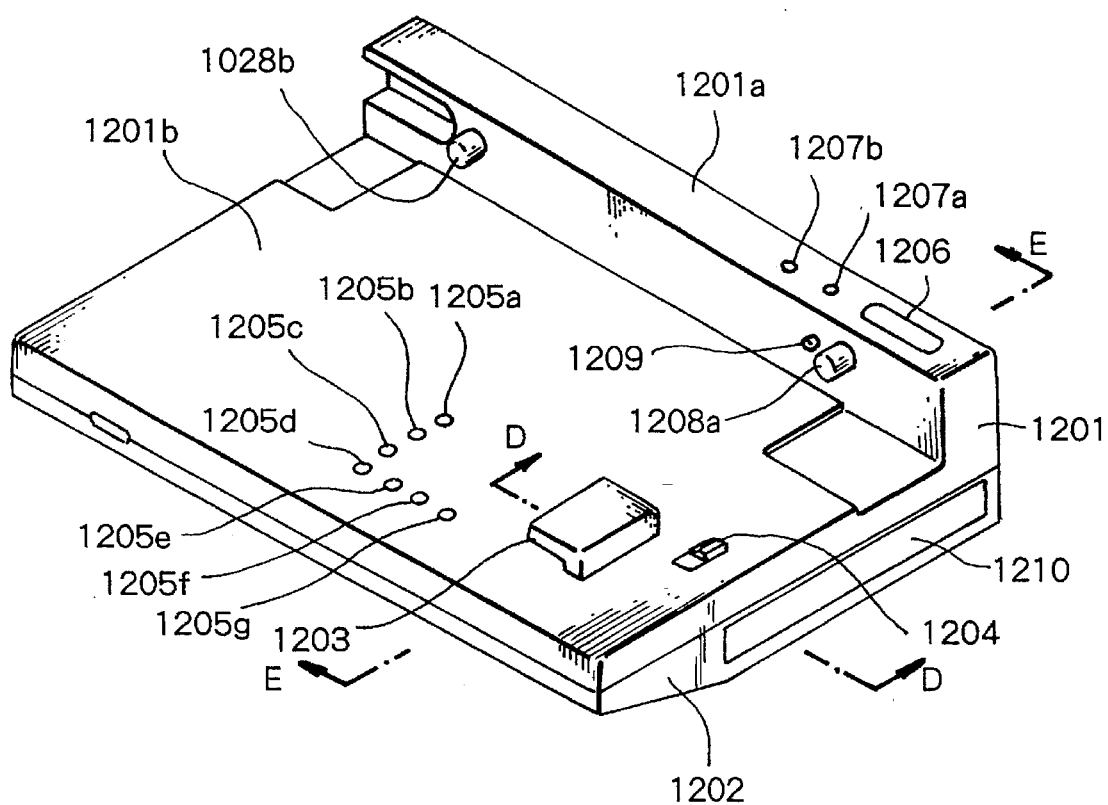
FIG. 36 is a perspective view of a subordinate apparatus in the seventh embodiment.

FIG. 36 shows the external appearance of the subordinate apparatus of the seventh embodiment. The subordinate apparatus is a substantial rectangular parallelepiped having two substantially-L-shaped side surfaces at the shorter sides as right and left. The apparatus comprises a resin upper case 1201, having a rectangular-parallelepiped convex portion 1201a on one side of its upper surface 1201b, and a lower case 1202. The width of this subordinate apparatus substantially coincides with that of the apparatus main body. The upper case 1201 further has a hook 1203 and engaging member 1204, optical-communication windows 1205a to 1205g on the upper surface 1201b. The engaging member 204 is biased to the upper side by a spring (not shown), and when it receives a predetermined force, it moves to the lower side. The optical-communication windows 1205a to 1205g are arranged in an L-shape, specifically, the windows 12025a to 1205d are in the vertical direction (a direction parallel to the shorter sides) and the windows 1205d to 1205g are in the horizontal direction (a direction parallel to the longer sides), with the convex portion side as the top parallel to the longer sides. Further, the upper case 1201 has a release button 1206 which removes the apparatus main body from the subordinate apparatus, and LED 1207a and 1207b which are indicators for the power and FDD operation, on the convex portion 1201a. When the release button is pressed, an incorporated rotating mechanism (not shown) and sliding mechanism (not shown) move the engaging member 1204 downward. The convex portion 1201a has guide pins 1208a and 1208b respectively at around the right and left sides of its inner side surface (surface contacting the upper side of the upper surface 1201b), and an operation pin 1209, for attachment-state detection to be described later, around the guide pin 1208a. One of the L-shaped side surfaces (right side surface) has a slot of an incorporated FDD 1210. An I/O port, a network I/F, a keyboard connector and a DC jack (all not shown) are incorporated at the other L-shaped side surface side (left side surface).

Figure 37:
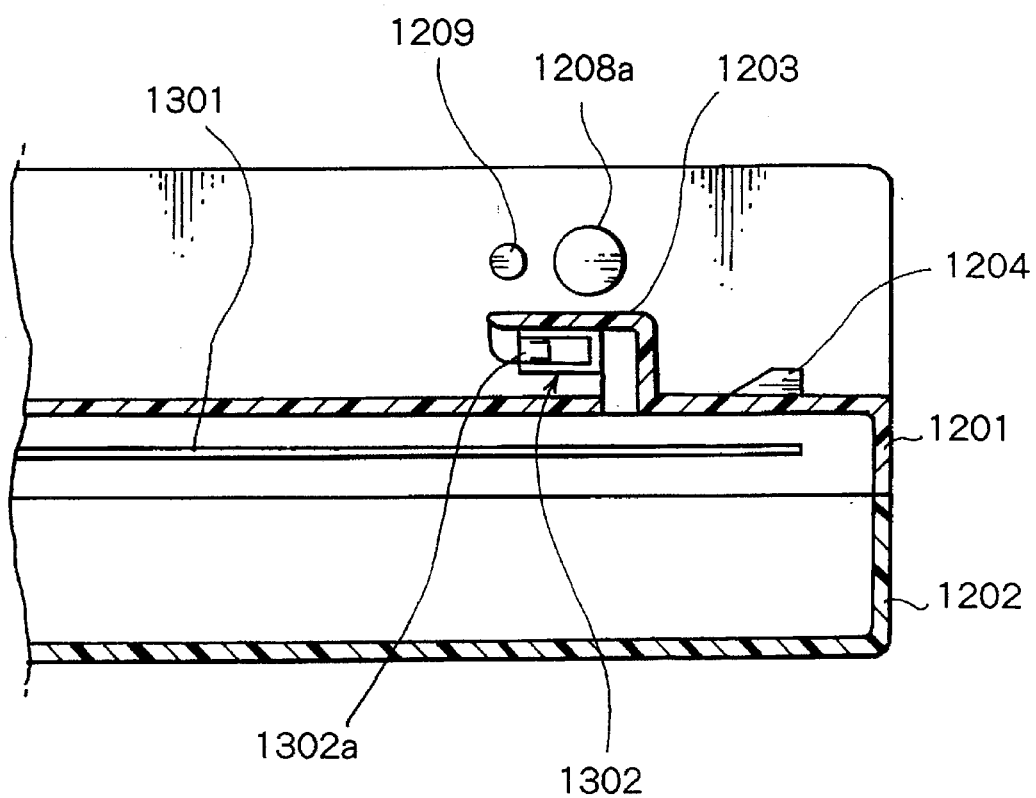
FIG. 37 is a cross-sectional view cut out at a line D—D in FIG. 36.

FIG. 37 shows the cross-section of the hook 1203 cut out at the line D—D in FIG. 36. The upper case 1201 has a print board 1301 on which a CPU for controlling the overall subordinate apparatus, a memory and a optical communication device are mounted. An electrode 1302, which has two electrode pins 1302a and 1302b (not shown) respectively biased by a spring (not shown), is provided at the inside of the hook 1203.

Next, the attachment/detachment of the apparatus main body to the subordinate apparatus will be described with reference to FIGS. 38A to 38D.

In this case, the apparatus main body is used with the shorter side at the top.

Figure 38A:
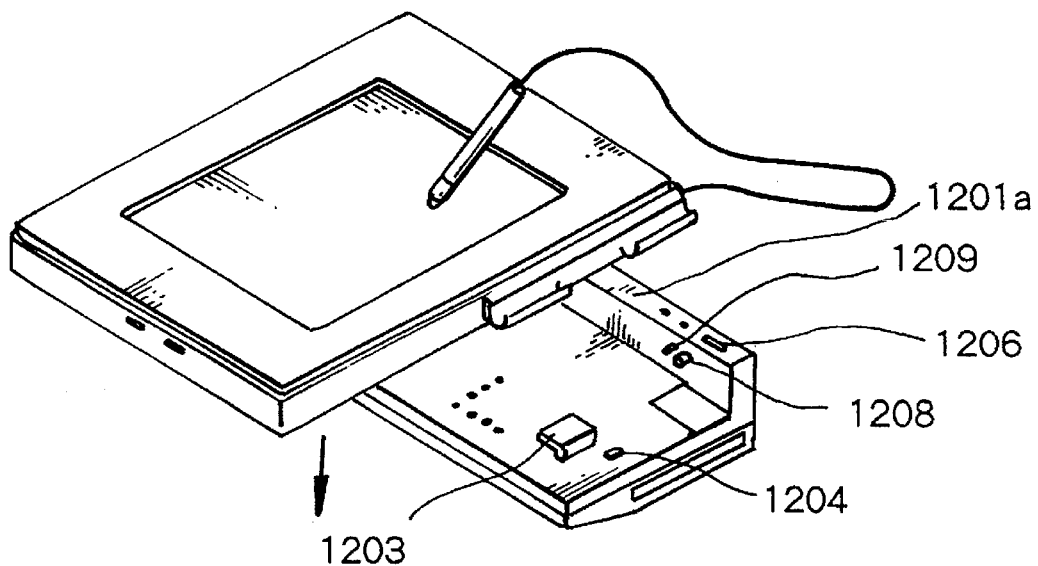
FIGS. 38A to 38D illustrate attachment of the apparatus to the subordinate apparatus in the seventh embodiment.
Figure 38B:
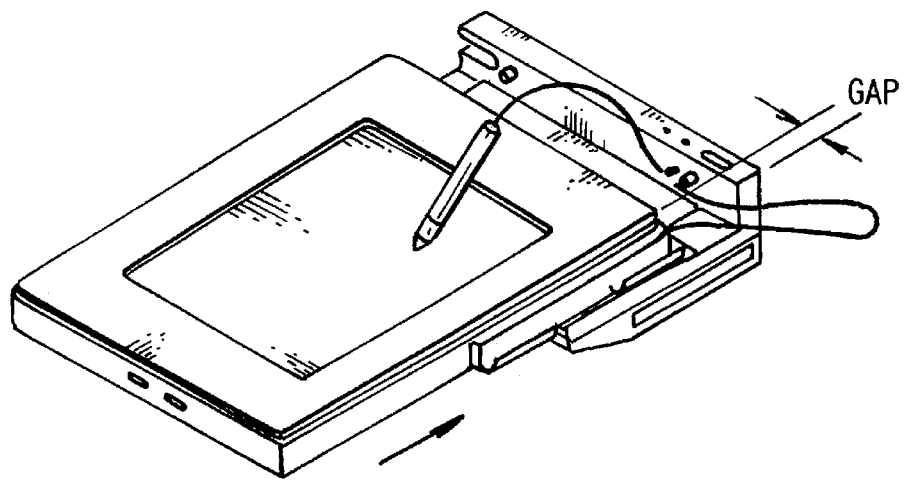
Figure 38C:
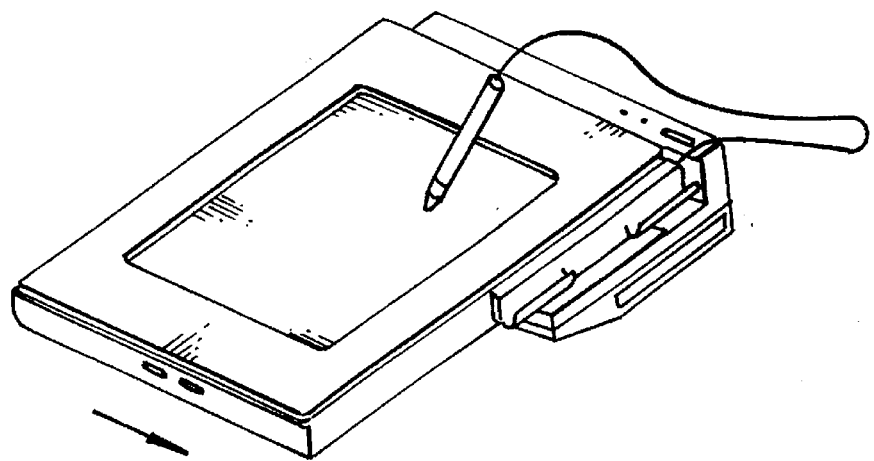
Figure 38D:
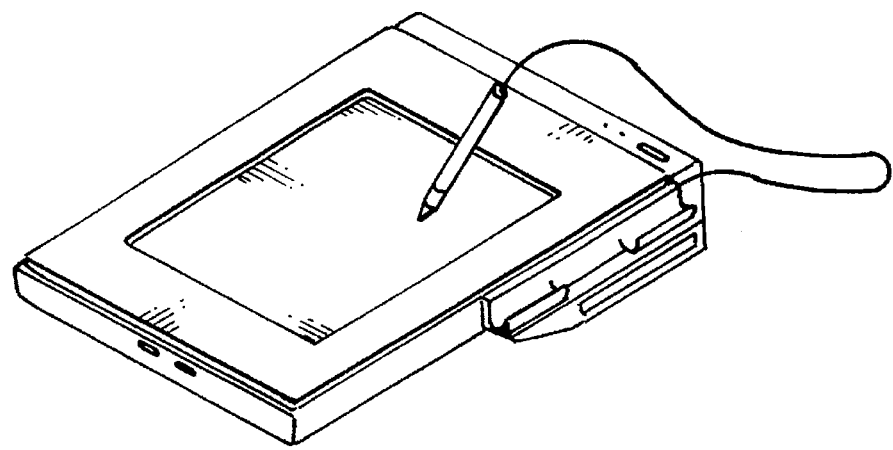

First, the positional relation between the apparatus main body and the subordinate apparatus when they are combined as shown in FIG. 38D will be described. At this time, the subordinate apparatus contacts the bottom and upper portions of the apparatus main body. The length of the top and bottom sides of the apparatus main body substantially coincide with the length along the convex portion 1201a of the subordinate apparatus in a horizontal direction (direction parallel to the shorter sides of the apparatus main body). Note that there is a predetermined gap between the upper side surface of the apparatus main body and the convex portion 1201a of the subordinate apparatus. The guide pins 1208a and 1208b are inserted into the two guides 1501a and 1501b at the upper side surface of the apparatus main body. The hook 1203 is positioned at the concave portion 901 on the bottom surface of the apparatus main body, and a part of the hook 1203 is inserted into the opening 901a.

Further, one of the convex portions 803a to 803d is in contact with the upper surface 1201b of the upper case 1201 of the subordinate apparatus. In this manner, the apparatus main body and the subordinate apparatus are combined with very small backlash in their thickness direction. Further, the attachment of the apparatuses in the vertical direction gives very small backlash by the bottom surfaces of the guides 1501a and 1501b, the top surfaces of the guide pins 1208a and 1208b, the side surface facing the opening 901a of the concave portion 901 and the side surface of the hook 1203 facing the convex portion 1201a.

Further, a side surface of the opening portion 901a of the concave portion 901 is in contact with the distal end portion of the hook 1203, and one curved side surface of the guide 1501a is in contact with the side surface of the guide pin 1208a. The right side surface of the engaging member 1204 of the subordinate apparatus is inserted in the concave portion 901 with a predetermined gap to the right side surface of the concave portion 901. In this manner, the apparatus main body and the subordinate apparatus are combined in the horizontal direction with very small backlash. Upon this attachment, the operation pin 1209 of the subordinate apparatus is pressed by the upper side surface of the apparatus main body, so that the attachment detection switch operates. Note that the positions of the optical communication windows 903a to 903d on the bottom surface of the apparatus main body substantially coincide with those of the optical communication windows 1205a to 1205d. Further, the electrodes 1101a and 1101b of the apparatus main body are in contact with the electrodes 1302a and 1302b of the subordinate apparatus with a predetermined spring force, thus they are electrically connected.

Next, attachment operation of the apparatuses will be described. First, as shown in FIG. 38A, the apparatus main body is placed on the upper surface 1201b of the subordinate apparatus. At this time, the apparatuses are shifted to each other in the horizontal direction as shown in FIG. 38B, i.e., the subordinate apparatus is shifted to the right from the apparatus main body by a predetermined distance. The upper side surface of the apparatus main body and the guide pins 1208a and 1208b are not inserted into the guides 1501a and 1501b at this time, and the hook 1203 of the subordinate apparatus is inserted into the concave portion 901 of the apparatus main body. As shown in FIG. 38C, the apparatuses are moved so that the upper side surface of the apparatus main body and the convex portion 1201a of the subordinate apparatus come into contact. At this time, the guide pins 1208a and 1208b are inserted into the guides 1501a and 1501b. The operation pin 1209 is positioned at the guide 1501a and as it is not pressed, the attachment state detection switch is not active. Next, as shown in FIG. 38D, the apparatuses are moved relatively to each other in the horizontal direction. At this time, a side surface (not shown) of the opening 901a of the concave portion 901 is in contact with the distal end portion of the hook 1203, and one of the curved side surfaces of the guide 1501a is in contact with the side surface of the guide pin 1208a. Thus, the apparatuses are aligned in the horizontal direction. This movement inserts the hook 1203 into the opening 901a of the concave portion 901. Further, at this time, the movement of the bottom surface of the apparatus main body moves the engaging member 1204 downward, and makes the engaging member in a free state at the position of the concave portion 901. Then, the engaging member is again biased upward.

Next, a detaching operation will be described. When the release button 1206 of the convex portion 1201a of the subordinate apparatus is pressed to move the engaging member 1204 downward, the apparatuses move in the horizontal direction in a manner opposite to that made when they are attached. Thereafter, the apparatuses are moved in their thickness direction so that the guide pins 1208a and 1208b are removed from the guides 1501a and 1501b, thus the detachment is completed.

Next, attachment/detachment of the apparatuses when the apparatus main body is used with the longer side at the top. For this use, the apparatus main body is turned clockwise by a right angle. FIG. 39 shows a state where the apparatuses are combined. In this state, the top side surface of the apparatus main body is the side surface which is the left side surface when the apparatus main body is used with the shorter side at the top. The current right side surface of the apparatus main body (top side surface when the apparatus is used with the shorter side at the top) and the right L-shaped side surface of the subordinate apparatus becomes substantially the same surface. In this attachment, the positional relation between the guides 1501a, 1501b and the guide pins 1208a, 1208b, the relation between the concave portion 902 and the hook 1203 of the subordinate apparatus and attach-ing movements are similar to those in attachment for the use with the shorter side-at the top. That is, the positions of guides 1501c, 1501d and the concave portion 902 for the use with the longer side as top correspond with the guides 1501a, 1501b and the concave portion 901 for the use with the shorter side at the top. Further, the positions of the optical communication windows 903a to 903d correspond with those of the optical communication windows 1205d to 1205g. As the window 1205d is positioned at an intersection point of the vertically arranged windows and the horizontally arranged windows, it can be used in both cases where the apparatus main body is used with the shorter side at the top, and with the longer side at the top.

In the above cases, when the combined information processing apparatus is placed on a horizontal surface such as a desk, the input surface is slanted with a predetermined angle. Note that the separating is made by pressing the release button 1206 to move the engaging member 1204 downward.

It should be noted that the aforementioned two attachment cases respectively correspond to the other two attaching directions, i.e., the apparatus main body and the subordinate apparatus can be attached and detached in cases where the apparatus main body is used with the other shorter side at the top and the other longer side at the top.

In the above-described attachment and detachment of the apparatuses, the convex portion 1201a of the subordinate apparatus works as an attaching/detaching guide when the apparatuses are moved relatively to each other, since the user can hold the convex portion 1201a during these manual attaching/detaching operations. Thus, the attachment and detachment of the apparatuses can be easily made.

Figure 40:
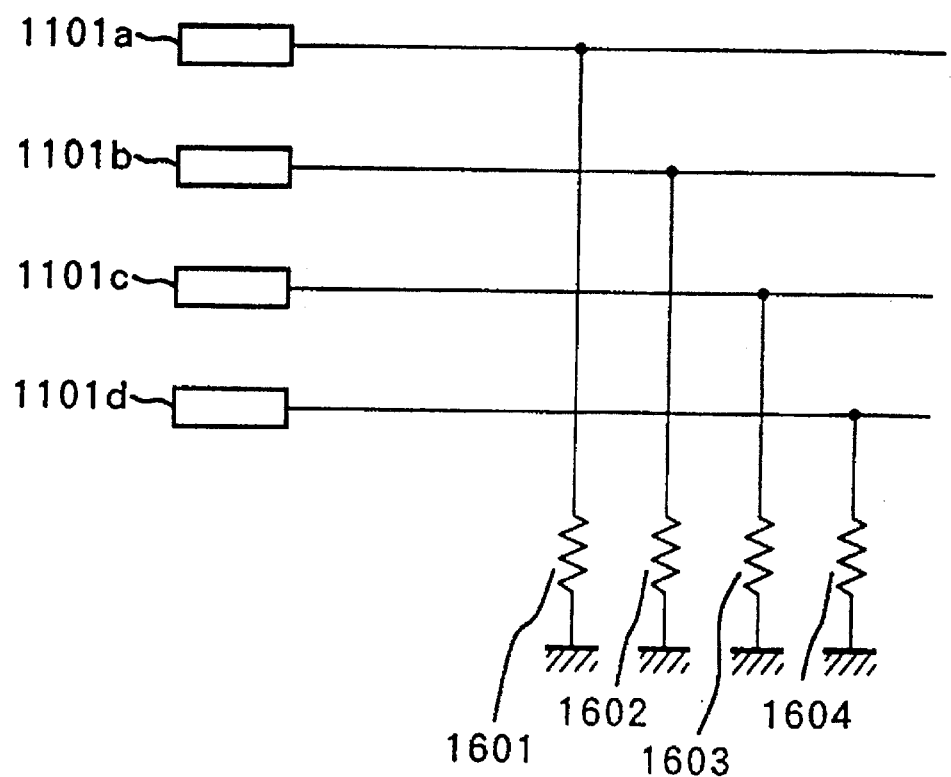
FIG. 40 illustrates the construction of a detector in the seventh embodiment.

FIG. 40 shows an example of a detector for detecting an input direction. In FIG. 40, numerals 1601 to 1604 denote pull-down resistances.

Assuming that the apparatus main body is combined with the subordinate apparatus for using the apparatus main body with the shorter side at the top, one of the four electrodes 11011a to 1101d conducts electricity, and corresponding one of the signals P to Q is transferred to the converter 107 and the converter 108 of the apparatus main body.

In the sixth embodiment, a user or an application software adjusts the size of one pixel based on the resolution of the output unit 602. For example, in a case where the output unit 602 represents an image with 200 (vertical)×400 (horizontal) dots, and each dot is represented by coordinates (x, y) (X≦400, Y≦200), if the input direction is shifted by 90° from the user, still the image is represented by the coordinates for the 200×400 dots, which means that one pixel is doubled in the vertical direction and reduced to half in the horizontal direction. This does not change the content of the information, but changes the aspect ratio of the displayed information. Alternatively, the aspect ratio may be maintained even if the displayed content is changed, which means that the measurements of one dot may be the same with respect to all directions. Description of this displaying method will be made in detail below.

Figure 41:
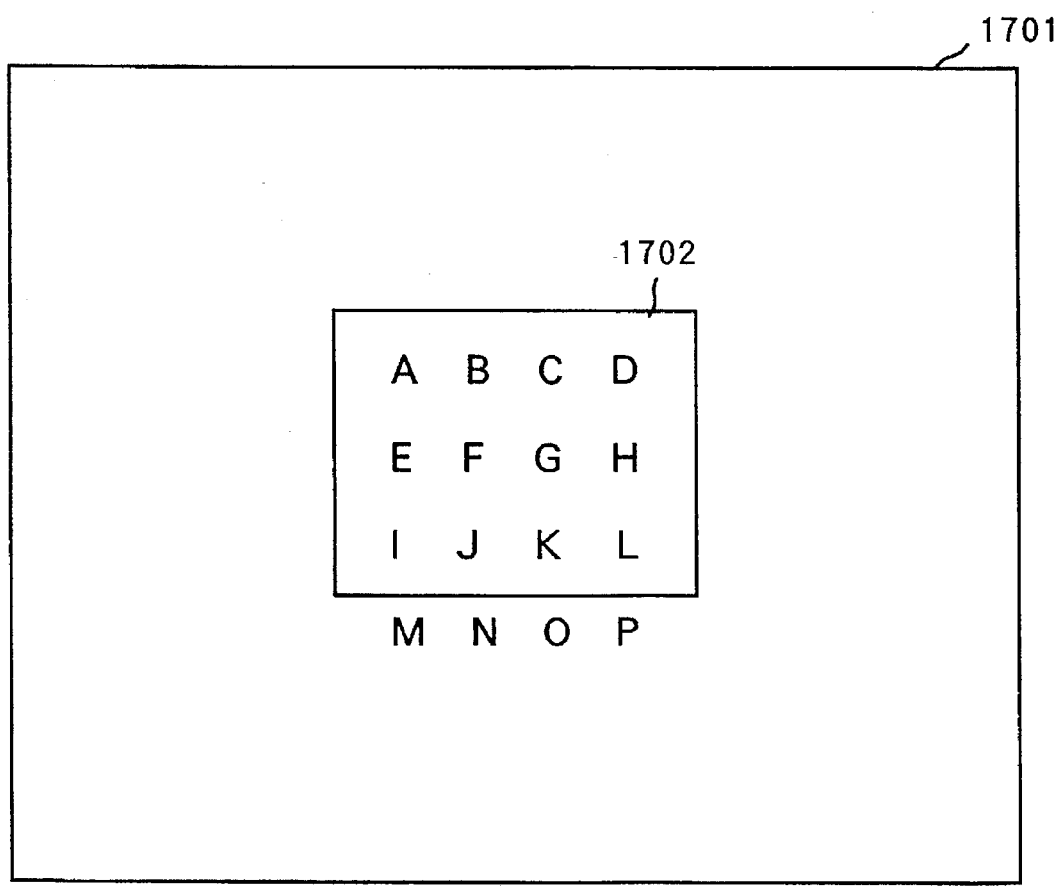
FIG. 41 illustrates the relation between logical display space and physical display space in the seventh embodiment.

FIG. 41 shows the relation between a whole image area (logical display space) 1701 and a display area (physical display space) 1702 in the RAM of the memory 610. To display an image, the controller 606 transfers data in the display area 1702 through the display controller 604 to the display memory 605. Accordingly, it can change the display image by changing the transfer order of the data in the display area 1702. The display direction at the display area 1702 is determined based on an attachment direction of the apparatus main body as an input direction.

Figure 42B:
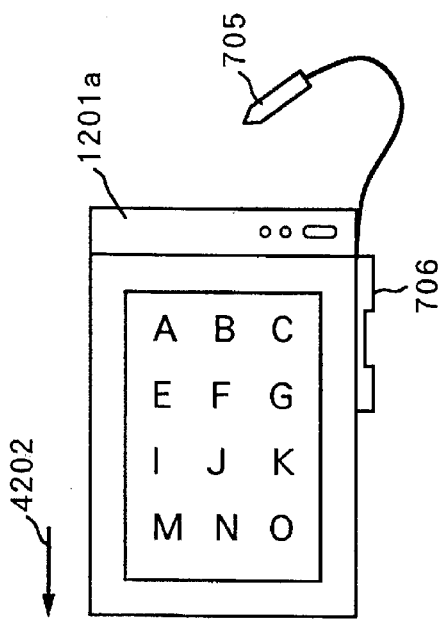
FIGS. 42A to 42D illustrate display directions based on an attachment direction of the apparatus main body with respect to the subordinate apparatus.
Figure 42D:
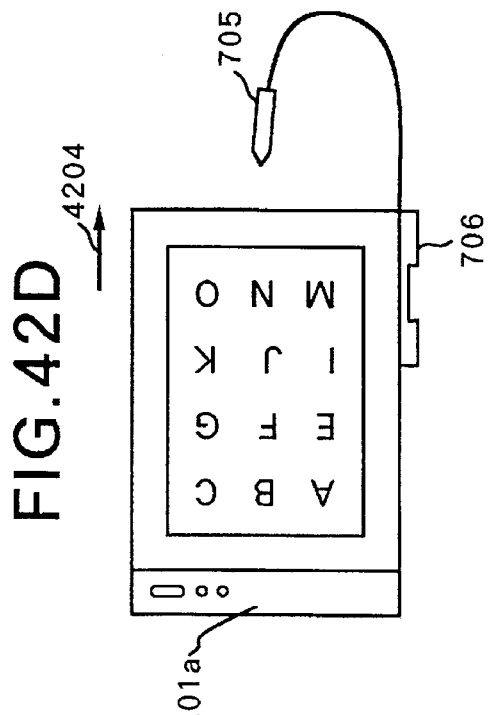
Figure 42A:
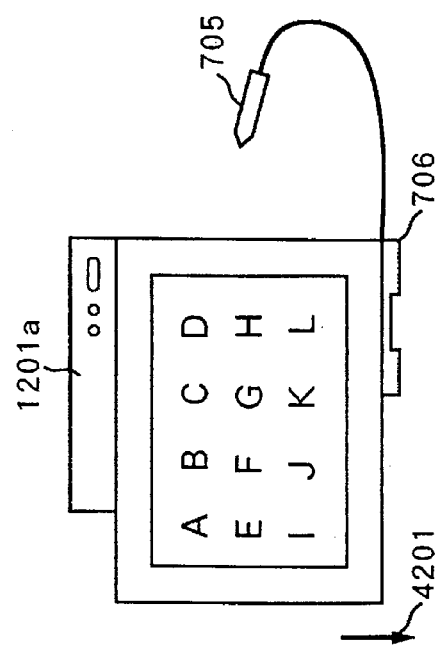
Figure 42C:
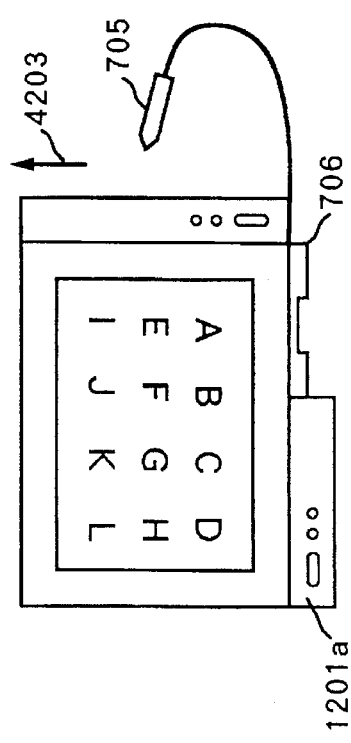

In a case where data in the display area 1702 is as shown in FIG. 41, the data is displayed in accordance with the attachment direction of the apparatus main body, as shown in FIGS. 42A to 42D. Note that in these states, the apparatus main body is positioned in the same direction, however, connecting directions of the subordinate apparatus with respect to the apparatus main body are different. In FIG. 42A, the user stands in the lower direction, as pointed by an arrow 4201; in FIG. 42B, in the left direction as pointed by an arrow 4202; in FIG. 42C, in the upper direction pointed by an arrow 4203; and in FIG. 42D, in the right direction pointed by an arrow 4204. As it is apparent from FIGS. 42A to 42D, an image having the same measurements in a proper direction to the user can be obtained without considering a setting direction of the apparatus main body, simply by placing the subordinate apparatus with the convex portion 1201a at the top when attaching the apparatuses.

Figure 43:
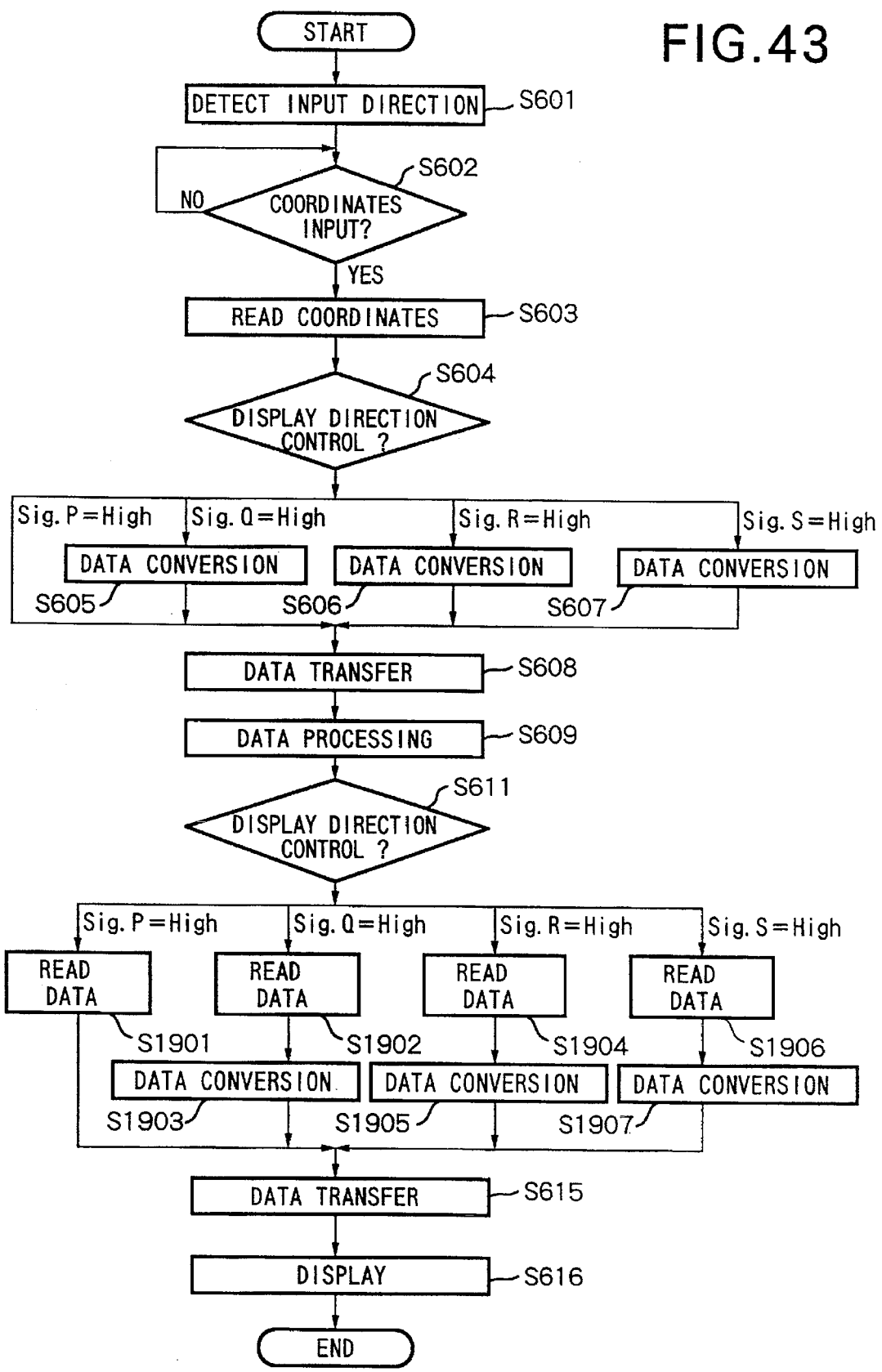
FIG. 43 is a flowchart showing coordinate detection and output processing according to the seventh embodiment.

FIG. 43 shows the display-direction control procedure according to the seventh embodiment. It should be noted that operations substantially correspond to those in FIG. 30 have the same reference numerals (steps S601 to S611). In this procedure, the measurements of one dot is fixed regardless of attachment direction of the apparatus main body, therefore, multiplication (a/b or b/a) in steps S605 to S607 is calculated as "1".

In steps S601 to S611, an attachment direction of the apparatus main body to the subordinate apparatus is detected, then input coordinates are corrected, and the corrected coordinates are forwarded to an application software. To display an image based on the coordinate position designated by the application software, the process proceeds any of steps S1901, S1902, S1904 and S1906 in accordance with the attachment direction detected in step S611 (i.e., any of the signals P to S).

If the signal P is high, i.e., it is determined that a display direction of the entire image area 1701 and that of the display area 1702 coincide, the designated data in the display area 1702 is read in step S1901, and transferred to the display memory 605 without changing the display direction of the data in step S615.

If any of the signals Q, R and S is high, the process advances to corresponding steps S1902, S1904 and S1906, respectively, to read the data in the display area 1702, and the process further advances to any of step S1903, 1905 and 1907 to perform corresponding image-turning operation (data conversion) to change the display direction to a proper direction. Then the converted data is transferred to the display memory 605 in step S615.

Thus, the data transfer is completed, then an image is displayed based on the data stored in the display memory 605, in any of the display states as shown in FIGS. 42A to 42D.

In this embodiment, the data in the display area is once read out, data conversion such as turning-processing is performed on the data, and the converted data is transferred to the display memory 605. However, a read start address and a read direction may be determined based on the input direction of the apparatus main body and the data may be read and transferred in accordance with the determined direction. In this case, whether addresses upon data transfer are in ascending order or descending order change in each direction, and how to obtain an address position in data transfer for one line following an initial data transfer also change in each direction, however, there is no complicated processing and therefore, high-speed data transfer is possible. For example, if scrolling of an image is instructed by an application software, in which direction the scrolling is intended is judged based on the attachment direction of the apparatus main body with respect to the subordinate apparatus, and the position of the display area with respect to the whole image area (logical display space) may be corrected based on the judgment.

As described above, the information processing apparatus in the seventh embodiment is separated into the apparatus main body and the subordinated body. When the user attaches the apparatus main body to the subordinate apparatus, the manual attaching operation corresponds to an input direction detecting operation. By virtue of this construction, the user can freely select a display direction and its corresponding input direction.

Further, as described above, data communication between the apparatus main body and the subordinate apparatus is by optical communication which requires no contact between the apparatuses. Therefore, the user can always obtain an image displayed in a proper direction, simply by turning the apparatus main body with its power on and attaching the apparatus main body to the subordinate apparatus again.

[Eighth Embodiment]

Figure 44:
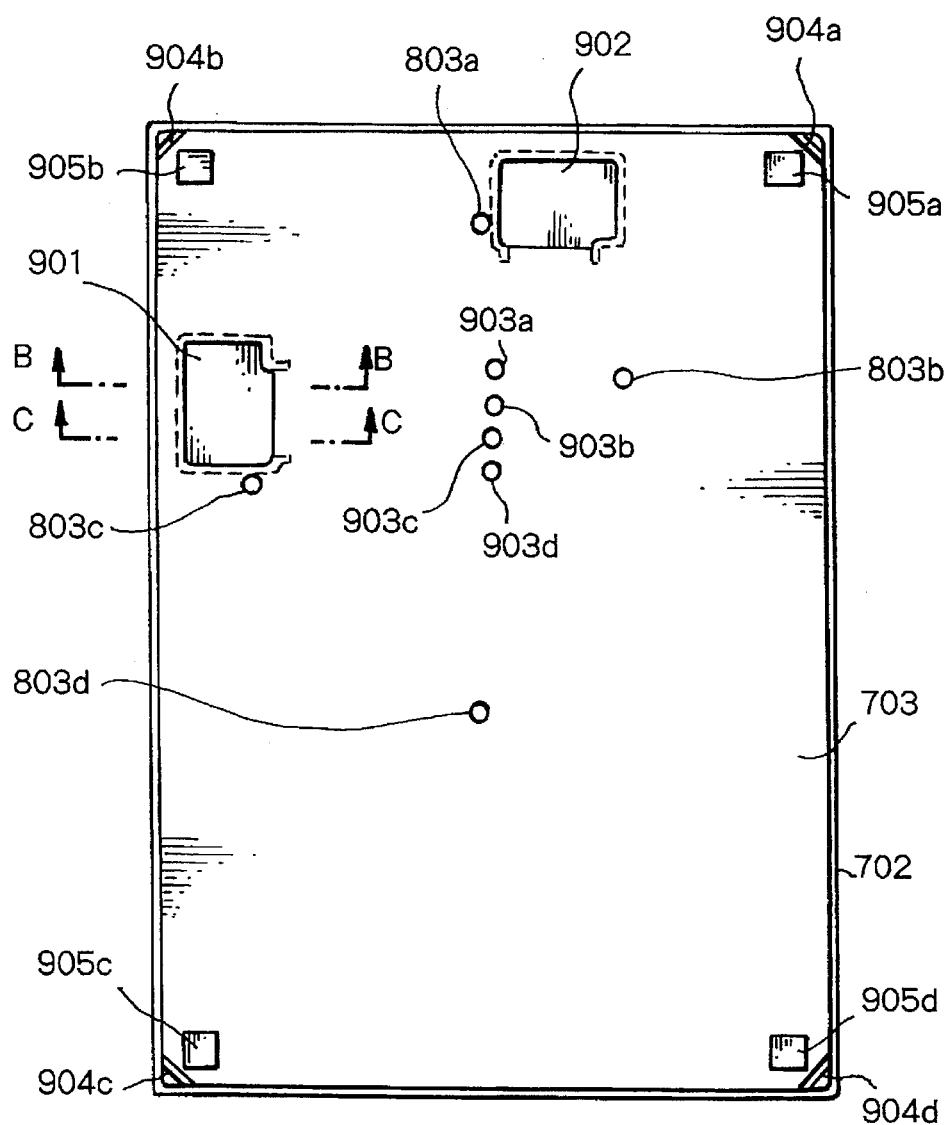
FIG. 44 is a bottom plan view of an information processing apparatus according to an eighth embodiment of the present invention.

The seventh embodiment enables attachment of the apparatus main body to the subordinate apparatus in four directions. In practice, these four input directions can be reduced to two directions, i.e., whether the apparatus display is used with the shorter side at the top or the longer side at the top. For this reason, the connection between the apparatuses may be performed regarding the two directions. In this case, the user has to be aware of the invalidation of the other two directions. To avoid erroneous connecting operation regarding the aforementioned invalid two directions, the apparatus main body comprising only two concave portions 901 and 902 for the hook 1203 of the subordinate apparatus, as shown in FIG. 44, may be provided.

This requires only the windows 903a to 903d for optical communication, thus reduces costs.

It should be noted that the other elements of the apparatus are identical to those in the seventh embodiment, therefore the explanations of the elements will be omitted. Further, in the flowchart in FIG. 43, steps S606 and S607, S1904 to 1907 can be omitted, for the number of input directions is two. Other differences between the seventh embodiment will be easily understood by those who skilled in the art.

[Ninth Embodiment]

In the seventh embodiment, when the apparatus main body is attached to the subordinate apparatus, the combined apparatus is slanted toward a user due to the weight of the apparatus main body. However, the construction of the apparatus may be arranged to obtain this slant in advance.

Figure 45:
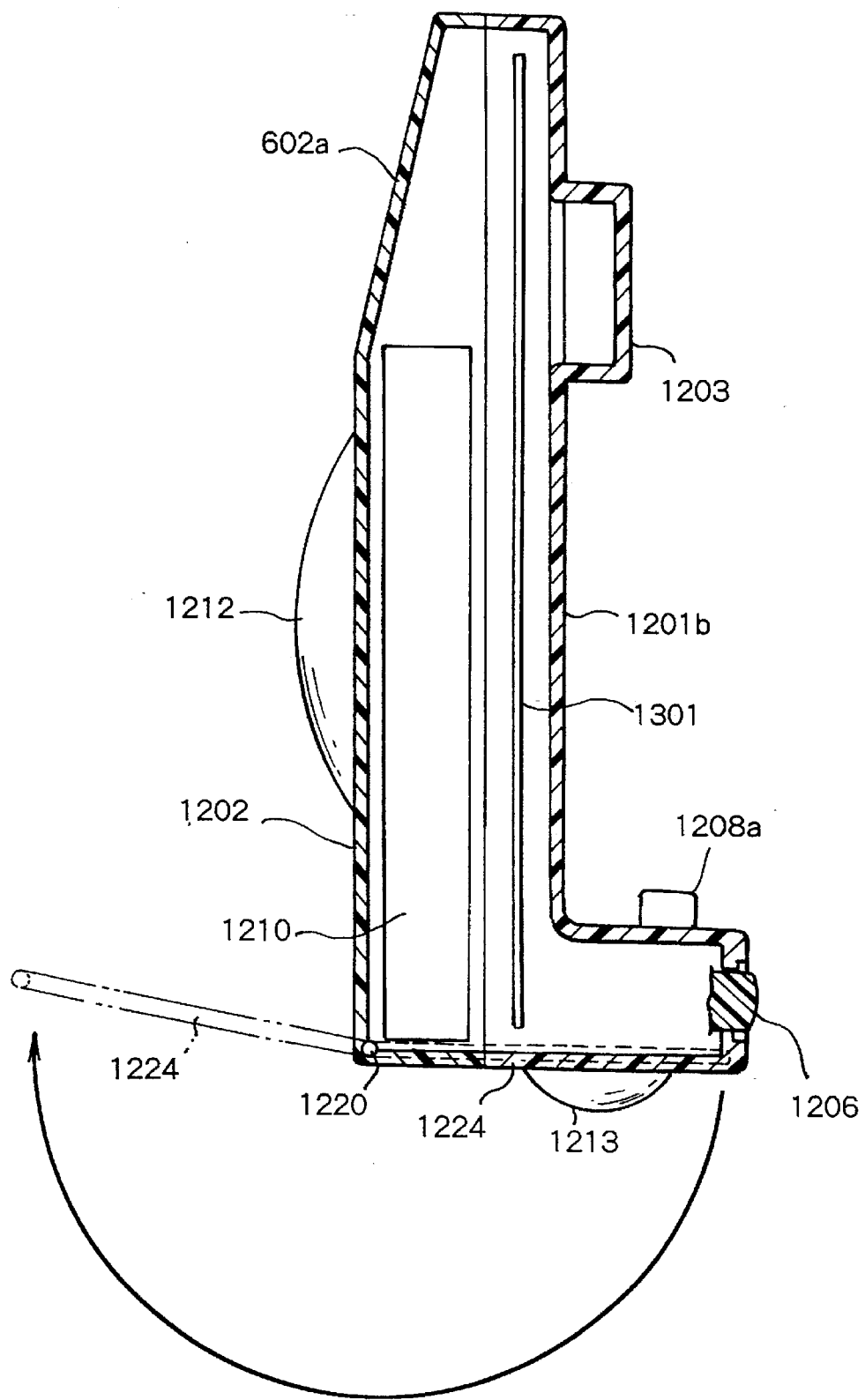
FIG. 45 is a cross-sectional view, according to a ninth embodiment of the present invention, cut out at a line E—E in FIG. 36.
Figure 46:
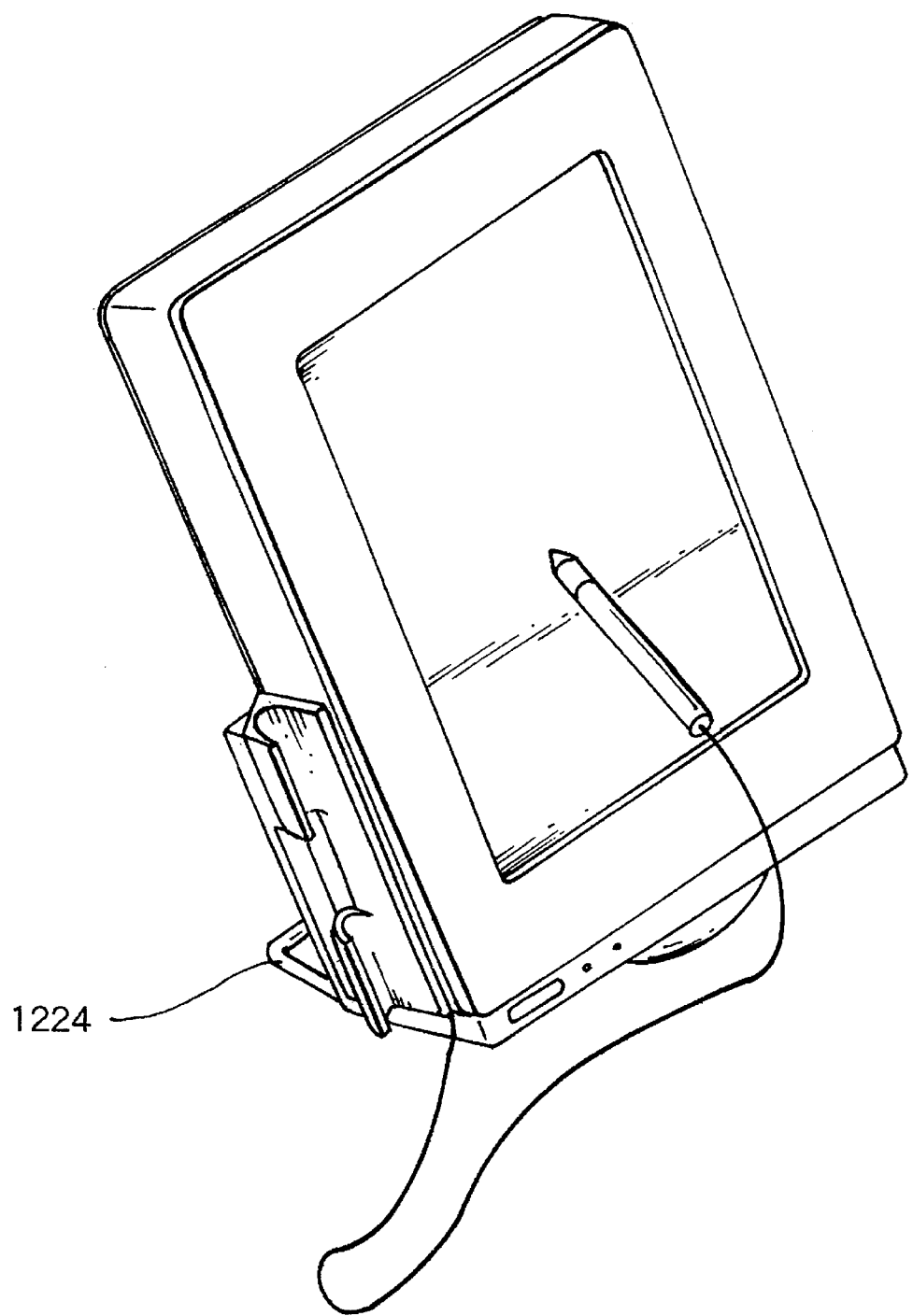
FIG. 46 is a perspective view of the apparatus main body, combined with the subordinate apparatus, held upright, in the ninth embodiment.

As shown in FIG. 45 which is a cross-section cut out at the line E—E in FIG. 36, the bottom surface of the apparatus main body may be comprised of rubber feet 1212 at its both sides. Note that rubber material is employed to prevent vibration of the apparatus. Further, the rear side surface of the subordinate apparatus (side surface of the convex portion 1201a, opposite to the side surface having the guide pins 1208a and 1208b) may comprise of a stand 1224 to stabilize the combined apparatus when it stands upright. As shown in FIG. 45, the stand 1224 rotates at 180° or greater angle with respect to the rear side surface of the subordinate apparatus, and as shown in FIG. 46, the display of the apparatus main body is slanted with the upper surface facing upward. Note that both the right and left side surfaces of the subordinate apparatus comprise a rubber foot 1213 to stabilize this state and prevent vibration (the stand 1224 is provided between the rubber feet 1213).

In the state as shown in FIG. 46, to avoid displaying an image upside-down, a detection switch (not shown) for detecting the rotational movement of the stand 1224 is provided. As the CPU of the apparatus main body cannot recognize that this standing state of the apparatus by itself, it receives a detection signal from the above detection switch. The signal may be supplied to the main body with an optical signal or via a dedicated contact terminal. When this switch is turned on, the CPU controls the display direction so as to turn over an image properly.

[Tenth Embodiment]

When the apparatus main body is mounted on the subordinate apparatus, the electrodes other than that actually connected to the subordinate apparatus (electrode that receives electric power from the subordinate apparatus) are not connected. Preferably, those unused electrodes are covered with a shutter or a lid, however, such protection causes complexity of the mechanism, and above all, a user has to manually cover the electrodes at every connecting operation.

However, if the user touches the naked electrodes or inserts something into those portions, the unused electrodes might generate heat due to accidental electric shock or short circuit.

Further, even if these electrodes are covered, an incoming noise might enter the electrodes and cause erroneous operation of the apparatus.

Accordingly, the tenth embodiment activates only the electrode that is connected with the subordinate apparatus and deactivates the other electrodes to solve the above problems.

Figure 47:
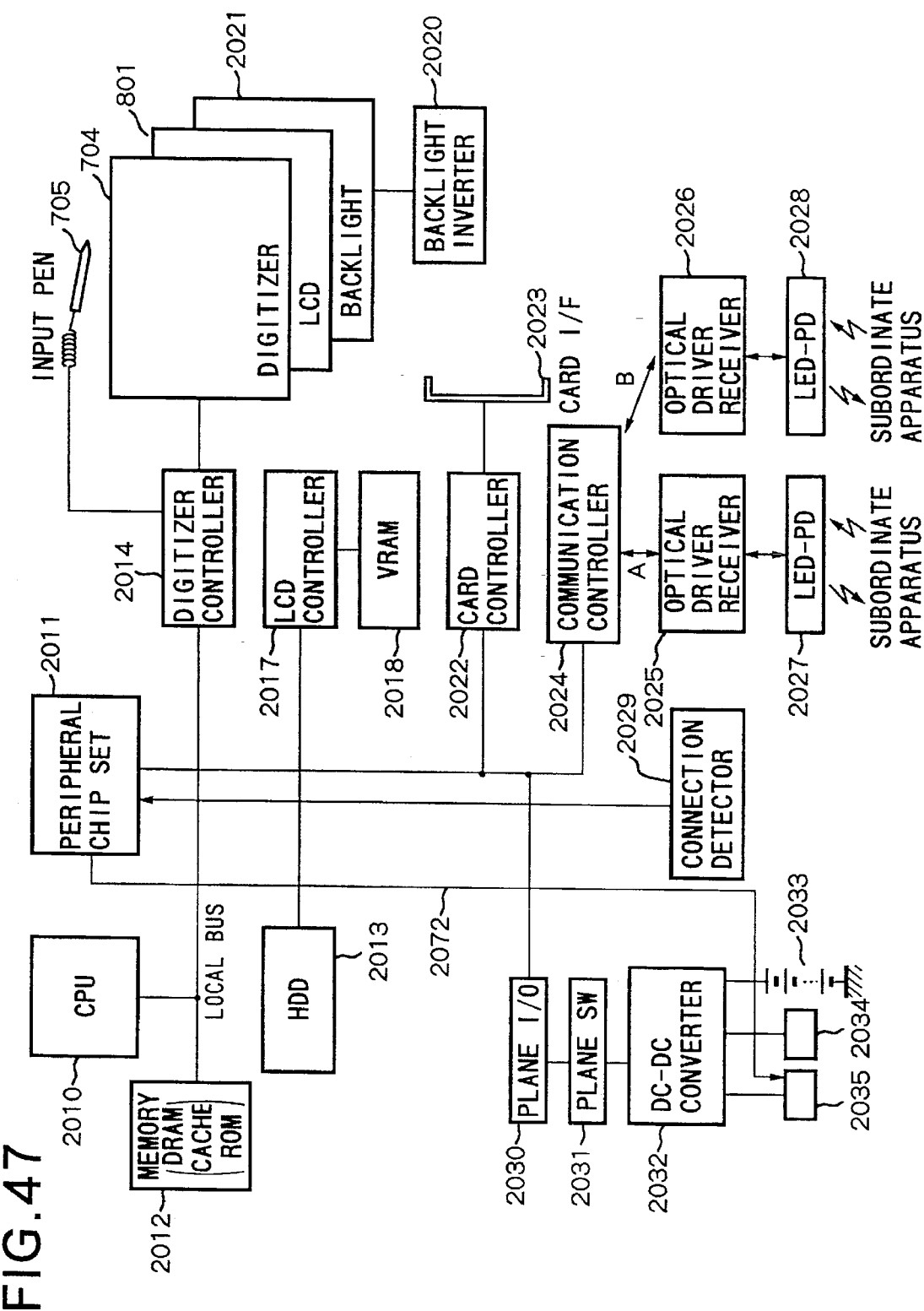
FIG. 47 is a block diagram showing the configuration of an apparatus main body according to a tenth embodiment of the present invention.

FIG. 47 shows the configuration of an apparatus main body according to the tenth embodiment.

A CPU 2010 which controls the overall apparatus main body is a 32-bit CPU, e.g., i80386SL by Intel Corporation. The CPU 2010 executes programs for calculation, I/O control and so on. A peripheral chip set 2011 is used with the CPU 2010 for necessary peripheral I/O controls (serial communication, parallel communication, real-time clock control, timer control, interrupt control etc.). A memory 2012 includes a main memory (8 MB DRAM), a cache (64 KB) and a boot ROM. The main memory is backed up while it is suspended. An HDD 2013 is a 1.8 or 1.3 inch hard disk, used for storing an OS, application software, user data etc. (the capacity is 20–80 MB).

The information processing apparatus of the present embodiment is a hand-held computer. Input is made using a pen 705 upon a digitizer 704 as if characters are written on a sheet of paper, and its locus and input result are displayed on an LCD 801. The LCD 801 and the digitizer 704 are arranged in layers so that an input position and an output position coincide. The input precision of the digitizer 704 is at least equal to or higher than the LCD display precision, e.g., 0.1 mm. A digitizer controller 2014 comprises a CPU, a ROM, a RAM for controlling the digitizer 704.

An LCD controller 2017 sequentially accesses display data from a VRAM 2018, then transfers the data, taking tone-levels into account, to an LCD 2019, and at the same time, performs bus control so as to avoid access conflict between access from the CPU 2010 to the VRAM 2018 and access from the LDC controller 2017 to the LCD 2019.

Further, the LCD controller 2017 can perform logic operations such as AND, OR, EXOR upon the display data in the VRAM 2018 with predetermined data, using e.g. a VGA controller. A backlight 2021, provided under the LCD 801, comprises light-emitting elements for emitting light so that the displayed content on the LCD 801 is visible at indoors or poor-light places. For the backlight 2021, e.g., an EL (electroluminescence) method or a CFL (Cold Cathode Fluorescent Tube Lamp) may be used. A backlight inverter 2020 drives the light-emitting elements.

A card I/F 2023 accepts memory cards such as a ROM-extension memory card for adding application programs and data, a RAM card for backup operation, and a flash memory card for backup operation and for adding data, further, I/O cards such as a facsimile data modem card for data communication via a telephone line and a LAN card for connecting the apparatus to a network. It should be noted that the I/F employed in this embodiment is based on a sixty-eight pin standard decided by the (Japan Electronic Industry Development Associated) or PCMCIA (Personal Computer Memory Card International Association) that is becoming popular (any other I/F standard can be employed). A card controller 2022 performs control for writing data from the CPU into the cards and reading data (for, e.g., address updating).

A communication controller 2024 performs data communication controls based on an SDLC method, with channel A for transmitting/receiving data for devices such as a keyboard, a floppy disk, a centronics-I/F, and channel B for direct network communication, such as a Local Talk, with the network via the subordinate apparatus. The channels A and B have optical driver receivers 2025 and 2026, and LED-and-photodiodes (LED-PD's) 2027 and 2028 respectively.

A DC/DC converter 2032 converts power voltage supplied from one of a battery 2033, an AC adopter jack 2034 and an electrode contact 2035, into a voltage for the apparatus main body (+5 V for logical operation, +12 V for backlight and −24 V for LCD). An electrode contact switching signal 2072 is used for ON/OFF switching of the electrode contact point in the electrode contact 2035 in accordance with output from the peripheral chip set 2011. A connection detector 2029 detects the connection between the apparatus main body and the subordinate apparatus.

Figure 48:
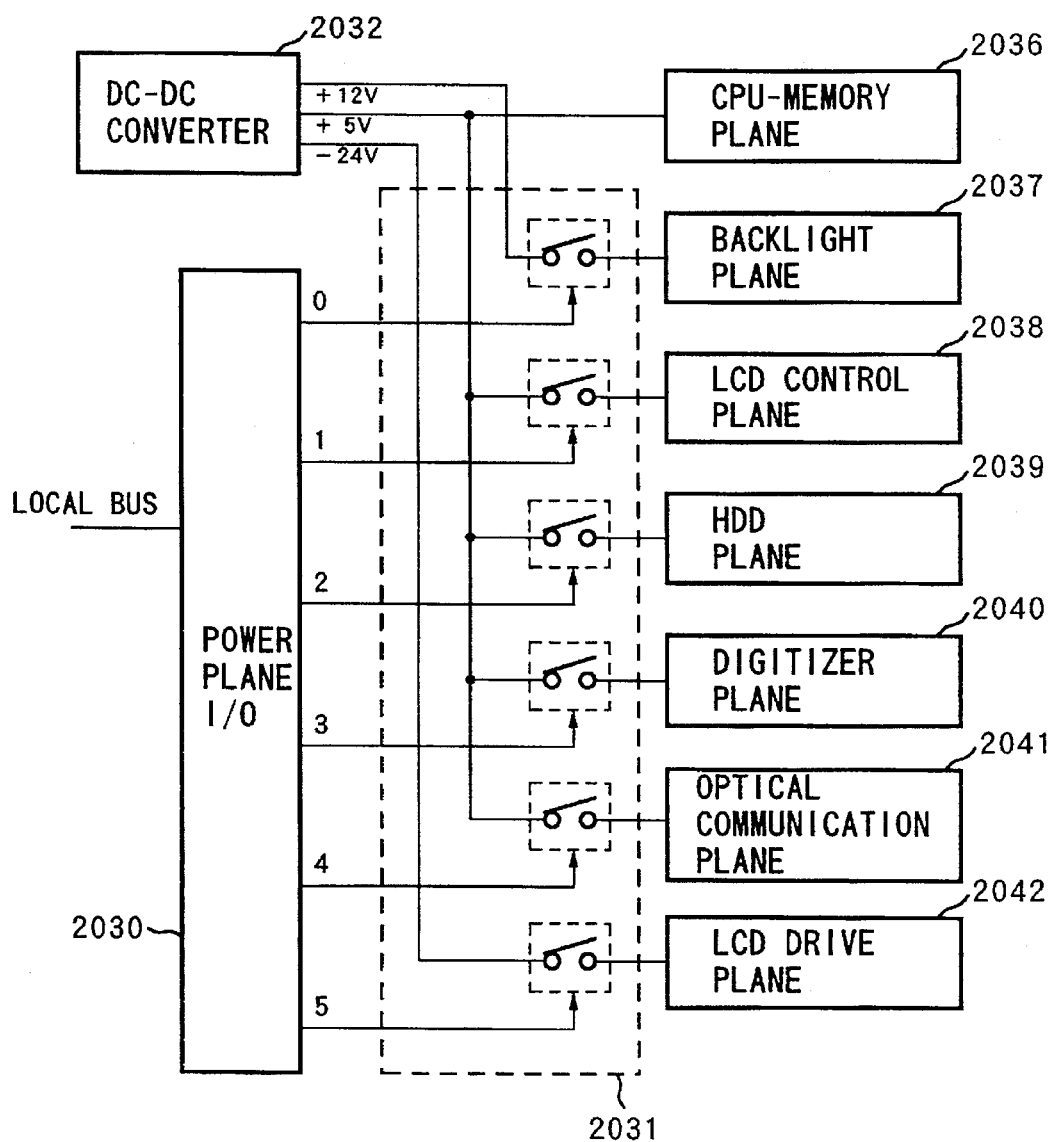
FIG. 48 is a block diagram showing the construction of a power controller in FIG. 47.

FIG. 48 shows the construction of a power control unit. In the apparatus main body, electric portions are assigned a power plane depending upon their functions, and are turned on and off separately. Note that a CPU-memory plane 2036 is always on while the power is on, and is not turned off. This plane covers operation of the CPU 2010, the peripheral chip set 2011, the memory 2012 and the plane I/O 2030. A backlight plane 2037 receives +12 V for the backlight inverter 2020. An LCD control plane 2038 covers operation of the LCD controller 2017 and the VRAM 2018. The HDD plane 2039 is for the HDD 2013. A digitizer plane 2040 covers operation of the digitizer controller 2014, the digitizer 2016 and the input pen 2016. An optical communication plane 2042 receives +5 V, and covers operation of the communication controller 2024, the optical driver receivers 2025 and 2026, and the LED-PD's 2027 and 2028. An LCD drive plane 2042 receives −24 V, and generates a voltage for driving the LCD.

The CPU 2010 maps ON/OFF states of the planes in I/O addresses, and the CPU 2010 writes ON (H=high) or OFF (L=low) data into the power plane I/O 2030 via the I/O address. A plane switch 2031 turns on or off the respective planes in accordance with the ON/OFF data. The plane switch may comprise an electric device such as an electromagnetic relay or a lead switch, otherwise, a semiconductor switch using an FET.

Figure 49:
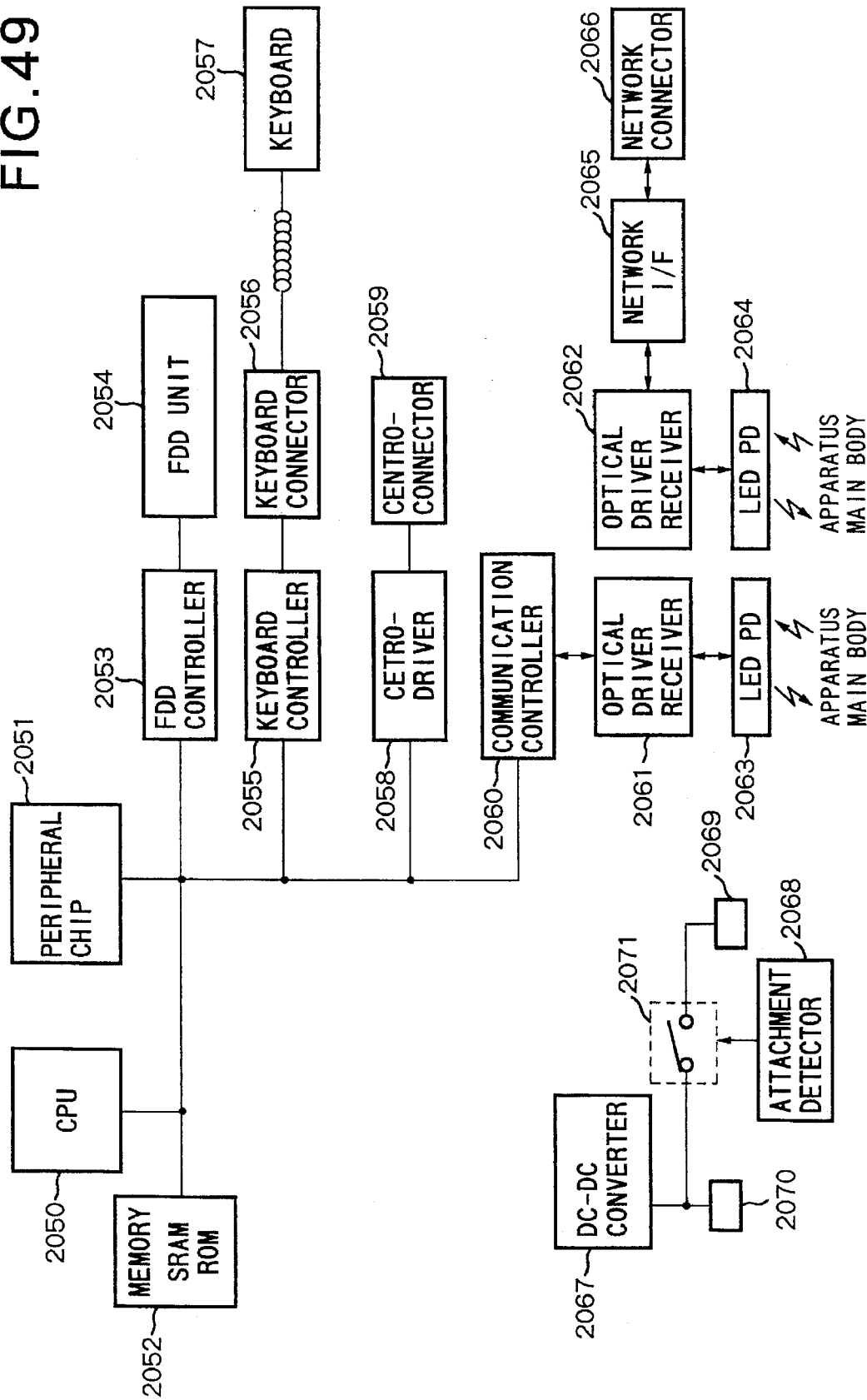
FIG. 49 is a block diagram showing the configuration of a subordinate apparatus of the tenth embodiment.

FIG. 49 shows the configuration of the subordinate apparatus of the tenth embodiment.

In the subordinate apparatus, a CPU 2050 for controlling communication between the apparatuses, a peripheral chip 2051 and a memory 2052 form an electric control unit. The subordinate apparatus comprises an FDD, a keyboard, a centronics-I/F and a network I/F, which are not incorporated in the apparatus main body.

An FDD controller 2053 controls an FDD unit 2054 for 3.5 inch floppy disks. A keyboard controller 2055 controls a keyboard 2057, and informs the CPU 2050 of a pressed key. The data of the FDD and the keyboard are transferred to the apparatus main body. The data can be written into the FDD in accordance with an appropriate instruction from the apparatus main body. A centronics-driver 2058 is an interface for outputting data from the CPU 2050 to a printer or the like. A communication controller 2060, optical driver receivers 2061 and 2062, LED-PD's 2063 and 2064 are identical to those in the apparatus main body. The positions of LED's 2063 and 2064 correspond to those of the windows 903a to 903e in FIG. 33.

A network I/F 2065 performs voltage impedance conversion upon connecting the apparatus to a network. In this embodiment, a signal from the channel B of the apparatus main body is directly transferred to the network.

A DC/DC converter 2067, which is the power for the subordinate apparatus, receives power from an AC adopter jack 2070. An attachment detector 2068 is identical to that in the sixth and seventh embodiments. When the attachment detector 2068 detects attachment of the apparatuses, a switch 2071 is closed and electric power is supplied from the subordinate apparatus to the apparatus main body via an electrode 2069.

Figure 50:
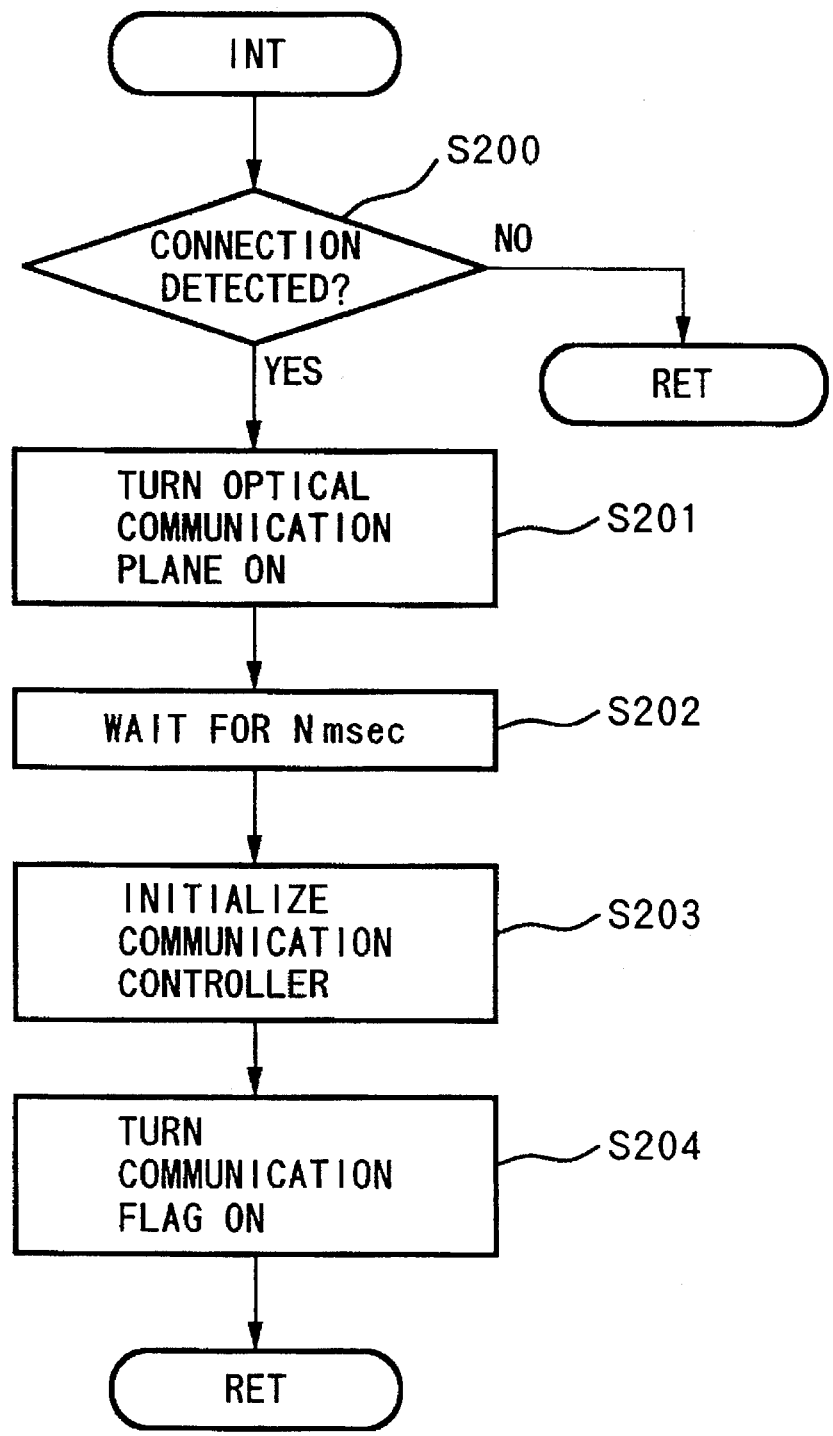
FIG. 50 is a flowchart showing an on/off control procedure of an optical communication plane of the tenth embodiment.

Next, ON/OFF control in the optical communication plane will be described with reference to the flowchart in FIG. 50. When the apparatus main body is connected to the subordinate apparatus, the connection detector 2029 outputs an interrupt signal toward to the CPU 2010, which performs an interruption processing (INT routine).

In step S200, the connection detection is checked again. If it is determined that the apparatuses are connected, the optical communication plane 2041 is turned on in step S201, i.e., bit 4 of the power plane I/O 2030 is turned to high, and a corresponding switch in the switch 2031 is turned on. Next, in step S202, a stabilized state of the power is awaited for Nm seconds. In step S203, the communication controller 2024 is initialized, and in step S204, a communication flag (ensured in a predetermined address in the memory 2012) is turned on. Then, the interruption routine ends.

Figure 51:
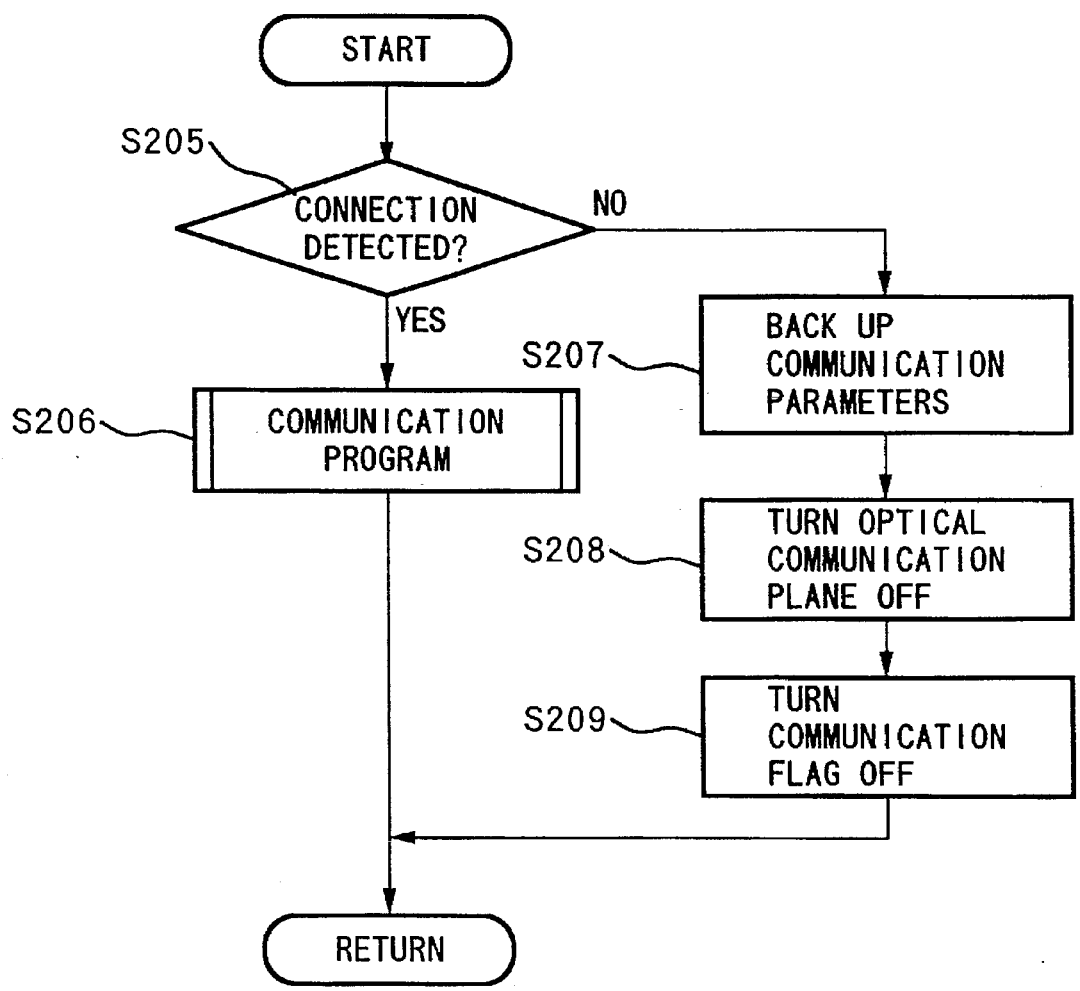
FIG. 51 is a flowchart showing a communication procedure according to the tenth embodiment.

The optical communication is interrupted at predetermined periods while the communication flag is on for polling or selecting data in accordance with necessity. This communication procedure will be described with reference to the flowchart in FIG. 51.

First, the connection detection switch is checked in step S205. If the connection between the apparatuses is confirmed, the process enters a communication routine in step S206. If the connection is not confirmed in step S205, it is judged that the apparatus main body and the subordinate apparatus are apart from each other. In this case, parameters necessary for communication are backed up in step S207, the optical communication plane is turned off, and the communication flag is turned off in step S208. Then the process ends and does not enter the communication routine until the communication flag is turned on.

When the power is turned on, not shown, the connection detection switch is checked while the power is initialized. If the connection is confirmed, the optical communication plane is turned on, the communication controller is initialized, and the communication flag is turned on.

Next, various usages of the apparatus main body will be described below. As described above, the apparatus main body can be used from the four (or two) directions.

When the pen 705 is used for input, the cord 709 can preferably be positioned at the right side when a user is right-handed, while it is positioned at the left side when the user is left-handed. In the present embodiment, the cord 709 kept at a gap between the pen holder 706 and the side surface of the apparatus main body may be pulled out in accordance with necessity, and it may be held with any of the grooves 904a to 904d, from thereafter, it may further be pulled to the input surface side, thus avoiding hindrance to pen-input by this cord.

Next, usage upon connecting the apparatus main body with the subordinate apparatus will be described below. It should be noted that the present embodiment also provides the subordinate apparatus with rubber feet as described in the ninth embodiment.

In both cases of using the apparatus with the shorter side at the top and using the apparatus with the longer side at the top, the subordinate apparatus is placed under the apparatus main body. The input surface is slanted, i.e., by the rubber feet 1212 of the subordinate apparatus, which helps the user to see the display screen and to input with the pen 705. Further, in the both cases, the combined apparatus can be used in an upright state with the bottom surface of the subordinate apparatus as the bottom of the combined apparatus, as shown in FIGS. 39 and 46.

In a case where the direction of display image is turned at 180° by attaching the apparatus main body to the subordinate apparatus, to avoid upside-down display of an image on the LCD 801, the display direction is turned at 180° in correspondence with the rotation of the stand 1224 detected by the detection switch. Note that any other detecting device can be replaced with this switch so far as the upright state of the apparatus can be detected.

<Electric Interface (FIG. 52)>

Figure 52:
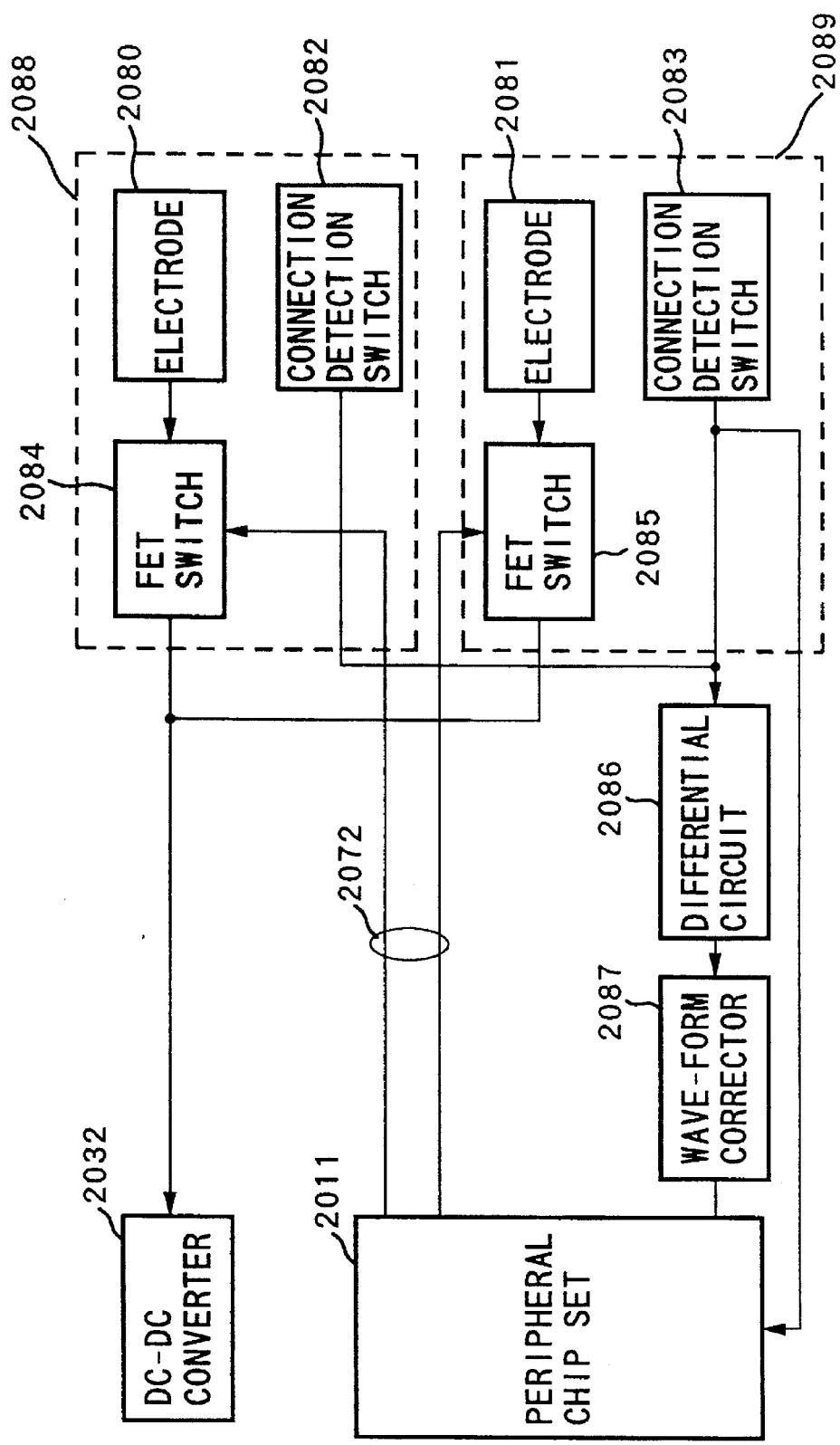
FIG. 52 is a block diagram showing the construction of an electricity interface of the tenth embodiment.

Next, electric power supply from the subordinate apparatus to the apparatus main body will be described with reference to FIG. 52 showing the construction of the electrode contact 2035 (FIG. 47). For the purpose of simplification, the rear surface of the apparatus main body is as shown in FIG. 44, i.e., in only two attachment directions of the apparatus main body with respect to the subordinate apparatus. However, those skilled in the art will easily understand the electric power supply operation in all four directions from the following description.

In FIG. 52, numeral 2088 denotes an electrode contact unit provided within the concave portion 901 on the bottom surface of the apparatus main body, which supplies electric power to the apparatus main body when the apparatus main body is connected to the subordinate apparatus with the longer side of the main body at the top. Similarly, an electrode contact unit 2089, provided within the concave portion 902 on the bottom surface of the apparatus main body, supplies electric power to the apparatus main body when the connection is made with the shorter side of the apparatus main body at the top.

Numeral 2080 denotes an electrode contact provided within the concave portion 901; and 2081, an electrode contact provided within the concave portion 902. When the apparatus main body and the subordinate apparatus are connected, operation power is supplied via any of the electrode contact 2080 and 2081 from the subordinate apparatus to the apparatus main body. Numerals 2084 and 2085 denote FET switches respectively for turning on and off the current from the electrode contacts 2080 and 2081; 2082, an electrode contact switching signal for switching the on/off operation of the FET switches 2084 and 2085 in accordance with output from the peripheral chip set 2011. Numerals 2082 and 2083 denote connection detection switches for detecting connection between the apparatuses. Outputs from the connection detection switches 2082 and 2083 are OR-connected. Numeral 2086 denotes a differential circuit which generates a pulse when the outputs from the connection detection switches 2082 and 2083 change; and 2087, a waveform corrector which transforms the output from the differential circuit 2086 into a waveform of TTL (transistor-transistor logic) level. The output from the waveform corrector 2087 is connected to an interrupt of the peripheral chip set 2011 so that an interruption signal is generated when the apparatus main body is connected or disconnected with/from the subordinate apparatus. The peripheral chip set 2011 directly reads the outputs from the connection detection switches 2082 and 2083 and determines whether the apparatuses are currently connected or not.

Numeral 2032 denotes a DC/DC converter which outputs operation voltage out of a current supplied from the subordinate apparatus via the electrode contacts 2050 and 2051, power supplied from the battery 2033 incorporated in the apparatus main body, or power supplied from the AC adapter 2034.

<Display Direction Changing>

Next, processing for changing a display direction will be described below. In the present embodiment, the apparatus main body is connected to the subordinate apparatus and a user designates a display direction. However, the display direction may be automatically detected, as the sixth and seventh embodiments.

Figure 53:
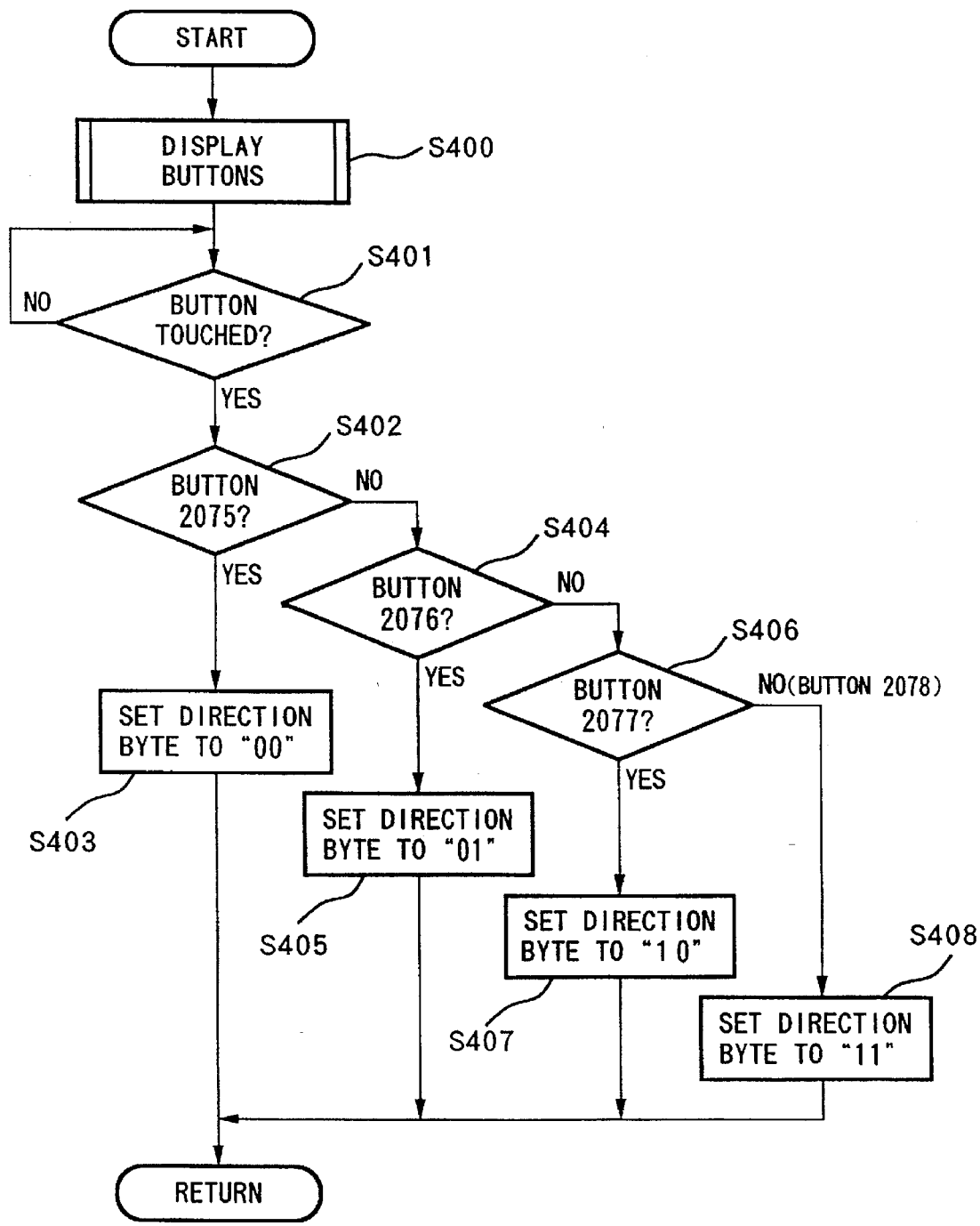
FIG. 53 is a flowchart showing operation direction change processing according to the tenth embodiment.

When the connection (or re-connection) between the apparatus main body and the subordinate apparatus is detected, the CPU 2010 of the apparatus main body operates in accordance with the flowchart in FIG. 53.

Figure 54:
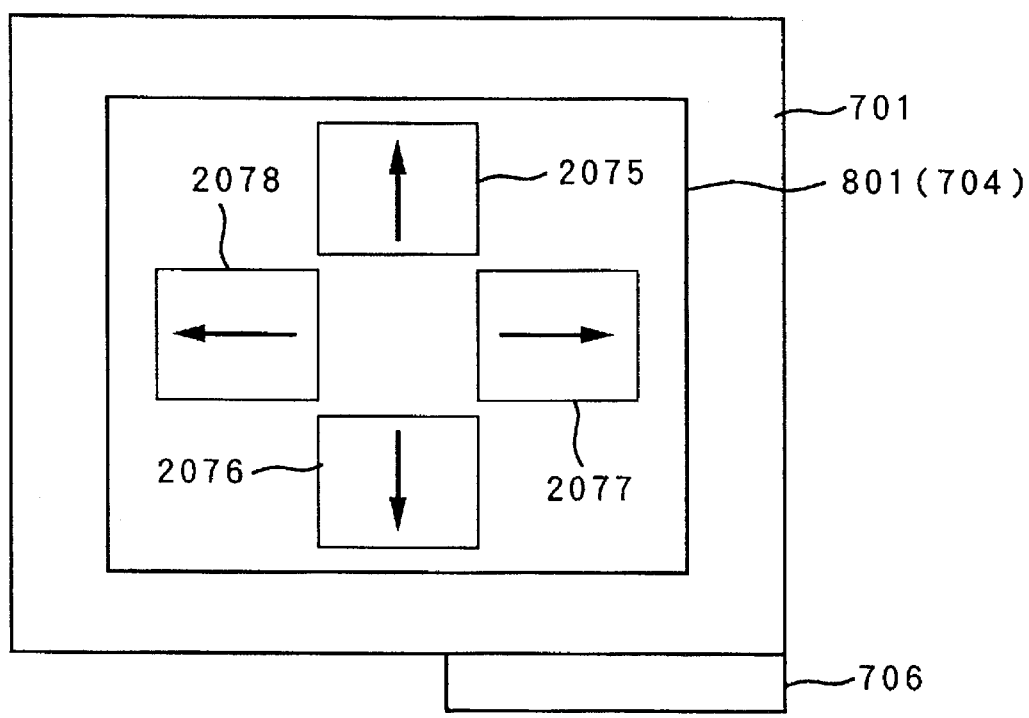
FIG. 54 illustrates a display image example for an operating-direction change instruction in the tenth embodiment.

In step S400, buttons 2075 to 2078 with arrows indicating four directions as shown in FIG. 54 are displayed. In step S401, detection of touch on any of the displayed buttons 2075 to 2078 by the input pen 705 is awaited.

When the pen-input is detected, whether or not the touched button is the button 2075 is determined in step S402. If YES, the process proceeds to step S403 in which a display direction byte ensured at a predetermined address position within the memory 2052 is set to "00".

On the other hand, if it is determined that the touched button is not the button 2075 but the button 2076, the process proceeds from step S404 to step S405, in which the display direction byte is set to "01". Further, if it is determined that the button 2077 has been touched, the process proceeds from step S406 to step S407 in which the display direction byte is set to "10". If it is determined that the button 2078 has been touched, the process proceeds to step S408 in which the display direction byte is set to "11".

As a result, examining the display direction byte provides the attachment direction of the apparatus main body with respect to the subordinate apparatus.

Next, image displaying by referring to the display direction byte will be described below.

Data to be displayed is stored as bitmap data in the VRAM 2018. At every change of the display image (or at any time the content of the display direction byte is changed), the CPU 2010 rewrites the data in the VRAM 2018 in accordance with the following equations (in case of "00", there is no transformation):

In case of "10": bit(x, y)=old bit(int{(a/b)y},int{b/a(a−x)})
In case of "01": bit(x, y)=old bit(int{a−x},int{b−y})
In case of "11": bit (x, y)=−old bit (int{a/b (b−y)}, int{(b/a) x})

a,b: image size bit(x, y): address of VRAM 2018 having series of byte-based data
x: absolute horizontal direction of VRAM
y: horizontal dot (bit) position In the above equations, a dot position "bit(x, y)" corresponds to a bit "(x−int{x/8}* 8)" of "({a/8}y+int{x/8})" byte in the VRAM 2018. Further, int{a/b} is an integer of a/b.

Thus, the display direction is changed by displaying the data from the VRAM 2018 by the LCD controller 2017.

<Changing processing>

Figure 55:
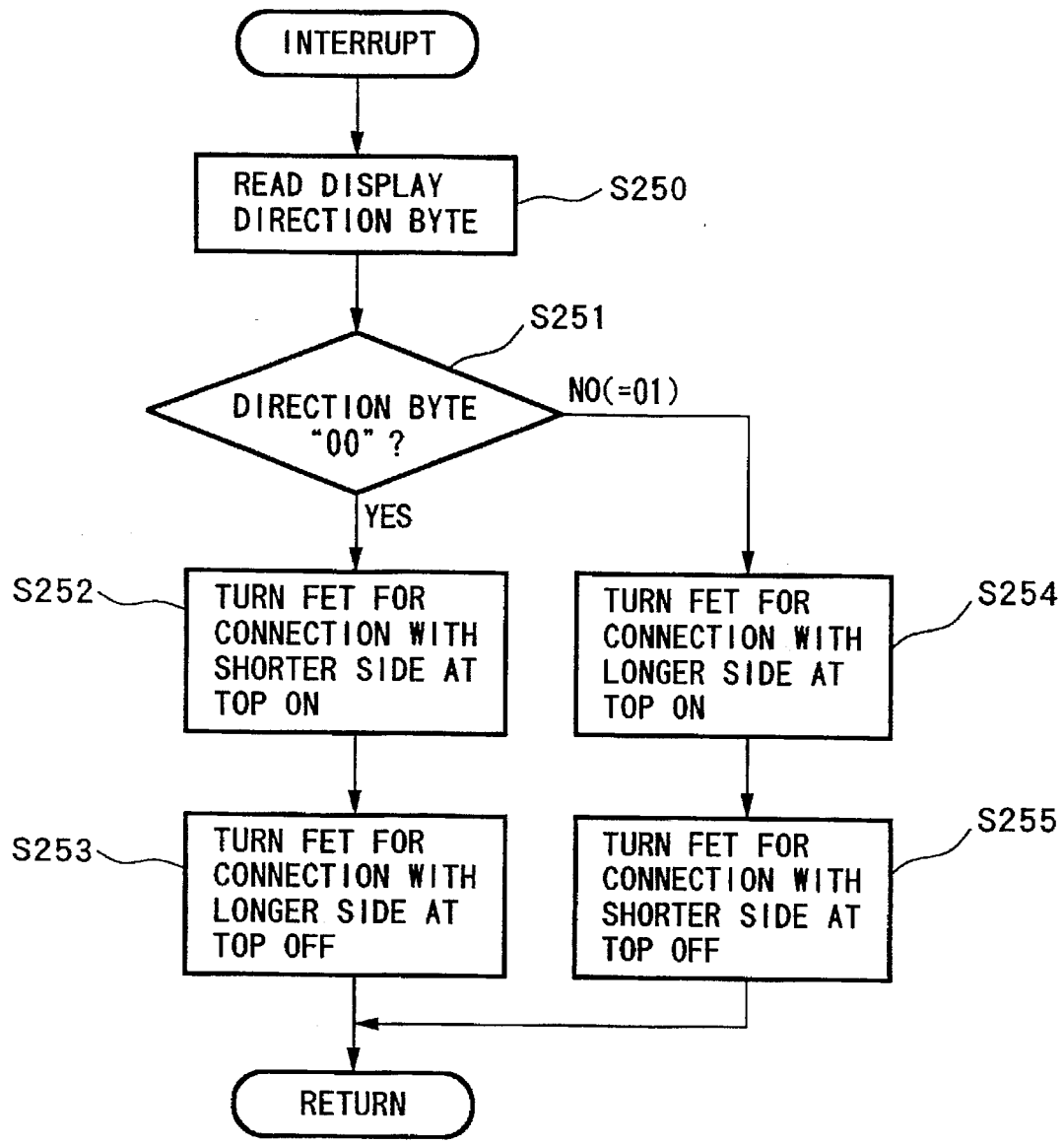
FIG. 55 is a flowchart showing driving/non-driving setting upon attachment of the apparatus to the subordinate apparatus according to the tenth embodiment.

Next, the processing operation of the apparatus main body when the connection detection switch generates an interruption signal will be described with reference to the flowchart of FIG. 55.

The present embodiment detects a display direction on the LCD when an interruption signal is generated, and activates only an appropriate electrode contact in accordance with the detected display direction.

For the purpose of simplification, the content of the display direction byte is "00" or "01". However, the processing in case of "10" or "11", similar to the processing of the "00" or "01" case, can be easily inferred from the following description.

In step S250, the content of the display direction byte is read, and in step S251, whether it is "00" or not is determined. If YES, as the apparatus main body is connected with the shorter side at the top, the FET switch 2084 within the concave portion 902 (FIG. 44) is turned on in step S252. Then, the FET switch 2085 within the concave portion 901, which is used when the apparatus main body is connected with the longer side at the top, is turned off in step S253.

On the other hand, if the content of the display direction byte is "01", i.e., the apparatus main body is connected with the longer side at the top, the FET switch 2085 within the concave portion 901 is turned on in step S254, and, the FET switch 2084 within the concave portion 902 is turned off in step S255.

In the above example, the content of the display direction byte is "00" and "01". However, when the bottom surface of the apparatus main body is for connection in four directions, as shown in FIG. 33, the content of the display direction byte is "00", "01", "10" and "11". In this case, the number of the FET switches may simply be doubled, therefore, the explanation of this case will be omitted.

As described above, according to the tenth embodiment, detection of display direction upon connecting the apparatus main body with the subordinate apparatus enables switchover of an electrode contact to be activated without any specific manual setting. This reduces erroneous operation due to noise entered in an unused electrode contact. Further, even in a case where the user carelessly touches the unused electrode contact or inserts something into the electrode contact, abnormally generating heat due to accidental electric shock or short circuit can be prevented. Further, this construction does not require a shutter or lid to cover the unused electrode, thus avoiding mechanical complexity and realizing downsizing and weight reduction of the apparatus.

The tenth embodiment activates an electrode to be used and deactivates an unused electrode in accordance with display direction designated by a user. However, as described in the sixth and seventh embodiments, the connecting direction of the apparatus main body may be automatically detected.

This embodiment employs FET switches as control devices, however, the embodiment may also employ other devices such as an electronic relay and a lead switch. Further, the state signals from respective switches may be read.

Moreover, the tenth embodiment is described as to power supply electrodes, however, these electrodes may be used for communication between the apparatus main body and the subordinate apparatus via an electrically connected interface, instead of optical communication. That is, the number of the electrical interfaces in this case corresponds to connecting directions of the apparatus main body with respect to the subordinate apparatus, and only one interface in use is activated and the other interfaces are deactivated.

[Eleventh Embodiment]

The eleventh embodiment detects a connecting direction of the apparatus main body with respect to the subordinate apparatus and switches communication lines.

In this embodiment, the information processing apparatus has a construction identical to that of the foregoing embodiments and therefore the explanation of the construction will be omitted.

<Connecting Direction Detection Mechanism>

Figure 56A:
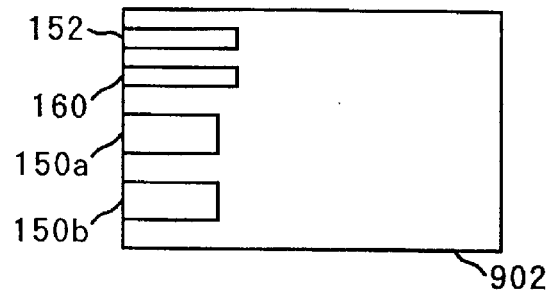
FIGS. 56A and 56B illustrate electrode contact point patterns of an information processing apparatus main body, for detecting a connecting direction of the apparatus main body with respect to the subordinate apparatus, according to an eleventh embodiment.
Figure 56C:
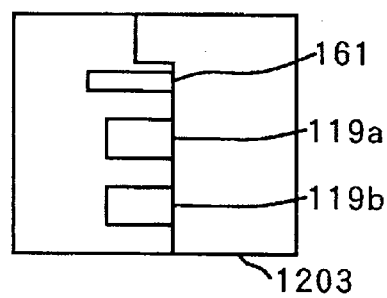
FIG. 56C illustrates electrode contact point pattern of an information processing apparatus subordinate apparatus, for detecting a connecting direction of the apparatus main body with respect to the subordinate apparatus, according to an eleventh embodiment.
Figure 56B:
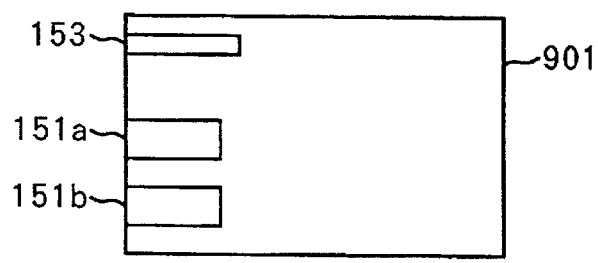

FIGS. 56A and 56B show the electrode contact of the apparatus main body, and FIG. 56C, that of the subordinate apparatus.

In FIG. 56A, the concave portion 902 of the apparatus main body has electrode contacts 150a and 150b, a connection detection switch 152 and a direction detection pin 160. In FIG. 56B, the concave portion 901 of the apparatus main body has electrode contacts 151a and 151b and a connection detection switch 153. In FIG. 56C, the hook 1203 of the subordinate apparatus has electrode contacts 119a and 119b, and a direction detection switch 161. The electrode contacts 119a and 119b are connected with the electrode contacts 150a and 150b or the electrode contacts 151a and 151b, to supply operation power to the apparatus main body. When the apparatus main body is connected, with the shorter side at the top, to the subordinate apparatus, the direction detection switch 161 detects the connecting direction by being pressed with the direction detection pin 160. The output from the direction detection switch 161 is connected to the peripheral chip 2051, from which the CPU 2050 reads the connection state.

<Optical Communication Interface>

Figure 57:
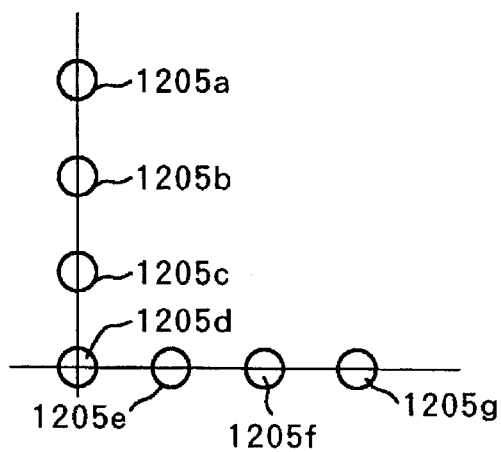
FIG. 57 illustrates arrangement of an LED and photodiodes in an optical communication unit of the subordinate apparatus of the eleventh embodiment.

FIG. 57 shows in detail the arrangement of the optical communication elements in the subordinate apparatus as shown in FIG. 36. In FIG. 57, numerals 1205a, 1205c, 1205e and 1205g denote LED windows for passing infrared signals; and 1205b, 1205d and 1205f, photodetector (hereinafter abbreviated to "PD") windows for receiving the infrared signals as electric signals. When the apparatus main body is connected, with the shorter side at the top, to the subordinate apparatus, the windows 1205a, 1205b, 1205c and 1205d perform optical communication, on the other hand, when the apparatus main body is connected, with the longer side at the top, to the subordinate apparatus, the windows 1205g, 1205f, 1205e and 1205d perform communication.

Figure 58:
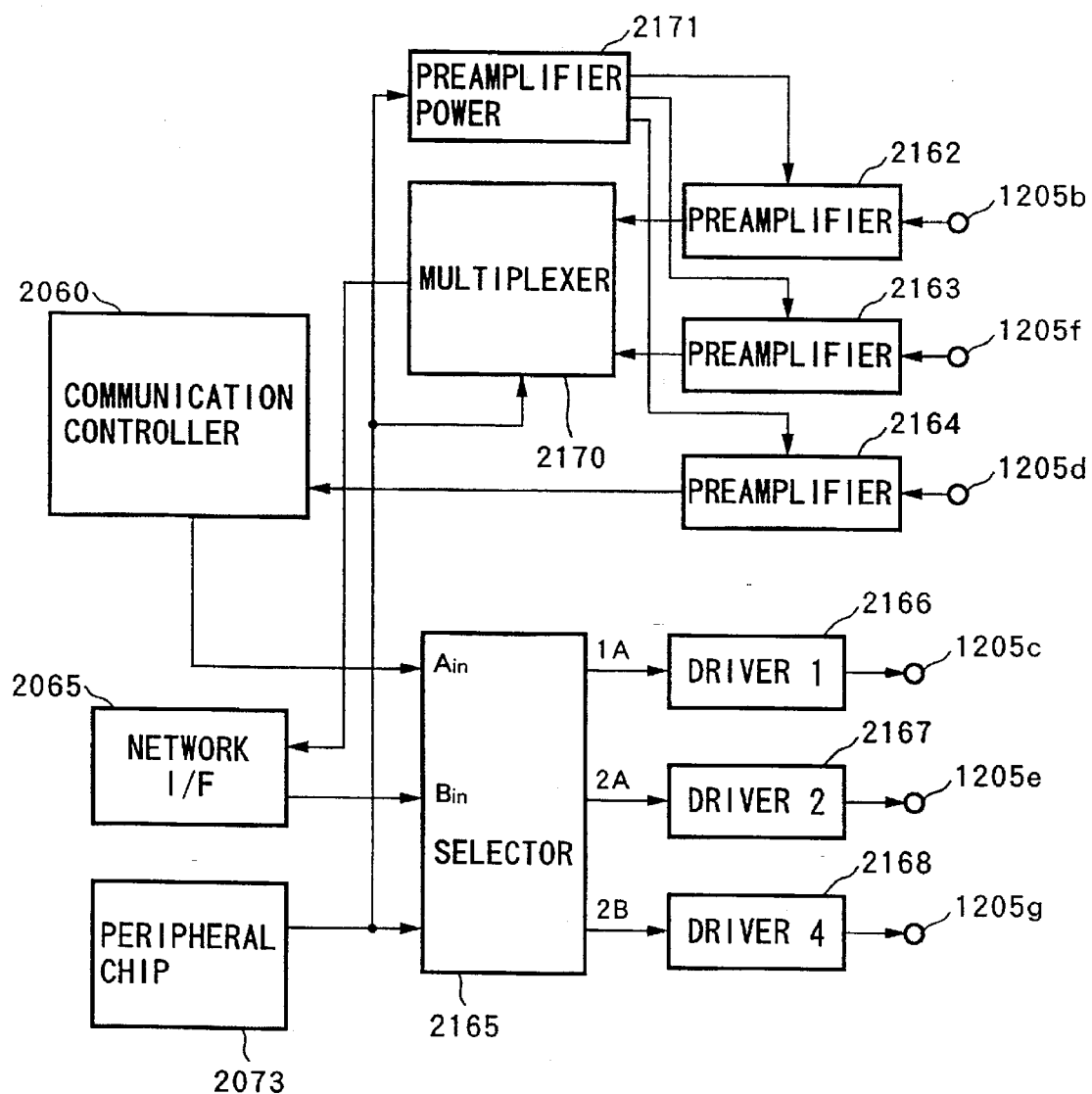
FIG. 58 is a block diagram showing the construction for driving/non-driving control upon plural LED's and photodiodes in the optical communication unit of the subordinate apparatus in the eleventh embodiment.

FIG. 58 shows the construction of the optical communication portion of the subordinate apparatus.

Numeral 2073 denotes a peripheral chip which outputs a selection signal for switching the optical communication elements; 2162 to 2164, preamplifiers for amplifying the signals from the PD's 1205b, 1205f, 1205d, and filtering a specific frequency; 2171, a preamplifier power for supplying power to the preamplifiers; 2170, a multiplexer for switching the signals from the preamplifiers 2162 to 2164 in accordance with a selection signal; 2165, a selector for selecting one of the signals inputted from a communication controller 2060 and a network interface 2065; 2166 to 2169, drivers for driving the LED's 1205c, 1205e and 1205g. Note that an unselected driver maintains its corresponding LED off.

Figures 59, 60:
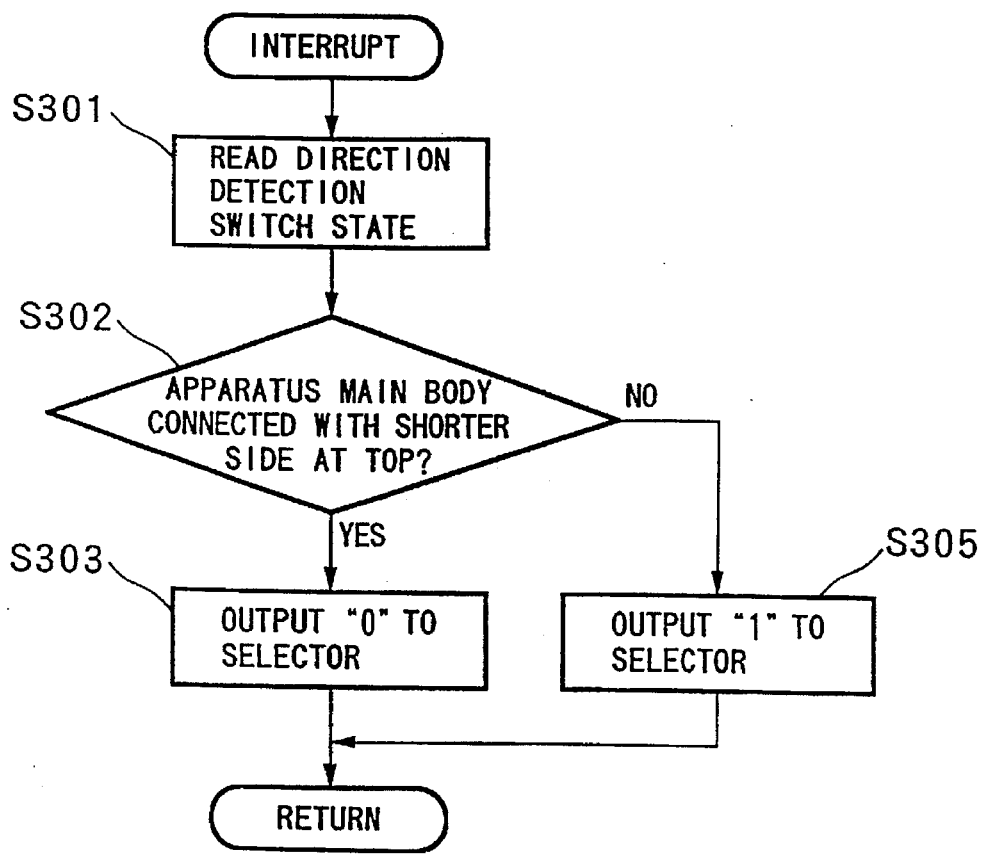
FIG. 59 illustrates selected contents by a selection signal in FIG. 58.
FIG. 60 is a flowchart showing determination of selection signal logic in FIG. 58.

FIG. 59 shows optical communication elements selected by a selection signal. When the selection signal level is "0", the LED 1205c is selected as the output LED of channel A; the PD 1205d, as the input PD of the channel A; the LED 1205a, as the output LED of channel B; and the PD 1205b, as the input PD of the channel B.

When the selection signal level is "1", the LED 1205e is selected as the output LED of the channel A; the PD 1205d, as the input PD of the channel A; the LED 1205g, as the output LED of the channel B; and the PD 1205f, ad the input PD of the channel B. In this manner, when the signal level is "0", the elements in a direction, parallel to the connecting direction with the shorter side of the apparatus main body as the top, are driven, while when the signal level is "1", the elements in a direction, parallel to the connecting direction with the shorter side of the apparatus main body as the top, are driven.

<Switching Processing (FIG. 36)>

Next, the switching of the optical communication elements in the subordinate apparatus will be described with reference to the flowchart in FIG. 60. In the present embodiment, an optical communication element array is selected upon interruption processing by the connection detection switch.

First, the state of the connecting-direction detection switch 2161 is read in step S301, then the connecting direction is determined in step S302. If the connecting direction is parallel to the shorter side of the apparatus main body as the top, the process proceeds to step S303, or if the connecting direction is parallel to the shorter side of the apparatus main body as the top, the process proceeds to step S305. In step S303, a selection signal having a level "0" is outputted, and the process ends. In step S305, a selection signal having a level "1" is outputted, and the process ends.

The above processing always activates only the optical communication elements in the subordinate apparatus, opposing to the optical communication elements in the apparatus main body, regardless of connecting direction.

As described above, the eleventh embodiment detects a connecting direction and switches the communication elements to be activated, thus reduces power wastefully supplied to unused circuits and saves electricity.

The present invention can be applied to a system constituted by a plurality of devices, or to an apparatus comprising a single device. Furthermore, the invention is applicable also to a case where the object of the invention is attained by supplying a program to a system or apparatus.

As described above, the sixth to eleventh embodiments convert the coordinate system at the input unit and that of the output unit in accordance with an input direction of the apparatus. This enables processing by e.g. an application program using the same coordinate system regardless of input direction. Accordingly, a user can proceed with his/her work with a common operation in every input direction. Further, an application programmer does not have to take operation of different coordinate systems into account.

The present invention is not limited to the above embodiments and various changes and modifications can be made within the spirit and scope of the present invention. Therefore, to apprise the public of the scope of the present invention, the following claims are made.

What is claimed is:

1. An electronic apparatus which performs handwriting recognition comprising:

detection means for detecting a position at which a palm of a user is rested;

discrimination means for discriminating whether a user who performs handwriting input is right-handed or left-handed on the basis of the position of the palm detected by said detection means;

selection means for selecting one of a plurality of dictionaries for character recognition, based on a discrimination result from said discrimination means; and character recognition control means for controlling predetermined character recognition which refers to the dictionary selected by said selection means.

2. The electronic apparatus according to claim 1, further comprising a hand-held computer with an input pen.

3. The electronic apparatus according to claim 1, wherein if said discrimination means detects that the user is right-handed, said selection means selects a character recognition dictionary for right-handed input, while if said discrimination means detects that the user if left-handed, said selection means selects a character recognition dictionary for left-handed input.

4. The electronic apparatus according to claim 1, wherein said discrimination means discriminates a user based on writing pressure.

5. The electronic apparatus according to claim 4, further comprising memory means for storing a relation between the writing pressure and a character recognition dictionary for the user, wherein said selection means refers to a dictionary corresponding to the writing pressure discriminated by said discrimination means.

6. A control method for an electronic apparatus which performs handwriting recognition, comprising the steps of:

detecting a position at which a palm of a user is rested;

discriminating whether a user who performs handwriting input is right-handed or left-handed on the basis of the detected position of the palm;

selecting one of a plurality of dictionaries for character recognition, based on the discrimination result; and controlling predetermined character recognition which refers to the dictionary selected.

7. The method according to claim 6, wherein the electronic apparatus is a hand-held computer with an input pen.

8. The method according to claim 6, further comprising the steps of selecting a character recognition dictionary for right-handed input if it is detected that the user is right-handed, and selecting a character recognition dictionary for left-handed input if it is detected that the user is left-handed.

9. The method according to claim 6, wherein in the discrimination step, a writing pressure is detected.

10. The method according to claim 9, wherein the electronic apparatus further comprises a memory for storing a relation between the writing pressure and the character recognition dictionary for the user, and wherein in the selection step, a dictionary corresponding to the detected writing pressure is referred to.

* * * * *

UNITED STATES PATENT AND TRADEMARK OFFICE
CERTIFICATE OF CORRECTION

PATENT NO. : 5,644,653
DATED : July 1, 1997
INVENTOR(S) : Sunakawa et al.

It is certified that error appears in the above-identified patent and that said Letters Patent is hereby corrected as shown below:

[54] TITLE:

"CHARACTER" should read --CHARACTERISTIC--.

COLUMN 1:

Line 3, "CHARACTER" should read --CHARACTERISTIC--.

COLUMN 4:

Line 63, "detecting" should read --detect--.

COLUMN 6:

Line 12, "from" should read --from where--.

COLUMN 7:

Line 47, "thug" should read --thus--.

COLUMN 8:

Line 62, "102" should read --S102--.

UNITED STATES PATENT AND TRADEMARK OFFICE
CERTIFICATE OF CORRECTION

PATENT NO. : 5,644,653
DATED : July 1, 1997
INVENTOR(S) : Sunakawa et al.

It is certified that error appears in the above-identified patent and that said Letters Patent is hereby corrected as shown below:

COLUMN 11:

Line 41, "vc" should read --Vc--.
Line 46, "<vc." should read --<Vc'--.

COLUMN 15:

Line 16, "-yin}" should read --.yin}--.
Line 57, "(5)" should read --(6)--.

COLUMN 17:

Line 30, "contract" should read --contact--.
Line 61, "12025a" should read --1205a--.

COLUMN 22:

Line 33, "invalid two" should read --two invalid--.

COLUMN 23:

Line 67, "LDC" should read --LCD--.

COLUMN 24:

Line 19, "the" should read --the JEIDA--.

UNITED STATES PATENT AND TRADEMARK OFFICE
CERTIFICATE OF CORRECTION

PATENT NO. : 5,644,653
DATED : July 1, 1997
INVENTOR(S) : Sunakawa et al.

It is certified that error appears in the above-identified patent and that said Letters Patent is hereby corrected as shown below:

COLUMN 30:

Line 32, "ad" should read --as--.

COLUMN 32:

Line 1, "if" should read --is--.

Signed and Sealed this

Twenty-third Day of June, 1998

Attest:

BRUCE LEHMAN

Attesting Officer

Commissioner of Patents and Trademarks